(12) United States Patent
Louch et al.

(10) Patent No.: US 8,869,027 B2
(45) Date of Patent: Oct. 21, 2014

(54) MANAGEMENT AND GENERATION OF DASHBOARDS

(75) Inventors: John O. Louch, San Luis Obispo, CA (US); Imran A. Chaudhri, San Francisco, CA (US); Michael Shebanek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 659 days.

(21) Appl. No.: 11/499,494

(22) Filed: Aug. 4, 2006

(65) Prior Publication Data

US 2008/0034314 A1 Feb. 7, 2008

(51) Int. Cl.
G06F 3/00 (2006.01)
G06F 9/445 (2006.01)
G06F 3/0481 (2013.01)

(52) U.S. Cl.
CPC ............... G06F 8/60 (2013.01); G06F 3/0481 (2013.01)
USPC ........... 715/700; 715/779; 715/741; 715/742; 715/762

(58) Field of Classification Search
USPC .......................................... 715/700, 762, 779
See application file for complete search history.

(56) References Cited

U.S. PATENT DOCUMENTS

| | | | |
|---|---|---|---|
| 4,752,893 A | 6/1988 | Guttag et al. | |
| 5,168,441 A | 12/1992 | Ornaheim et al. | |
| 5,260,778 A | 11/1993 | Kauffman et al. | |
| 5,289,574 A | 2/1994 | Sawyer | |
| 5,297,250 A | 3/1994 | Leroy et al. | |
| 5,351,995 A | 10/1994 | Booker | |
| 5,357,603 A | 10/1994 | Parker | |
| 5,388,201 A | 2/1995 | Hourvitz et al. | |
| 5,416,890 A | 5/1995 | Beretta | |
| 5,446,891 A | 8/1995 | Kaplan et al. | |
| 5,481,665 A | 1/1996 | Okada et al. | |
| 5,490,246 A | 2/1996 | Brotsky et al. | |
| 5,504,675 A | 4/1996 | Cragun et al. | |
| 5,522,022 A | 5/1996 | Rao et al. | |
| 5,537,630 A | 7/1996 | Berry et al. | |
| 5,564,002 A | 10/1996 | Brown | |
| 5,564,022 A | 10/1996 | Debnath et al. | |

(Continued)

FOREIGN PATENT DOCUMENTS

| | | |
|---|---|---|
| DE | 102 42 378 | 3/2004 |
| EP | 548586 | 6/1993 |

(Continued)

OTHER PUBLICATIONS

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

(Continued)

*Primary Examiner* — Anil N Kumar
(74) *Attorney, Agent, or Firm* — Fish & Richardson P.C.

(57) ABSTRACT

A dashboard manager can be used to create, manage and deploy dashboards. Each dashboard can include one or more user interface elements ("widgets"). The dashboard manager can be invoked for providing a variety of management functions. In another aspect, dashboards, widgets and other content can be bundled together and distributed to users over a distribution channel. Users can created custom bundles using a tool that is provided for such purpose.

4 Claims, 29 Drawing Sheets

(56) References Cited

U.S. PATENT DOCUMENTS

| | | | |
|---|---|---|---|
| 5,588,098 A | 12/1996 | Chen et al. |
| 5,602,997 A | 2/1997 | Carpenter et al. |
| 5,638,501 A | 6/1997 | Gough et al. |
| 5,644,737 A | 7/1997 | Tuniman et al. |
| 5,644,739 A | 7/1997 | Moursund |
| 5,651,107 A | 7/1997 | Frank et al. |
| 5,657,049 A | 8/1997 | Ludolph et al. |
| 5,659,693 A * | 8/1997 | Hansen et al. ................. 715/779 |
| 5,659,694 A | 8/1997 | Bibayan |
| 5,666,416 A | 9/1997 | Micali |
| 5,666,530 A | 9/1997 | Clark et al. |
| 5,671,343 A | 9/1997 | Kondo et al. |
| 5,689,664 A | 11/1997 | Narayanan et al. |
| 5,708,764 A | 1/1998 | Borrel et al. |
| 5,710,884 A | 1/1998 | Dedrick |
| 5,710,922 A | 1/1998 | Alley et al. |
| 5,721,848 A | 2/1998 | Joseph |
| 5,727,129 A | 3/1998 | Barrett et al. |
| 5,727,135 A | 3/1998 | Webb et al. |
| 5,731,819 A | 3/1998 | Gagne et al. |
| 5,742,285 A | 4/1998 | Ueda |
| 5,742,768 A | 4/1998 | Gennaro et al. |
| 5,754,174 A | 5/1998 | Carpenter et al. |
| 5,760,773 A | 6/1998 | Berman et al. |
| 5,764,229 A | 6/1998 | Bennett |
| 5,764,238 A | 6/1998 | Lum et al. |
| 5,790,120 A | 8/1998 | Lozares et al. |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,838,906 A | 11/1998 | Doyle et al. |
| 5,845,293 A | 12/1998 | Veghte et al. |
| 5,870,734 A | 2/1999 | Kao |
| 5,877,741 A | 3/1999 | Chee et al. |
| 5,877,762 A | 3/1999 | Young et al. |
| 5,878,219 A | 3/1999 | Vance, Jr. et al. |
| 5,883,639 A | 3/1999 | Walton et al. |
| 5,900,876 A | 5/1999 | Yagita et al. |
| 5,903,896 A | 5/1999 | Waldman et al. |
| 5,917,436 A | 6/1999 | Endo et al. |
| 5,920,659 A | 7/1999 | Iverson et al. |
| 5,929,852 A | 7/1999 | Fisher et al. |
| 5,933,148 A | 8/1999 | Oka et al. |
| 5,949,409 A | 9/1999 | Tanaka et al. |
| 5,963,191 A | 10/1999 | Jaaskelainen, Jr. |
| 5,974,238 A | 10/1999 | Chase, Jr. |
| 5,978,579 A | 11/1999 | Buxton et al. |
| 5,991,735 A | 11/1999 | Gerace |
| 5,999,948 A | 12/1999 | Nelson et al. |
| 6,000,000 A | 12/1999 | Hawkins et al. |
| 6,005,568 A | 12/1999 | Simonoff et al. |
| 6,006,231 A | 12/1999 | Popa |
| 6,006,274 A | 12/1999 | Hawkins et al. |
| 6,011,562 A | 1/2000 | Gagne et al. |
| 6,023,708 A | 2/2000 | Mendez et al. |
| 6,031,937 A | 2/2000 | Graffagnino |
| 6,034,621 A | 3/2000 | Kaufman |
| 6,045,446 A | 4/2000 | Ohshima |
| 6,061,695 A | 5/2000 | Slivka et al. |
| 6,075,543 A | 6/2000 | Akeley |
| 6,128,010 A | 10/2000 | Baxter et al. |
| 6,133,915 A | 10/2000 | Arcuri et al. |
| 6,144,381 A | 11/2000 | Lection et al. |
| 6,154,601 A | 11/2000 | Yaegashi et al. |
| 6,160,552 A | 12/2000 | Wilsher et al. |
| 6,166,748 A | 12/2000 | Van Hook et al. |
| 6,167,533 A | 12/2000 | Potterveld et al. |
| 6,178,443 B1 | 1/2001 | Lin |
| 6,188,399 B1 | 2/2001 | Voas et al. |
| 6,191,797 B1 | 2/2001 | Politis |
| 6,195,664 B1 | 2/2001 | Tolfa |
| 6,211,890 B1 | 4/2001 | Ohba |
| 6,232,957 B1 | 5/2001 | Hinckley |
| 6,243,705 B1 | 6/2001 | Kucala |
| 6,246,418 B1 | 6/2001 | Oka |
| 6,253,122 B1 | 6/2001 | Razavi et al. |
| 6,259,432 B1 | 7/2001 | Yamada et al. |
| 6,266,053 B1 | 7/2001 | French et al. |
| 6,266,430 B1 | 7/2001 | Rhoads |
| 6,269,405 B1 | 7/2001 | Dutcher et al. |
| 6,272,484 B1 | 8/2001 | Martin et al. |
| 6,272,558 B1 | 8/2001 | Hui et al. |
| 6,275,831 B1 | 8/2001 | Bodnar et al. |
| 6,278,448 B1 | 8/2001 | Brown et al. |
| 6,278,450 B1 | 8/2001 | Arcuri et al. |
| 6,295,541 B1 | 9/2001 | Bodnar et al. |
| 6,300,947 B1 | 10/2001 | Kanevsky |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,311,232 B1 | 10/2001 | Cagle et al. |
| 6,313,851 B1 | 11/2001 | Matthews, III et al. |
| 6,321,314 B1 | 11/2001 | Van Dyke |
| 6,330,618 B1 | 12/2001 | Bodnar et al. |
| 6,333,753 B1 | 12/2001 | Hinckley |
| 6,344,855 B1 | 2/2002 | Fisher et al. |
| 6,353,437 B1 | 3/2002 | Gagne |
| 6,369,823 B2 | 4/2002 | Ohba |
| 6,369,830 B1 | 4/2002 | Brunner et al. |
| 6,396,520 B1 | 5/2002 | Ording |
| 6,401,104 B1 | 6/2002 | LaRue et al. |
| 6,411,274 B2 | 6/2002 | Watanabe et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh |
| 6,430,576 B1 | 8/2002 | Gates et al. |
| 6,434,744 B1 | 8/2002 | Chamberlain et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,469,714 B2 | 10/2002 | Buxton et al. |
| 6,483,524 B1 | 11/2002 | Petchenkine et al. |
| 6,484,261 B1 | 11/2002 | Wiegel |
| 6,487,560 B1 | 11/2002 | LaRue et al. |
| 6,489,963 B2 | 12/2002 | Parikh et al. |
| 6,493,733 B1 | 12/2002 | Pollack et al. |
| 6,512,522 B1 | 1/2003 | Miller et al. |
| 6,515,682 B1 * | 2/2003 | Washington et al. ......... 715/762 |
| 6,525,736 B1 | 2/2003 | Erikawa et al. |
| 6,526,174 B1 | 2/2003 | Graffagnino |
| 6,535,892 B1 | 3/2003 | LaRue et al. |
| 6,536,041 B1 | 3/2003 | Knudson et al. |
| 6,542,160 B1 | 4/2003 | Abgrall |
| 6,542,166 B1 | 4/2003 | Washington et al. |
| 6,544,295 B1 | 4/2003 | Bodnar |
| 6,571,245 B2 | 5/2003 | Huang et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,633,315 B1 | 10/2003 | Sobeski et al. |
| 6,636,214 B1 | 10/2003 | Leather et al. |
| 6,639,595 B1 | 10/2003 | Drebin et al. |
| 6,644,046 B2 | 11/2003 | Roh et al. |
| 6,661,426 B1 | 12/2003 | Jetha et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,687,745 B1 | 2/2004 | Franco et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,714,221 B1 | 3/2004 | Christie et al. |

(56) References Cited

U.S. PATENT DOCUMENTS

| | | |
|---|---|---|
| 6,715,053 B1 | 3/2004 | Grigor |
| 6,717,599 B1 | 4/2004 | Olano |
| 6,724,403 B1 | 4/2004 | Santoro et al. |
| 6,734,864 B2 | 5/2004 | Abgrall |
| 6,738,804 B1 | 5/2004 | Lo |
| 6,741,242 B1 | 5/2004 | Itoh et al. |
| 6,742,042 B1 | 5/2004 | Holden et al. |
| 6,757,691 B1 | 6/2004 | Welsh et al. |
| 6,757,698 B2 | 6/2004 | McBride et al. |
| 6,760,046 B2 | 7/2004 | I'Anson et al. |
| 6,765,592 B1 | 7/2004 | Pletcher et al. |
| 6,788,318 B2 | 9/2004 | Chen |
| 6,792,616 B1 | 9/2004 | Jerding et al. |
| 6,795,060 B2 | 9/2004 | Rekimoto et al. |
| 6,806,892 B1 | 10/2004 | Plow et al. |
| 6,882,979 B1 | 4/2005 | Reay et al. |
| 6,892,360 B1 | 5/2005 | Pabla et al. |
| 6,906,720 B2 | 6/2005 | Emberling et al. |
| 6,910,000 B1 | 6/2005 | Yedidia et al. |
| 6,910,052 B2 | 6/2005 | Gates et al. |
| 6,911,984 B2 | 6/2005 | Sabella et al. |
| 6,918,091 B2 | 7/2005 | Leavitt et al. |
| 6,925,477 B1 | 8/2005 | Champagne et al. |
| 6,931,633 B1 | 8/2005 | Vazquez et al. |
| 6,944,829 B2 | 9/2005 | Dando |
| 6,993,721 B2 | 1/2006 | Rosin et al. |
| 7,007,041 B2 | 2/2006 | Multer et al. |
| 7,007,242 B2 | 2/2006 | Suomela et al. |
| 7,016,011 B2 | 3/2006 | De Haan |
| 7,024,381 B1 | 4/2006 | Hastings et al. |
| 7,027,055 B2 | 4/2006 | Anderson et al. |
| 7,028,264 B2 | 4/2006 | Santoro et al. |
| 7,036,083 B1 | 4/2006 | Zenith |
| 7,050,955 B1 | 5/2006 | Carmel et al. |
| 7,076,730 B1 | 7/2006 | Baker |
| 7,082,577 B1 | 7/2006 | Brosnahan |
| 7,085,994 B2 | 8/2006 | Gvily |
| 7,127,509 B2 | 10/2006 | Wu |
| 7,216,351 B1 | 5/2007 | Maes |
| 7,222,155 B1 | 5/2007 | Gebhardt et al. |
| 7,260,380 B2 | 8/2007 | Dietl et al. |
| 7,346,766 B2 | 3/2008 | Mackin et al. |
| 7,353,465 B2 | 4/2008 | Callaway et al. |
| 7,356,816 B2 | 4/2008 | Goodman et al. |
| 7,392,483 B2 | 6/2008 | Wong et al. |
| 7,401,104 B2 | 7/2008 | Shah et al. |
| 7,426,687 B1 | 9/2008 | Schultz et al. |
| 7,437,485 B1 | 10/2008 | Kruglikov et al. |
| 7,472,350 B2 | 12/2008 | Hintermeister et al. |
| 7,478,326 B2 | 1/2009 | Holecek et al. |
| 7,490,295 B2 | 2/2009 | Chaudhri et al. |
| 7,502,838 B2 | 3/2009 | Franco et al. |
| 7,503,010 B2 | 3/2009 | Chaudhri et al. |
| 7,516,158 B2 | 4/2009 | Drukman et al. |
| 7,523,401 B1 | 4/2009 | Aldridge |
| 7,530,026 B2 | 5/2009 | Chaudhri et al. |
| 7,546,543 B2 | 6/2009 | Louch et al. |
| 7,546,554 B2 | 6/2009 | Chiu et al. |
| 7,552,397 B2 | 6/2009 | Holecek et al. |
| 7,568,165 B2 | 7/2009 | Amadio et al. |
| 7,613,834 B1 | 11/2009 | Pallipuram et al. |
| 7,614,011 B2 | 11/2009 | Karidis et al. |
| 7,644,391 B2 | 1/2010 | Fisher et al. |
| 7,657,837 B2 | 2/2010 | Shappir et al. |
| 7,676,483 B2 | 3/2010 | Klug |
| 7,698,658 B2 | 4/2010 | Ohwa et al. |
| 7,730,082 B2 | 6/2010 | Sah et al. |
| 7,752,556 B2 | 7/2010 | Forstall et al. |
| 7,756,723 B2 | 7/2010 | Rosow et al. |
| 7,761,800 B2 | 7/2010 | Chaudhri et al. |
| 7,765,326 B2 | 7/2010 | Robbin et al. |
| 7,765,493 B2* | 7/2010 | Chickles et al. ............... 715/853 |
| 7,784,065 B2 | 8/2010 | Polivy et al. |
| 7,793,222 B2 | 9/2010 | Chaudhri et al. |
| 7,793,227 B2* | 9/2010 | Wada et al. .................. 715/779 |
| 7,793,232 B2* | 9/2010 | Chaudhri et al. ............. 715/802 |
| 7,797,446 B2 | 9/2010 | Heller et al. |
| 7,802,246 B1 | 9/2010 | Kennedy et al. |
| 7,814,148 B2 | 10/2010 | Bell et al. |
| RE41,922 E | 11/2010 | Gough et al. |
| 7,873,908 B1* | 1/2011 | Varanasi et al. ............... 715/763 |
| 7,873,910 B2 | 1/2011 | Chaudhri et al. |
| 7,925,976 B2 | 4/2011 | Shin et al. |
| 7,945,855 B2 | 5/2011 | Altman et al. |
| 7,996,783 B2* | 8/2011 | Ramsey et al. ................ 715/764 |
| 8,001,476 B2 | 8/2011 | Gallo |
| 8,126,774 B2 | 2/2012 | Hendrickson et al. |
| 8,245,027 B2 | 8/2012 | Bear et al. |
| 8,260,353 B2 | 9/2012 | Hugot |
| 8,302,020 B2 | 10/2012 | Louch et al. |
| 2001/0017632 A1 | 8/2001 | Goren-Bar |
| 2001/0019338 A1 | 9/2001 | Roth |
| 2001/0030647 A1 | 10/2001 | Sowizral et al. |
| 2001/0035885 A1 | 11/2001 | Iron et al. |
| 2002/0013822 A1 | 1/2002 | West |
| 2002/0026474 A1 | 2/2002 | Wang et al. |
| 2002/0049788 A1 | 4/2002 | Lipkin et al. |
| 2002/0054148 A1 | 5/2002 | Okada |
| 2002/0054541 A1 | 5/2002 | Hall |
| 2002/0059594 A1 | 5/2002 | Rasmussen et al. |
| 2002/0065946 A1 | 5/2002 | Narayan |
| 2002/0066279 A1 | 6/2002 | Kiyomatsu |
| 2002/0067376 A1 | 6/2002 | Martin et al. |
| 2002/0067418 A1 | 6/2002 | I |
| 2002/0078255 A1 | 6/2002 | Narayan |
| 2002/0078453 A1 | 6/2002 | Kuo |
| 2002/0085037 A1 | 7/2002 | Leavitt et al. |
| 2002/0087632 A1 | 7/2002 | Keskar |
| 2002/0089526 A1 | 7/2002 | Buxton et al. |
| 2002/0093516 A1 | 7/2002 | Brunner et al. |
| 2002/0099678 A1 | 7/2002 | Albright et al. |
| 2002/0105548 A1 | 8/2002 | Hayton et al. |
| 2002/0111934 A1 | 8/2002 | Narayan |
| 2002/0112180 A1 | 8/2002 | Land et al. |
| 2002/0114466 A1 | 8/2002 | Tanaka et al. |
| 2002/0118217 A1 | 8/2002 | Fujiki |
| 2002/0120673 A1 | 8/2002 | Tolson et al. |
| 2002/0123739 A1 | 9/2002 | Haacke et al. |
| 2002/0129092 A1 | 9/2002 | Tolson et al. |
| 2002/0133508 A1 | 9/2002 | LaRue et al. |
| 2002/0140740 A1 | 10/2002 | Chen |
| 2002/0147782 A1 | 10/2002 | Dimitrova et al. |
| 2002/0152098 A1 | 10/2002 | Evans et al. |
| 2002/0156798 A1 | 10/2002 | LaRue et al. |
| 2002/0158902 A1 | 10/2002 | Hooker et al. |
| 2002/0171682 A1 | 11/2002 | Frank et al. |
| 2002/0174003 A1 | 11/2002 | Redmann et al. |
| 2002/0174055 A1 | 11/2002 | Dick et al. |
| 2002/0174181 A1 | 11/2002 | Wei |
| 2002/0180798 A1 | 12/2002 | Poor et al. |
| 2002/0186257 A1 | 12/2002 | Cadiz et al. |
| 2002/0194090 A1 | 12/2002 | Gagnon et al. |
| 2002/0196268 A1 | 12/2002 | Wolff et al. |
| 2003/0008661 A1 | 1/2003 | Joyce et al. |
| 2003/0008711 A1 | 1/2003 | Corbo |
| 2003/0009267 A1 | 1/2003 | Dunsky et al. |
| 2003/0018971 A1 | 1/2003 | McKenna, Jr. |
| 2003/0020671 A1 | 1/2003 | Santoro et al. |
| 2003/0046316 A1 | 3/2003 | Gergic et al. |
| 2003/0061482 A1 | 3/2003 | Emmerichs |
| 2003/0067489 A1 | 4/2003 | Candy Wong et al. |
| 2003/0069904 A1 | 4/2003 | Hsu et al. |
| 2003/0076369 A1 | 4/2003 | Resner et al. |
| 2003/0079038 A1 | 4/2003 | Robbin et al. |
| 2003/0080995 A1 | 5/2003 | Tenenbaum et al. |
| 2003/0097659 A1 | 5/2003 | Goldman |
| 2003/0101046 A1 | 5/2003 | Krasnov |
| 2003/0122787 A1 | 7/2003 | Zimmerman et al. |
| 2003/0123739 A1 | 7/2003 | Graffagnino |
| 2003/0125057 A1 | 7/2003 | Pesola |
| 2003/0125962 A1 | 7/2003 | Holliday et al. |
| 2003/0130984 A1 | 7/2003 | Quinlan et al. |
| 2003/0146934 A1 | 8/2003 | Bailey et al. |
| 2003/0154239 A1 | 8/2003 | Davis et al. |

(56) References Cited

U.S. PATENT DOCUMENTS

| | | |
|---|---|---|
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0206195 A1 | 11/2003 | Matsa et al. |
| 2003/0208685 A1 | 11/2003 | Abdel-Rahman |
| 2004/0003402 A1 | 1/2004 | McKenna, Jr. |
| 2004/0012626 A1 | 1/2004 | Brookins |
| 2004/0015942 A1 | 1/2004 | Branson et al. |
| 2004/0024616 A1 | 2/2004 | Spector et al. |
| 2004/0032409 A1 | 2/2004 | Girard |
| 2004/0036711 A1 | 2/2004 | Anderson |
| 2004/0039934 A1 | 2/2004 | Land et al. |
| 2004/0054711 A1 | 3/2004 | Multer |
| 2004/0070629 A1 | 4/2004 | Seifert |
| 2004/0078814 A1 | 4/2004 | Allen |
| 2004/0090969 A1 | 5/2004 | Jerrard-Dunne et al. |
| 2004/0117831 A1 | 6/2004 | Ellis et al. |
| 2004/0119754 A1 | 6/2004 | Bangalore et al. |
| 2004/0125128 A1 | 7/2004 | Chang et al. |
| 2004/0142711 A1 | 7/2004 | Mahonen et al. |
| 2004/0179019 A1 | 9/2004 | Sabella et al. |
| 2004/0181580 A1 | 9/2004 | Baranshamaje |
| 2004/0183800 A1 | 9/2004 | Peterson |
| 2004/0194020 A1 | 9/2004 | Beda et al. |
| 2004/0199574 A1 | 10/2004 | Franco et al. |
| 2004/0203684 A1 | 10/2004 | Jokinen et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0225955 A1 | 11/2004 | Ly |
| 2004/0230911 A1 | 11/2004 | Bent et al. |
| 2004/0237082 A1 | 11/2004 | Alcazar et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0057497 A1 | 3/2005 | Kawahara |
| 2005/0060655 A1 | 3/2005 | Gray et al. |
| 2005/0060661 A1 | 3/2005 | Kawahara et al. |
| 2005/0076305 A1 | 4/2005 | Hintermeister et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0091690 A1 | 4/2005 | Delpuch et al. |
| 2005/0093868 A1 | 5/2005 | Hinckley |
| 2005/0114021 A1 | 5/2005 | Krull et al. |
| 2005/0144563 A1 | 6/2005 | Hough et al. |
| 2005/0144595 A1 | 6/2005 | McLean |
| 2005/0149458 A1 | 7/2005 | Eglen et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1 | 9/2005 | Matthews et al. |
| 2005/0215310 A1 | 9/2005 | Boyd et al. |
| 2005/0221808 A1 | 10/2005 | Karlsson et al. |
| 2005/0229118 A1 | 10/2005 | Chiu et al. |
| 2005/0234884 A1 | 10/2005 | Drukman et al. |
| 2005/0240857 A1 | 10/2005 | Benedict et al. |
| 2005/0243373 A1 | 11/2005 | Silverbrook et al. |
| 2005/0256940 A1 | 11/2005 | Henderson et al. |
| 2005/0278651 A1 | 12/2005 | Coe et al. |
| 2005/0282612 A1 | 12/2005 | Mathews |
| 2005/0283734 A1 | 12/2005 | Santoro et al. |
| 2006/0001652 A1 | 1/2006 | Chiu et al. |
| 2006/0004913 A1 | 1/2006 | Chong |
| 2006/0005207 A1 | 1/2006 | Louch et al. |
| 2006/0010394 A1 | 1/2006 | Chaudhri et al. |
| 2006/0015818 A1 | 1/2006 | Chaudhri et al. |
| 2006/0015846 A1 | 1/2006 | Fraleigh et al. |
| 2006/0031264 A1 | 2/2006 | Bosworth et al. |
| 2006/0031587 A1 | 2/2006 | Paterson et al. |
| 2006/0036703 A1 | 2/2006 | Fulmer et al. |
| 2006/0036941 A1 | 2/2006 | Neil |
| 2006/0036969 A1 | 2/2006 | Guido et al. |
| 2006/0041879 A1* | 2/2006 | Bower et al. .................. 717/162 |
| 2006/0053384 A1 | 3/2006 | La Fetra et al. |
| 2006/0059437 A1 | 3/2006 | Conklin |
| 2006/0064422 A1 | 3/2006 | Arthurs et al. |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107229 A1 | 5/2006 | Matthews et al. |
| 2006/0107231 A1 | 5/2006 | Matthews et al. |
| 2006/0112123 A1* | 5/2006 | Clark et al. .................... 707/101 |
| 2006/0123356 A1 | 6/2006 | Sobeski et al. |
| 2006/0123359 A1 | 6/2006 | Schatzberger et al. |
| 2006/0136843 A1 | 6/2006 | Shafron |
| 2006/0150118 A1 | 7/2006 | Chaudhri et al. |
| 2006/0154649 A1 | 7/2006 | Pedersen et al. |
| 2006/0156228 A1 | 7/2006 | Gallo et al. |
| 2006/0156248 A1 | 7/2006 | Chaudhri et al. |
| 2006/0167704 A1 | 7/2006 | Nicholls et al. |
| 2006/0168536 A1 | 7/2006 | Portmann |
| 2006/0168538 A1* | 7/2006 | Stevens et al. ................ 715/779 |
| 2006/0174202 A1 | 8/2006 | Bonner |
| 2006/0200775 A1 | 9/2006 | Behr et al. |
| 2006/0205517 A1 | 9/2006 | Malabuyo et al. |
| 2006/0218499 A1 | 9/2006 | Matthews et al. |
| 2006/0230272 A1 | 10/2006 | Lawrence et al. |
| 2006/0236257 A1 | 10/2006 | Othmer et al. |
| 2006/0248471 A1* | 11/2006 | Lindsay et al. ............... 715/800 |
| 2006/0253794 A1* | 11/2006 | Wilson ........................... 715/779 |
| 2006/0277469 A1 | 12/2006 | Chaudhri et al. |
| 2006/0282574 A1 | 12/2006 | Zotov et al. |
| 2007/0011026 A1* | 1/2007 | Higgins et al. .................... 705/2 |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0078953 A1 | 4/2007 | Chai et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101297 A1 | 5/2007 | Forstall et al. |
| 2007/0101433 A1 | 5/2007 | Forstall et al. |
| 2007/0112739 A1 | 5/2007 | Burns et al. |
| 2007/0118813 A1* | 5/2007 | Forstall et al. ................ 715/805 |
| 2007/0129888 A1 | 6/2007 | Rosenberg |
| 2007/0130523 A1 | 6/2007 | Ku et al. |
| 2007/0130541 A1 | 6/2007 | Louch et al. |
| 2007/0157119 A1* | 7/2007 | Bishop .......................... 715/810 |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0273558 A1 | 11/2007 | Smith et al. |
| 2007/0300185 A1 | 12/2007 | Macbeth et al. |
| 2007/0300225 A1 | 12/2007 | Macbeth et al. |
| 2008/0034309 A1 | 2/2008 | Louch et al. |
| 2008/0034314 A1 | 2/2008 | Louch et al. |
| 2008/0052348 A1 | 2/2008 | Adler et al. |
| 2008/0097906 A1 | 4/2008 | Williams et al. |
| 2008/0126937 A1 | 5/2008 | Pachet |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0288578 A1 | 11/2008 | Silverberg |

(56) References Cited

U.S. PATENT DOCUMENTS

| | | |
|---|---|---|
| 2009/0005071 A1 | 1/2009 | Forstall et al. |
| 2009/0021486 A1 | 1/2009 | Chaudhri et al. |
| 2009/0024943 A1 | 1/2009 | Adler et al. |
| 2009/0024944 A1 | 1/2009 | Louch et al. |
| 2009/0044138 A1 | 2/2009 | Rudolph et al. |
| 2009/0077493 A1 | 3/2009 | Hempel et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0228824 A1 | 9/2009 | Forstall et al. |
| 2009/0260022 A1 | 10/2009 | Louch et al. |
| 2009/0264198 A1 | 10/2009 | Takahashi et al. |
| 2009/0271724 A1 | 10/2009 | Chaudhri et al. |

FOREIGN PATENT DOCUMENTS

| | | |
|---|---|---|
| EP | 0694879 | 1/1996 |
| EP | 0 908 835 | 4/1999 |
| EP | 1 237 076 | 9/2002 |
| EP | 1383080 | 1/2004 |
| EP | 0972273 | 3/2004 |
| JP | 8-211167 | 8/1996 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 02/25382 | 3/2002 |
| WO | WO 03/023593 | 3/2003 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2009/012319 | 12/2009 |
| WO | WO 2009/012330 | 12/2009 |

OTHER PUBLICATIONS

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.
Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.
Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.
Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.
Conner Borookshire D. et al. "Three-Dimensional Widgets" ACM 1992, 8 pages.
Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.
Fried, Ina, "For Apple's Tiger, the Keyword is Search", CNET News.com, Jun. 28, 2004 [online Retrieved on Jul. 1, 2004] Retrieved from the Internet URL:http://zdnet.com.com/2102-1103_2-5250346.html?tag=printthis, 2 pages.
Guber, John et al., "Dashboard vs. Konfabulator", Jun. 2004, 9 pages.
Haeberli, P. et al., "The Accumulation Buffer: Hardware Support for High-Quality Rendering," Computer Graphics, Aug. 1990, pp. 309-318, vol. 24, No. 4.
Http://en.wikipedia.org/wiki/Comparison_of_widget_engines, 2007, 6 pages.
http://en.wikipedia.org/wiki/Windows-Sidebar, 2007, 7 pages.
http://www.nat.org/dashboard/blog.php3 Dec. 2003, 31 pages.
International Search Report, PCT/US2005/008804, Jul. 27, 2005, 3 pages.
International Search Report and Writen Opinion, PCT/US2005/022152, Jul. 10, 2006, 8 pages.
International Search report, PCT/US2005/008805, Aug. 8, 2005, 3 pages.
Konfabulator, "Cupertino, Start your Photocopier!," [online] [Retrieved on Jul. 1, 2004] Retrieved from the Internet <URL: http://www.konfabulator.com>, 1 page.
Konfabulator, "Konfabulator & Widget Basics," [online] [Retrieved on Jul. 1, 2004] Retrieved from the Internet <URL: http://www.konfabulator.com/info/basics.html>, 3 pages.
Konfabulator, "Screenshots," [online] [Retrieved on Jul. 1, 2004] Retrieved from the Internet <URL: http://www.konfabulator.com/info/screenshots.html>, 2 pages.
Konfabulator, "What is Konfabulator?," [online] [Retrieved on Jul. 1, 2004] Retrieved from the Internet <URL: http://www.konfabulator.com/info/, 3 pages.
Lammers, J.., et al., "Maya 4.5 Fundamentals: Particles," New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.
Notification of Transmittal of the International Search Report and the Written Opinion of the International Searching Authority, PCT/US2005/022579, 15 pages.
Nvidia, "CG—Teaching Cg," Power Point Presentation, Author and date unknown, pp. 1-16.
Puder, A., "Extending Desktop Applications to the Web," ACM International Conference Proceedings Series, Proceedings of the Jun. 2004 International Symposium on Information and Communication Technologies, 2004, vol. 90, 6 pages.
Segal, Mark and Akeley, Kurt, "The OpenGL Graphics System: A Specification (Version 1.5)," Copyright 1992-2003 Silicon Graphics, Inc., Oct. 30, 2003, 334 pages.
Shantzis, Michael A., "A Model for Efficient and Flexible Image Computing," Computer Graphics Proceedings, Annual Conference Series, Orlando, Florida, Jul. 24-29, 1994, pp. 147-154.
Shiozawa, Hidekazu et al., "Perspective Layered Visualization of Collaborative Workspaces," Proceedings of the International ACM SIGGROUP conference on Supporting Group Work Publisher, Nov. 1999, 5 pages.
Snippet Software Inc. et al. "Corporate Portal Newsletter" Oct. 2000, 3 pages.
Snippet Software Inc. et al. "Snippets Software" Jun. 2001, 16 pages.
Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3 Dec. 2003, 8 pages.
Stardock.com et al. "DesktopX Whitepaper and users Guide" 1999, 72 pages.
Tang, J.C. et al., "ConNexus to Awarenex: Extending Awareness to Mobile Users," SIGCHI '01, AMC, Mar. 31-Apr. 4, 2001, 8 pages.
Van Gelder, Allen, and Kwansik, Kim, "Direct Volume Rendering with Shading via Three-Dimensional Textures," Computer Science Dept., Univ. of California, Santa Cruz, CA 95064, 9 pages.
Wardell, Brad, Konfabulator for Windows, Jan. 10, 2004; [online] Retrieved from the Internet Mar. 6, 2006] Retrieved from the Internet: URL: http://www.xpthemes.com/forums.asp?MID=19&CMID=19&AID=4472, 6 pages.
Louch et al., "Multidimensional Widgets", U.S. Appl. No. 12/612,301, filed Nov. 4, 2009.
Warren, "The VMware Workstation 5 Handbook", Jun. 2005, Course Technology PTR, 50 pages.
"About Merkitys"; [online] [Retrieved on Feb. 4, 2008]; Retrieved from the Internet, URL: http://meaning.3xi.org/; 3 pages.
"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.
"Comparison of widget engines", [online] Retrieved from the Internet, URL: http://en.wikipedia.org/wiki/Comparison_of_widget_engines, 2007; 4 pages.

(56) References Cited

OTHER PUBLICATIONS

"Coolsmartphone"; Apr. 17, 2006, [online] [Retrieved on Sep. 11, 2009]; Retrieved from the Internet, URL: http://www.web.archive.org/web/20060417080115/http://www.coolsmartphone.com/article569.html; 24 pages.

"Dashboard Blog", Dec. 11, 2003, [online] [Retrieved from the Internet on May 11, 2007], URL: http://www.nat.org/dashboard/blog.php3, 31pages.

"Desktop Sidebar", [online] [Retrieved on May 11, 2007] Retrieved from the Internet URL: http://web.archive.org/web/20040101160831/http://www.desktopsidebar.com/; 5 pages.

"Garmin hits iphone directly with nuvifone"; [online] [Retrieved on Mar. 17, 2008]; Retrieved from the Internet, URL: http://www.electronista.com/print/50764; 3 pages.

Garmin® nüvifone™ Images, [online] [Retrieved from the Internet on Feb. 4, 2008], URL: http://www8.garmin.com/buzz/nuvifone/media_gallery.jsp; 2 pages.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

"Go View Map Save to Favorites Cancel"; [online] [Retrieved on Feb. 4, 2008], Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006], Retrieved from the Internet at URL: http://www.dailywireless.org/modules.php?name=News&file=article&sid=4613; 3 pages.

"International Roaming Guide—Personal Experience(s) from Customer and Community Member"; [online] [Retrieved on Jun. 26, 2006], Retrieved from the Internet, URL: http://forums.cingular.com/cng/board/message?board.id=international&message.id=1185; 6 pages.

"Inter-widget communication?", [online] [Retrieved on Jun. 5, 2009], Retrieved from the Internet URL: http://www2.konfabulator.com/forums/lofiversion/index.php/t125.html; 3 pages.

"MOREnet Dialing Plan: PSTN and IP Network Integration for H.323, H320 VoIP and Public Voice Networks", [online] [Retrieved on Jan. 11, 2008] Retrieved from the Internet, URL: http://www.more.net/technical/research/dialplan/index.html; 12 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.

"Portlet-to-portlet communication between JSR 168 portlets on public pages.", Apr. 5, 2006, [online]; Retrieved from the Internet URL: http://www.ibm.developerworks/websphere/library/techarticles/0604_scott/0604_scott.html; 9 pages.

"Snap, Map and Share Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

"Starfish Software Introduces Starfish Internet Sidekick; Starfish Internet Sidekick is the best way for Internet users to manage their calendar, contacts and communications," Business Wire, Sep. 23, 1996, [online] [Retrieved on Dec. 8, 2008]; Retrieved from the Internet URL: http://findarticles.com/articles/mi_mOEIN/is_1996_Sept_23/ai_18704672?tag=rel.res1; 2 pages.

"Welcome to the Gigaplex!™", Lazar Productions, Nov. 1996, [online] [Retrieved on Dec. 8, 2008]; Retrieved from the Internet URL: http://web.archive.org/web/19961105081827/www.gigaplex.com/; 4 pages.

"Windows Sidebar", Wikipedia [online] [Retrieved on May 11, 2007] Retrieved from the Internet, URL:http://en.wikipedia.org/wiki/Windows-Sidebar, 2007, 2 pages.

"Convert just about Anything to Anything else", Online Conversion.com, [online] [Retrieved on Jun. 22, 2008]; Retrieved from the Internet, URL: http://web.archive.org/web/20000815055422/http://www.onlineconversion.com/; 2 pages.

"Objects, Images and Applets," [online] [Archived by http://archivve.org; Retrieved on Apr. 13, 2006], Retrieved from the Internet URL: http://web.archivve.org/web/20030210154019/http://www.w3.org/TR/REC-html140/struct/objects.html; 21 pages.

"Writing a Desk Accessory," Developer Connection, Apple Computer, Inc., Jul. 3, 1996, [online] [Retrieved on May 11, 2009] Retrieved from the Internet URL: http://developer.apple.com/documentation/mac/devices/devices-16.html, 4 pages.

Akeley et al., "Real-Time Graphics Architecture," http://www.grahics.stanford.edu/courses/cs448a-01-fall, the OpenGL® Graphics System, CS448 Lecture 15, Fall, 2001, pp. 1-20.

Akeley, "Cg—Teaching Cg," Power Point Presentation, NVIDIA Corporation, 2002; 1 page.

Altman, "Visual QuickStart Guide PowerPoint 2000/98, Applying Preset Animations", ProQuest Safari Books, Peachpit Press, May 7, 1999, [online] Retrieved from the Internet: URL: http://proquest.safaribooksonline.com/0201354411; 7 pages.

BabelFish.com, Inc., Oct. 2003, [online] [Retrieved on Dec. 8, 2008]; Retrieved from the Internet URL: http://web.archive.org/web/20031002115902/www.babelfish.com/en/index.html; 1 page.

Baratz et al., "DesktopX 3/1", Ars Technica, Nov. 17, 2005, [online] [Retrieved on Aug. 1, 2008]; Retrieved from the Internet URL: http://arstechnica.com/reviews/apps/desktopx/ars; 4 pages.

Beier et al., "The Bull's-Eye: A Framework for Web Application User Interface Design Guidelines", Proceedings of the Sigchi Conference on Human Factors in Computing Systems, Apr. 2003, pp. 489-496.

Cadiz et al., "Slideshow: Providing Peripheral Awareness of Important Information," Technical Report MSR-TR-2001-83, Microsoft Corporation, Redmond, WA; Sep. 14, 2001; 9 pages.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, Oct. 12-15, 2003, pp. 975-978.

Chinese Notification of First Office Action, Chinese Patent Application No. 200580016349.3, Jul. 25, 2008, 21 pages.

Conner et al. "Three-Dimensional Widgets" ACM 1992, pp. 183-188 and 230-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a copycat," CNET News.com, Jun. 28, 2004 [online] Retrieved on May 6, 2009], Retrieved from the Internet URL: http://news.cnet.com2100-1045_3-5250692.html; 2 pages.

Fried, Ina, "For Apple's Tiger, the kyword is search", CNET News.com, Jun. 28, 2004, [online] [Retrieved on May 5, 2009], Retrieved from the Internet URL: http://web.archive.org/web20040823135016/http://zdnet.com-com/2102-1103_2-5250346.html; 2 pages.

Gruber et al., "Dashboard vs. Konfabulator", Jun. 2004; 10 pages.

Haeberli et al., "The Accumulation Buffer: Hardware Support for High-Quality Rendering," Computer Graphics, Aug. 1990, 24(4):309-318.

Han, "Bi-manual, multi-point, and multi-user interactions on a graphical interaction surface", Multi-Touch Interaction Research; [online] [Retrieved on Apr. 13, 2006], Retrieved from the Internet, URL: http://mr1.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

International Search Report and the Written Opinion, dated Jan. 27, 2006, issued in International Application No. PCT/US2005/022579; 15 pages.

International Search Report and the Written Opinion, dated May 8, 2008, issued in International Application PCT/US2007/077441; 17 pages.

International Search Report, dated Aug. 8, 2005, issued in International Application PCT/US2005/008805; 3 pages.

International Search Report, dated Jul. 10, 2006, issued in International Application PCT/US2005/022152; 1 page.

(56) References Cited

OTHER PUBLICATIONS

International Search Report, dated Jul. 27, 2005, issued in International Application PCT/US2005/008804; 3 pages.
Invitation to Pay Additional Fees and Communication Relating to the Results of the Partial International Search, dated Jan. 28, 2008, issued in International Application PCT/US2007/077441; 8 pages.
Invitation to Pay Additional Fees and Communication Relating to the Results of the Partial International Search, dated Jul. 29, 2008, issued in International Application PCT/US2008/050295; 10 pages.
Invitation to Pay Additional Fees and Communication Relating to the Results of the Partial International Search, dated May 15, 2009, issued in International Application No. PCT/US2008/050047; 11 pages.
International Search Report and Written Opinion, dated Sep. 3, 2009, issued in International Application No. PCT/US2008/050047; 17 pages.
Invitation to Pay Additional Fees and Communication Relating to the Results of the Partial International Search, dated May 8, 2009, issued in International Application PCT/US2008/050038; 19 pages.
JavaBoutique, [online], Retrieved from the Internet URL: http://javaboutique.internet.com/utilities/counter.html; Oct. 1, 2002; 2 pages.
Konfabulator, "Cupertino, Start your Photocopiers!," [online] [Retrieved on Jul. 1, 2004]; Retrieved from the Internet URL: http://www.konfabulator.com, 1 page.
Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.
Konfabulator, "Konfabulator & Widget Basics", [online] [Retrieved on Jul. 1, 2004]; Retrieved from the Internet URL: http://www.konfabulator.com/info/basics.html, 3 pages.
Konfabulator, "Screenshots," [online] [Retrieved on Jul. 1, 2004]; Retrieved from the Internet URL: http://www.konfabulator.com/info/screenshots.html, 2 pages.
Konfabulator, "What is Konfabulator?," [online] [Retrieved on Jul. 1, 2004]; Retrieved from the Internet URL: http://www.konfabulator.com/info/; 3 pages.
Lammers et al., "Maya 4.5 Fundamentals: Particles", New Riders Publishing, Jan. 14, 2003, [online] [Retrieved on Feb. 17, 2007] Retrieved from the Internet URL: http://proquest.safaribooksonline.com/0735713278; 12 pages.
Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.
Microsoft Corporation, "User's Guide Microsoft® Windows™ and MS-DOS® 6", 1993, pp. Cover-xvi, 112-121.
Movies.com, Jan. 2002, [online] [Retrieved on Dec. 8, 2008]; Retrieved from the Internet URL: http://www.archive.org/web/20020118102516/movies.go.com; 1 page.
Pruder, A., "Extending Desktop Applications to the Web," ACM International Conference Proceedings Series, Proceedings of the Jun. 2004 International Symposium on Information and Communication Technologies, 2004, vol. 90, 6 pages.
Rist et al., "Customizing Graphics for Tiny Displays of Mobile Devices", Personal and Ubiquitous Computing, 2002, vol. 6, pp. 260-268.
Rochkind, M. et al., "Common Elements in Today's Graphical User Interfaces: The Good, the Bad, and the Ugly," Interchi '93, AMC, Apr. 24-29, 1993, pp. 470-473.
Segal et al., "The OpenGL® Graphics System: A Specification (Version 1.5)", © 1992-2003 Silicon Graphics, Inc., Oct. 30, 2003, 333 pages.
Shantzis, "A Model for Efficient and Flexible Image Computing," Computer Graphics Proceedings, Annual Conference Series, Orlando, Florida, Jul. 24-29, 1994, pp. 147-154.
Shiozawa et al., "Perspective Layered Visualization of Collaborative Workspaces," Proceedings of the International ACM SIGGROUP conference on Supporting Group Work Publisher, Nov. 1999, 10 pages.
Siracusa, "Mac OS X 10.4 Tiger: Dashboard", Apr. 28, 2005, [online] [Retrieved on Aug. 1, 2008] Retrieved from the Internet URL: http://arstechnica.com/reviews/os/macosx-10-4.ars/17; 7 pages.
Snippet Software, "Product Spotlight Non-browser based portal solution from Snippets Software", Corporate Portal Newsletter, Oct. 2000, vol. 1, No. 10, 3 pages.
Snippet Software, "Snippets Infomration Delivery Platform", [online] [Retrieved on Jun. 11, 2001]; Retrieved from the Internet URL: http://www.snippets.com/products/; 19 pages.
Snippets Software, "Products Overview", Feb. 2002, [online] [Retrieved on Feb. 5, 2008] Retrieved from the Internet URL: http://web.archive.org/web/20020206061508/http://www.snippets.com/products/; 2 pages.
Staples, "Representation in Virtual Space: Visual Convention in the Graphical User Interface," Proceedings of the SIGCHI Conference on Human Factors in Computing Systems, Apr. 1993 [online] [Retrieved on Dec. 2003] Retrieved from the Internet URL: http://www.nat.org/dashboard/blog.php3 Dec. 2003; 8 pages.
Stardock, "Gallactica Civilization: Dread Lords—User Manual", Stardock Entertainment © 2006; 65 pages.
Stardock, "Your Edge in Software", [online] [Retrieved on May 11, 2007]; Retrieved from the Internet URL: http://www.stardock.com/media.asp?cmd=mediakits; 56 pages.
Stardock, "DesktopX General Guide," Aug. 2000, [online] [Retrieved on Jan. 31, 2008]; Retrieved from the Internet URL:http://www.stardock.com/products/desktopx/docs/; 28 pages.
Stardock, "DesktopX Tutorial", Aug. 2000, [online] [Retrieved on Jan. 31, 2008]; Retrieved from the Internet URL:http://www.stardock.com/products/desktopx/tutorial.html; 40 pages.
Stardock, "DesktopX WhitePaper", Aug. 2000, [online] [Retrieved on Jan. 31, 2008]; Retrieved from the Internet URL: http://www.stardock.net/media/whitepaper_desktopx.html; 15 pages.
Stardock, "The User Guide—Version 2", DesktopX 2000; 57 pages.
Stardock, "What Can It Do? Making Objects", DesktopX Tutorial, 2001, [online] [Retrieved on Apr. 11, 2008]; Retrieved from the Internet URL: http://web.archive.org/web/20011019222825/http://www.stardock.com/products/desktopx/ . . . ; 6 pages.
Tang et al., "ConNex to Awarenex: Extending Awareness to Mobile Users," SIGCHI '01, AMC, Mar. 31-Apr. 4, 2001, 8 pages.
Thomas et al., "Animating Widgets in the InterViews Toolkit", Lecture Notes in Computer Science, pp. 26-44, 1995.
Van Gelder et al., "Direct Volume Rendering with Shading via Three-Dimensional Textures," Computer Science Dept., Univ. of California, Santa Cruz, CA 95064, Jul. 19, 1996; 17 pages.
VMware™, "VMware™ Workstation User's Manual, Version 3.2", 2002; cover, pp. 12-13.
Wardell, "Apple's Dashboard vs. Konfabulator vs. DesktopX", Skinning the frog, Jul. 1, 2004, [online] [Retrieved on Aug. 1, 2008]; Retrieved from the Internet URL: http://frogboy.joeuser.com/article/19800; 9 pages.
Wardell, "Konfabulator for Windows", Jan. 10, 2004, [online] [Retrieved on Mar. 6, 2006]; Retrieved from the Internet URL: http://www.xpthemes.com/forums.aps?MID=19&CMID=19 &AID=4472, 6 pages.
"Sidekick", [Online] [Retrieved on Oct. 12, 2009] Retrieved from the Internet at URL: http://en.widipedia.org/wiki/Sidekick; 5 pages.
International Search Report and Written Opinion, dated Oct. 16, 2009, issued in International Application No. PCT/US2008/070217.
Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.
Javaboutique. Oct. 8, 2008. Available at: http://web.archive.org/web/20021208051951/http://javaboutique.internet.com/utilities/counter.html.
Ullenboom, "Java is auch eine Insel," 2003, [online] [Retrieved on Apr. 13, 2006]; Retrieved from the Internet URL: http://www.galileocomputing.de/openbook/javainsel2//java_140000.htm#Xxx998138, 3 pages.

(56) References Cited

OTHER PUBLICATIONS eHow, VMWare, http://www.ehow.com/how_6368_minimize-window.html, "How to Minimize a Window," Jun. 2004.
Grundy, "An environment for developing adaptive, multi-device user interfaces," AUIC '03 Proceedings of the Fourth Australasian User Interface Conference on User Interfaces, 2003, vol. 18, Australian Computer Society, Inc., Darlinghurst, Australia.
Rodriguez et al., "IBM WebSphere Portal V5 a Guide for Portlet Application Development," Feb. 1, 2004, 48 pages.
Inter-Widget Messaging!, I want my widgets to work together !, Feb. 7, 2005, 4 pages.
Widget to widget communication, Jun. 29, 2006, 2 pages.
Horvitz et al., "The Lumiere Project: Bayesian User Modeling for Inferring the Goals and Needs of Software Users," Fourteenth Conference on Uncertainty in Artificial Intelligence, Madison, WI, Jul. 1998, Morgan Kaufman Publishers, pp. 256-265.
Dashboard Widgets, Jun. 8, 2005, 2 pages.
Discovering the Dashboard, Apr. 28, 2005, 10 pages.
How-To Keeping Multiple Dashboard Widgets on the Desktop, Apr. 30, 2005, 8 pages.
Konfabulator 1.7—Now with Konspose and Unicode Support!, Jun. 25, 2004, 11 pages.
Konspose and Activation, Jun. 30, 2004, 2 pages.
Konspose Speed, Sep. 24, 2004, 3 pages.
Macworld Unveils Dashboard Widget, Aug. 30, 2005, 5 pages.
*Dashboard* vs *Konfabulator*, Apr. 25, 2005, 31 pages.
Konspose Only—what's the deal?, Oct. 18, 2005, 2 pages.
Widgets only when needed, Jul. 8, 2004, 3 pages.
Hide all Widgets on Desktop, Oct. 12, 2004, 5 pages.
Baratz, Konfabulator 2.0 Before there was Dashboard, there was Konfabulator. While Apple was wokring on . . ., Jun. 22, 2005, 9 pages.
A Better Konspose Background, Aug. 10, 2004, 1 page.
Konfabulator Release Notes, Jul. 9, 2004, 3 pages.
Yes . . . another Newbie in need of Help! How do I set Hotkeys?, Jul. 25, 2004, 2 pages.
Silicon Graphics, Inc., "IRIX Interactive Desktop User Interface Guidelines," 2001, Chapter 3, 26 pages.
Kniss et al., "Interactive vol. Rendering Using Multi-Dimensional Transfer Functions and Direct Manipulation Widgets," Oct. 24-26, 2001, 1 page.
Fejes, "Programming Konfabulator Widgets," Feb. 25, 2006, 5 pages.
Collins, "Konfabulator: The Beginning Widget Writer's Guide," Jan. 15, 2006, 28 pages.
Yahoo Widget Engine Reference Manual, Dec. 7, 2005, 229 pages.
Gabbard et al., "User-Centered Design and Evaluation of Virtual Environments," Nov./Dec. 1999, IEEE Computer Graphics and Applications, pp. 51-59.
Joyce, "The fabulous Konfabulator: what can it really do?" Dec. 1, 2005, 3 pages.
DesktopX 3: Creating a widget, Mar. 6, 2005, 7 pages.

* cited by examiner

MANAGEMENT AND GENERATION OF DASHBOARDS

RELATED APPLICATIONS

This application is generally related to the following jointly owned and co-pending patent applications, each incorporated herein by reference in its entirety:

U.S. patent application Ser. No. 10/874,829, for "User Interface for Assisting in the Installation of an Asset," filed Jun. 22, 2004;

U.S. patent application Ser. No. 10/877,968, for "Unified Interest Layer For User Interface," filed Jun. 25, 2004;

U.S. Provisional Patent Application No. 60/583,125, for "Procedurally Expressing Graphic Objects for Web Pages," filed Jun. 25, 2004;

U.S. patent application Ser. No. 11/145,561, for "Presenting Clips of Content," filed Jun. 3, 2005;

U.S. patent application Ser. No. 11/145,560, for "Web View Applications," filed Jun. 3, 2005;

U.S. patent application Ser. No. 11/145,023, for "Clip View Applications," filed Jun. 3, 2005;

U.S. patent application Ser. No. 11/148,010, for "Preview and Installation of User Interface Elements in a Display Environment," filed Jun. 7, 2005;

U.S. patent application Ser. No. 11/282,110, for "Preview including Theme Based Installation of User Interface Elements in a Display Environment," filed Nov. 16, 2005;

U.S. patent application Ser. No. 11/346,603, for "Multiple Dashboards," filed Feb. 1, 2006;

U.S. patent application Ser. No. 11/357,730, for "Selection of User Interface Elements for Unified Display in a Display Environment," filed Feb. 16, 2006;

U.S. patent application Ser. No. 11/409,276, for "Safe Download and Use of Content," filed Apr. 20, 2006.

U.S. patent application Ser. No. 11/429,492, for "Management of User Interface Elements in a Display Environment," filed May 5, 2006;

U.S. patent application Ser. No. 11/432,295, for "Widget Security," filed May 10, 2006; and U.S. patent application Ser. No. 11/497,801, filed Aug. 1, 2006, for "Media Center Including Widgets".

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that can include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed in a display environment and accessed through a user interface, such as a "dashboard." Widgets and dashboards are described in co-pending U.S. patent application Ser. No. 10/877,968, for "Unified Interest Layer For User Interface."

Due to the large number of widgets available to a user, a virtual desktop or dashboard can become cluttered and disorganized, making it difficult for the user to quickly locate and access a widget. Moreover, a user may only need to access a subset of widgets available on the desktop or dashboard for a given task. Accordingly, tools are required to manage all aspects of widget deployment and display.

SUMMARY

In some implementations, a user-activated dashboard (also referred to as a "unified interest layer") manager is provided that can be used to create, manage and deploy dashboards. Each dashboard can include any number of user interface elements, referred to herein as "widgets," for quick access by a user. In response to a command from a user, or otherwise, the dashboard manager can be invoked. A particular dashboard from a plurality of available dashboards may be selected and displayed including associated widgets. In one aspect, the dashboard manager is provided as either a stand alone application, part of an installer process, part of the operating system or otherwise to facilitate management of dashboards available to the user. Management functions can include construction, enablement, preview, importation, exportation, organization, installation, deletion, acquisition, and the like. Other management functions are possible.

Widgets can be of any type. They can communicate with a remote server to provide information to the user (e.g., a weather report), or they can provide commonly needed functionality (e.g., a calculator), or they can act as an information repository (e.g., a notepad or calendar). Some widgets can provide a combination of these types of functions.

In some implementations, a method of managing a dashboard includes: determining that a dashboard is to be constructed; determining a number of widgets to be included in the dashboard; determining which particular widgets are to be included in the dashboard; determining a layout for the particular widgets; optionally previewing the laid out dashboard; and presenting the dashboard.

In some implementations construction can include importing a dashboard or dashboard elements or organization from an external source. External, for the purposes of these discussions refers to a source other than the dashboard manager. Alternatively, the dashboard manager may import dashboard elements or organization from a same source (i.e., from other components of the dashboard manager).

The dashboard manager can enable or disable available dashboards, or otherwise control access to one or more dashboards. An administrator or other authorized user can limit access to one or more available dashboards. In some implementations, the dashboard manager can be used to import or export a dashboard. Importation can include importing from a file structure or another application. Importation can be from a local process or remote process. Once imported, the imported dashboard can be managed by the dashboard manager. Exportation can include publishing (e.g., to a list of subscribers), peer-to-peer exportation (e.g., using e-mail, a file transport protocol or other transfer means) or otherwise. For example, a dashboard associated with music can be imported or exported from an application such as iTunes® using e-mail as the transfer mechanism. In this example, the dashboard can be generated in or associated with the application (e.g., distributed along with music) and distributed using conventional means (e.g., such as e-mail).

The dashboard manager can be used to organize, install, delete and present dashboards. Presentation can include presenting a selected dashboard from among a plurality of dashboards. Alternatively, presentation can include the automatic determination of an appropriate dashboard for presentation to a user based on criteria or context of use.

Other methods, apparatuses, computer-readable mediums and devices having various features are also disclosed.

DETAILED DESCRIPTION

Hardware Architecture

Figure 1:
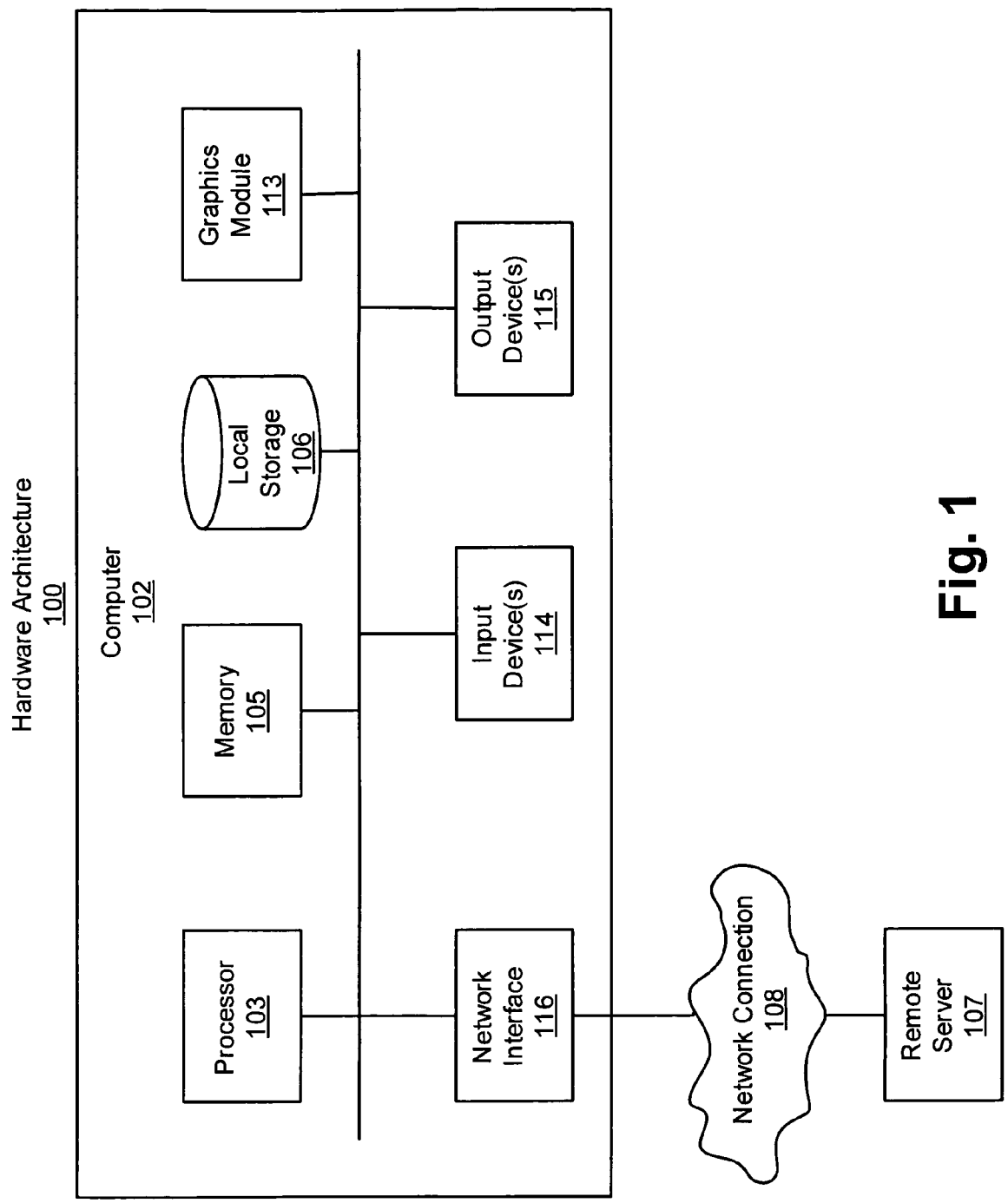
FIG. 1 is a block diagram of an exemplary hardware architecture for constructing and distributing dashboards.

FIG. 1 is a block diagram of a hardware architecture 100 for constructing, deploying and managing multiple dashboards. The architecture 100 includes a personal computer 102 coupled to a remote server 107 via a network interface 116 and a network connection 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While dashboards and widgets are described herein with respect to a personal computer 102, it should be apparent that the disclosed implementations can be incorporated in, or integrated with, any electronic device that is capable of using widgets, including without limitation, portable and desktop computers, servers, electronics, media players, game devices, mobile phones, email devices, personal digital assistants (PDAs), televisions, embedded devices, tablets, etc.

A multiple dashboard system and method for constructing, deploying and managing multiple dashboards can be implemented as one or more plug-ins that are installed and run on an electronic device, such as the personal computer 102. The plug-ins are configured to interact with an operating system (e.g., MAC OS® X, WINDOWS XP, LINUX, etc.) and to perform the various dashboard and widget functions, as described with respect of FIGS. 2-13. A multiple dashboard system and method can also be implemented as one or more software applications running on the one or more electronic devices, such as computer 102. In some implementations, a multiple dashboard system can be configurable to communicate with other widgets, applications and/or operating systems. A multiple dashboard system and method can also be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

For illustrative purposes, in the following description the invention is described as a feature of an operating system for use in constructing, managing and deploying dashboards; however, one skilled in the art will recognize that the techniques of the present invention can be implemented in other contexts as well, including those described above, to install other elements, and in other environments including environments associated with applications or operating systems. Examples of other environments include e-mail environments, desktop environments, application environments, hand-held display environments, and other display environments.

Dashboard Overview

Figure 2:
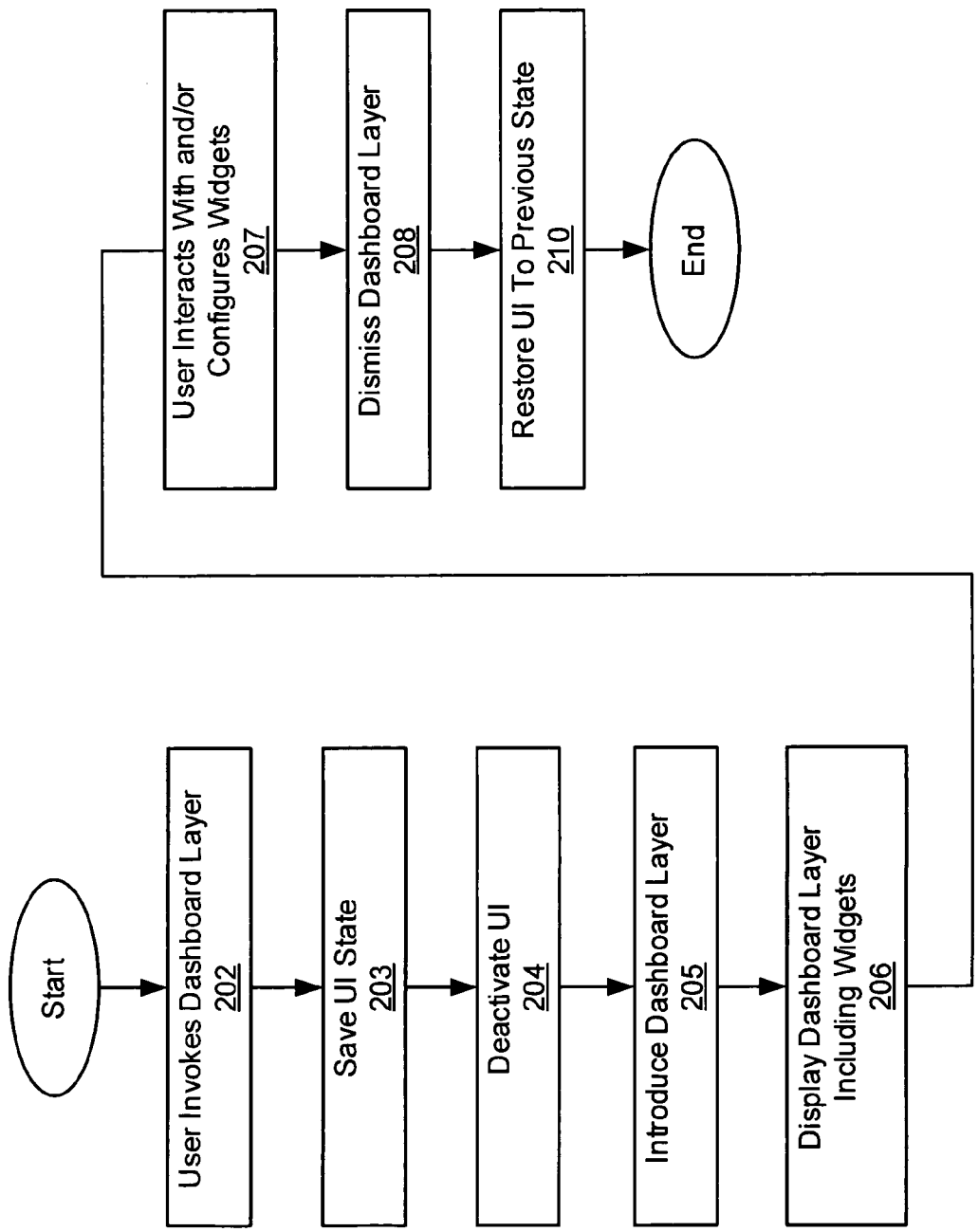
FIG. 2 is a flow diagram of an exemplary process for activating and using a dashboard.

FIG. 2 is a flow diagram of an implementation of a process for activating and using a dashboard. A dashboard layer (also referred to herein as a "unified interest layer" or "dashboard") can be used to manage and display widgets. A user can invoke a dashboard (202) by hitting a designated function key or key combination, or by clicking on an icon, or by selecting a command from an onscreen menu, or by moving an onscreen cursor to a designated corner of the screen. In response to such user input, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration. In some implementations, the user interface and dashboard are active at the same time.

In some implementations, the dashboard can be overlaid on an existing desktop user interface (UI). When the dashboard is activated, the existing UI may be faded, darkened, brightened, blurred, distorted, or otherwise altered to emphasize that it is temporarily inactivated. The existing desktop may or may not be visible behind the dashboard. The desktop can also be shrunk to a small portion of the display screen while the dashboard is active, and can be re-activated by clicking on it. In some implementations, the desktop can be shrunk and presented as a widget. The desktop can be re-activated by clicking on the widget.

The user can interact with and/or configures widgets as desired (207). In some implementations, the user can move widgets around the screen, and can resize widgets if applicable.

The user can dismiss the dashboard (208) by invoking a dismissal command, which causes the normal UI to return or re-present itself to the display screen. In some implementations, the dashboard can be dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a predefined corner of the screen.

In some implementations, the dashboard can be automatically dismissed (i.e., without user input) after some predetermined period of time or in response to a trigger event. An animation or other effect can be played or presented to provide a transition as the dashboard is dismissed. When the dashboard is dismissed, the current configuration or state of the widgets (e.g., position, size, etc.) can be stored, so that it can be retrieved the next time the dashboard is activated. In some implementations, an animation or effect is played or presented when re-introducing the UI. The UI can be restored to its previous state (210) so that the user can resume interaction with software applications and/or the computer operating system.

In some implementations, the dashboard can be configurable. The user can select a number of widgets to be displayed, for example, by dragging the widgets from a configuration bar (or other user interface element) onto the dashboard. The configuration bar can include different types of widgets, and can be categorized and/or hierarchically organized. In some implementations, in response to the user dragging a widget onto the configuration bar, the widget can be downloaded from a server and automatically installed (if not previously installed). In some implementations, certain widgets must be purchased, so the user is requested to provide a credit card number or some other form of payment before the widget is installed on the user's machine. In some implementations, widgets are already installed on the user's machine, but are only made visible when they have been dragged from the configuration bar onto the dashboard. The configuration bar is merely an example of one type of UI element for configuring the dashboard. Other configuration mechanisms can be used, such as an icon tray or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets. Additionally, widgets and dashboards can be displayed on any surface capable of displaying widgets and dashboards, such as projections onto surfaces, holograms, surfaces on consumer appliances (e.g., refrigerator doors) and the like.

Where more than one dashboard is available numerous options are possible for selecting among the available dashboards. For example, a particular dashboard can be selected by a user or automatically based on criteria. Criteria can include usage, state, configuration, preference(s), availability, applicability or otherwise. Selection can include two parts: invocation of a dashboard selector (e.g., a dashboard manager) and selection from available dashboards. Alternatively, selection can be automatic. In one implementation, a dashboard can be automatically selected from among the plurality of available dashboards based on user interaction. For example, a user can invoke a dashboard (e.g., generically invoke), and based on the context of the current user experience, a dashboard can be selected from the available dashboards and displayed to the user.

One or more individual dashboards may be customized or specially configured. A dashboard can be customized to support certain functions or applications. For example, a customized dashboard can be available for presentation in a particular display environment (e.g., a messaging environment, an application environment, a web environment, a work environment, a home environment, etc.). Other dashboards can be displayed in other display environments.

Software Architecture

Figure 3:
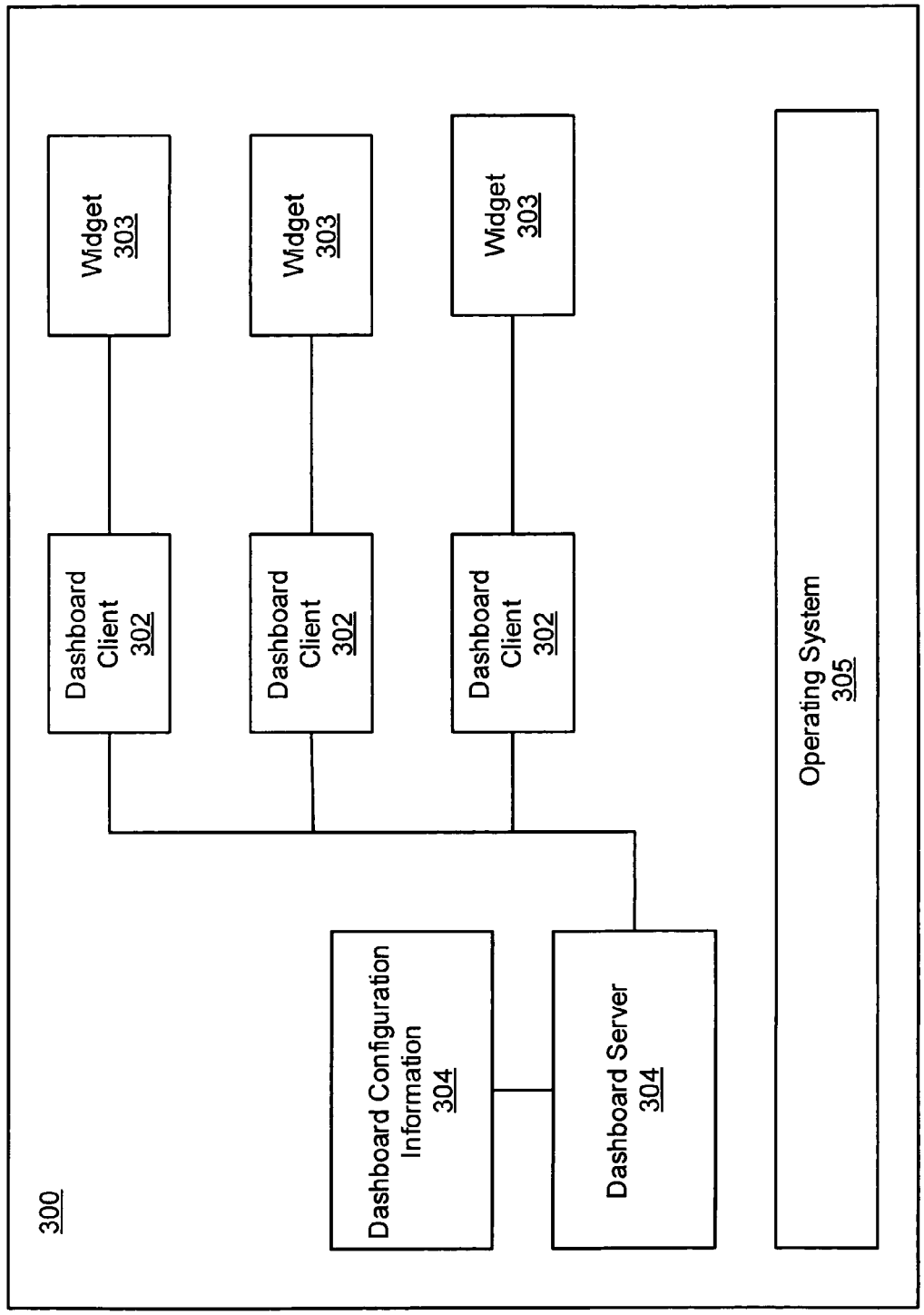
FIG. 3 is a block diagram of an exemplary software architecture for constructing and distributing dashboards.

FIG. 3 is a block diagram of a software architecture 300 for constructing, managing and deploying multiple dashboards. Though a client/server architecture is shown other architectures are possible including one that is a stand alone application or process on a device. The software architecture 300 generally includes a dashboard server 301, one or more dashboard clients 302, and one or more widgets 303. The server 301 and/or clients 302 use dashboard configuration information 304 to specify configuration options for displaying the widgets 303 and dashboards 305, including access levels and the like (if applicable). Such configuration information can include information for two or more dashboards configured by the same user or by different users.

In some implementations, the widgets 303 are displayed using HTML and related web technology. The dashboard server 301 manages and launches the dashboard client 302 processes. Each dashboard client 302 loads one or more widgets 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. The dashboard clients 302 display their respective widgets 303 by rendering web pages into a "WebView," as described in U.S. patent application Ser. No. 11/148,010, entitled "Preview and Installation of User Interface Elements in a Display Environment." The size of each WebView is defined as metadata associated with the corresponding widget 303. The server 301 provides data for rendering a dashboard layer that can be overlaid on the normal desktop of the user interface. The widgets 303 are rendered into the dashboard layer which is drawn on top of the normal desktop, so as to partially or completely obscure the desktop while the dashboard is active.

Dashboard Server

The dashboard server 301 can be a stand-alone process or embedded in another process. The server 301 can be located at the computer 102 or at the remote server 107. In some implementations, the server 301 provides functionality for one or more processes, including but not limited to: non-widget UI management, window management, widget and dashboard management, fast login, event management, loading widgets, widget arbitration, core image integration and widget preference management, as described in U.S. patent application Ser. No. 11/148,010, entitled "Preview and Installation of User Interface Elements in a Display Environment."

Dashboard Client

In some implementations, a dashboard client 302 is a process that uses, for example, objects that are defined as part of a development environment, such as Apple Computer's Cocoa Application Framework (also referred to as the Application Kit, or AppKit) for the Mac OS® operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describe a widget 303 and provide an identifier for a widget 303. Table I provides an example of Info.plist file contents.

TABLE I

Example of Info.plist File Contents

| Key | Type | Description/Value |
| --- | --- | --- |
| CFBundleIdentifier | CFString | com.apple.widget <widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of default PNG file. |
| Plugin (optional) | CFString | Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |
| AllowNetworkAccess | Boolean | Access to any resources that are not file based. |
| AllowSystem | Boolean | Access to command-line utilities using widget script object. |

The keys AllowFileAccessOutsideofWidget, AllowFullAccess AllowInternetPlugins, AllowJava, AllowNetworkAccess, and AllowSystem are Boolean types that can be set by a widget author to enable certain levels of resource access.

A data structure for a Dashboard is described in greater detail below.

Dashboard Invocation

Figure 4A:
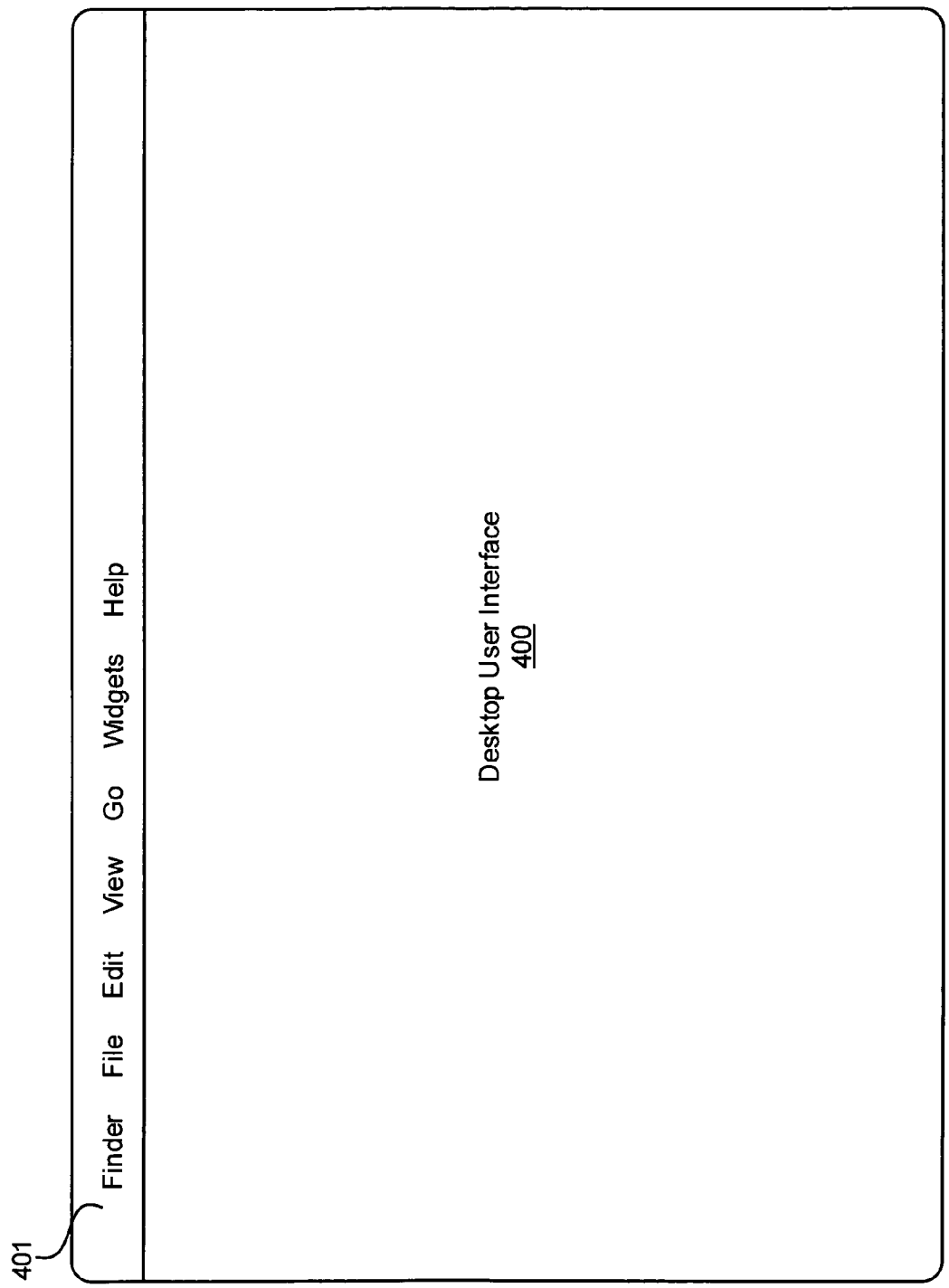
FIG. 4a is a screen shot depicting an exemplary desktop user interface prior to activation of a dashboard.

FIG. 4a depicts a desktop user interface 400 prior to activation of a dashboard. The desktop user interface 400 (also referred to herein as "desktop") is a conventional user interface as may be provided by an operating system, such as Mac OS®. The desktop 400 has a background image, menu bar 401, and other standard features. As is known in the art, the desktop 400 may also include windows, icons, and other elements (not shown). The user can activate a dashboard by selecting an item from a menu, or by clicking on an icon, or by pressing a function key or key combination, or by some other means for invoking activation. In some implementations, invocation is automatic or inferred from other conduct.

Figure 4B:
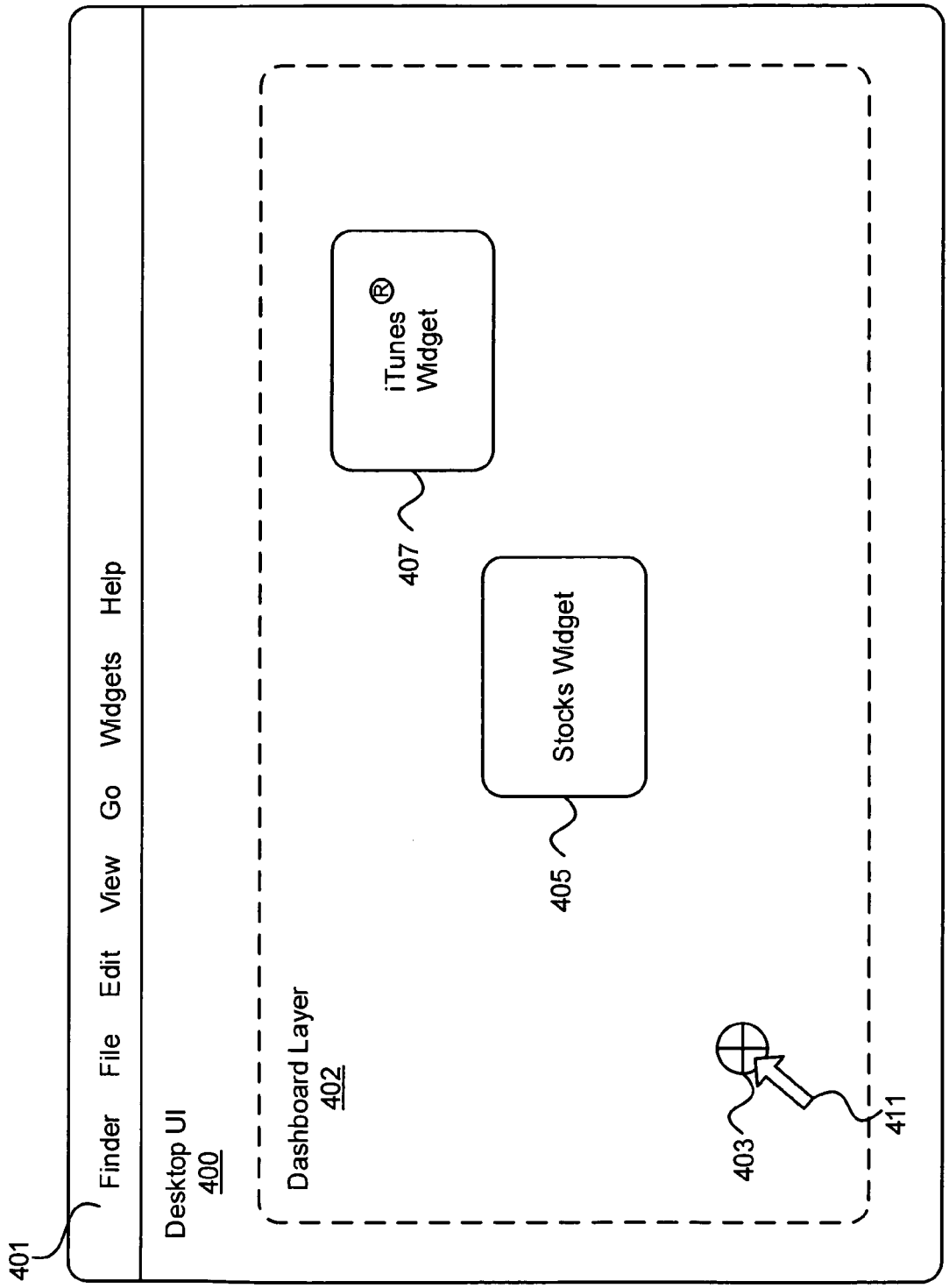
FIG. 4b is a screen shot depicting an exemplary initial state for a dashboard.

FIG. 4b depicts an initial state for a dashboard layer 402. In some implementations, a configuration icon 403 is initially displayed. Activating or otherwise invoking the configuration icon can cause the display of a configuration bar 408 (shown in FIG. 4c). The configuration bar 408 can display a graphic associated with each enabled and/or available dashboard or widget. The configuration bar 408 can include both enabled and disabled dashboards and/or widgets. Further, in one implementation the configuration bar 408 can be manipulated to add, delete, import, preview, install or otherwise operate on the configuration bar elements (e.g., dashboards and/or widgets). For example, a user can select an element in the configuration bar 408 and manipulate the element using a menu, a palette or other tool (not shown). Manipulation of configuration bar elements is discussed in greater detail below.

Alternatively, upon activation the dashboard layer 402 can display one or more default dashboards including one or more widgets 405, 407 without the configuration bar 408. The configuration bar 408 can be displayed when a trigger is detected (e.g., a hot key or command is invoked or the configuration icon is selected). If the dashboard layer 402 has previously been activated and configured, the widgets 405, 407, can be displayed as previously configured. As shown in FIG. 4b, the dashboard layer 402 is not necessarily visible as a distinct layer. However, its various components (such as widgets, icons, and other features) are visible. In some implementations, these components are displayed in a transparent layer, thus maintaining the visibility of the desktop 400 to the user. In some implementations, the desktop 400 and its components are darkened (or blurred, or otherwise visually modified) while the dashboard layer 402 is active, so as to emphasize that the desktop 400 is temporarily inactive. In other implementations, the desktop 400 is not visible while the dashboard layer 402 is active. The user can, in one implementation, reactivate the desktop 400 and dismiss the dashboard layer 402 by clicking on an area of the screen where no dashboard element is displayed (i.e., "negative space"). In some implementations, other commands (e.g., explicit or implicit), key combinations, icons, or other user input can be used to dismiss the dashboard layer 402.

Figure 4C:
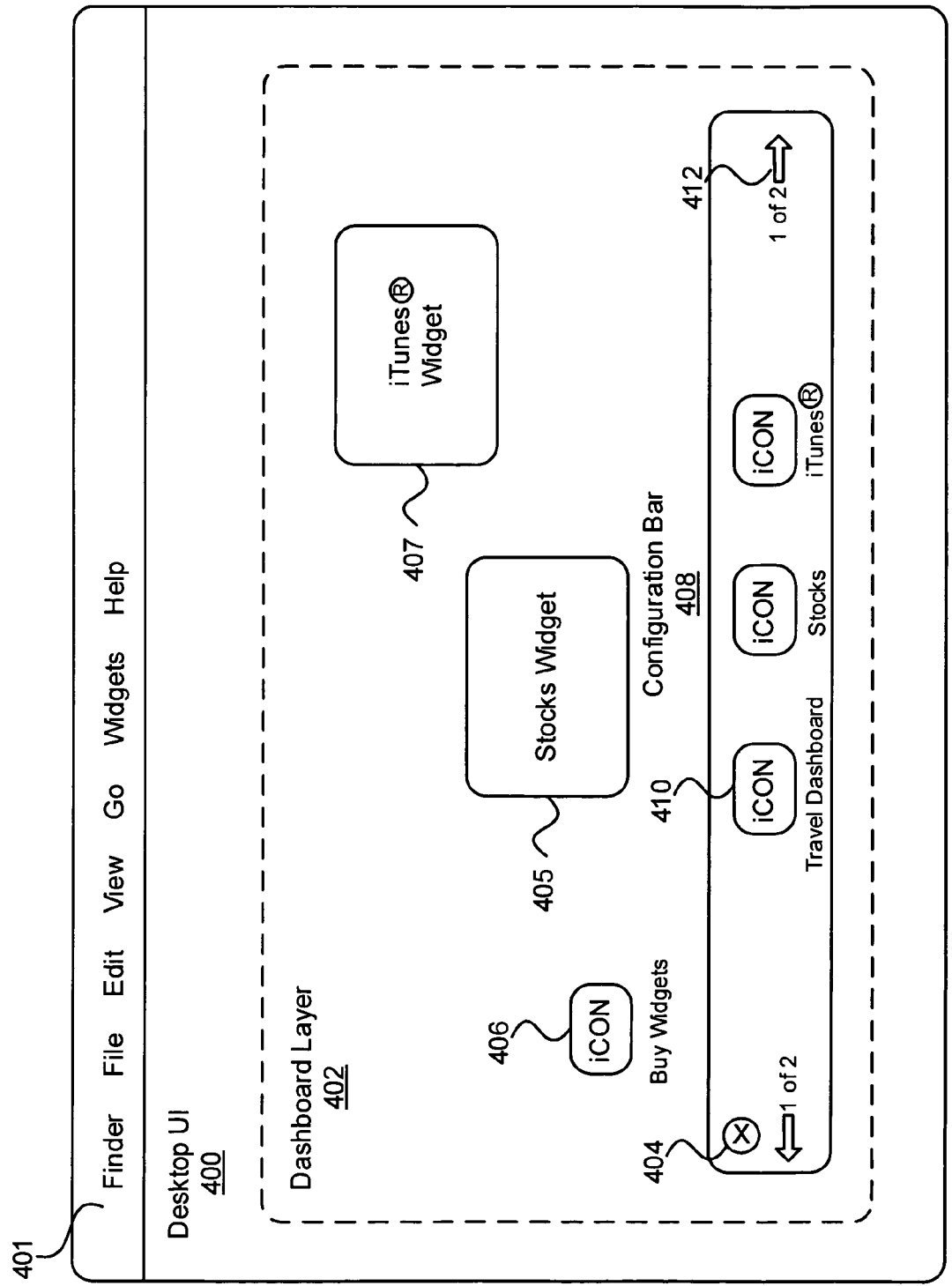
FIG. 4c is a screen shot depicting an exemplary configuration bar for a dashboard.

In some implementations, the user can drag the configuration bar 408 to any location on the screen, and the position of the configuration bar 408 will remain persistent from one invocation of the dashboard layer 402 to the next. The user can click on the configuration icon 403 to activate the configuration bar 408, as shown in FIG. 4c. The configuration bar 408 provides access to various dashboards, widgets or other user interface elements that can be deployed in the display environment. In some implementations, a text label is shown for each available user interface element (e.g., stock, iTunes®, mail etc.). In some implementations, an icon is shown for each available dashboard (e.g., travel dashboard 410). If many dashboards are available, the dashboards may be arranged hierarchically by type (e.g., sports dashboard, work dashboard, travel dashboard, etc.), or alphabetically, or by any other categorization methodology. For example, a number of categories may be displayed, and clicking on one of the categories causes a pull-down menu to be displayed, listing a number of dashboards in that category. In some implementations, a buy dashboard/widget 406 or import dashboard/widget 407 button is also available, allowing the user to select user interface elements from an online store or website.

Note that the particular configuration and appearance of configuration bar 408 in FIG. 4c is merely exemplary, and that many other arrangements are possible. For example, dashboards can be installed from other locations, other applications or other environments, without requiring that they first be part of the configuration bar 408. The user can dismiss the configuration bar 408 by clicking on dismissal button or icon 404.

Construction of Dashboards

Figure 4D:
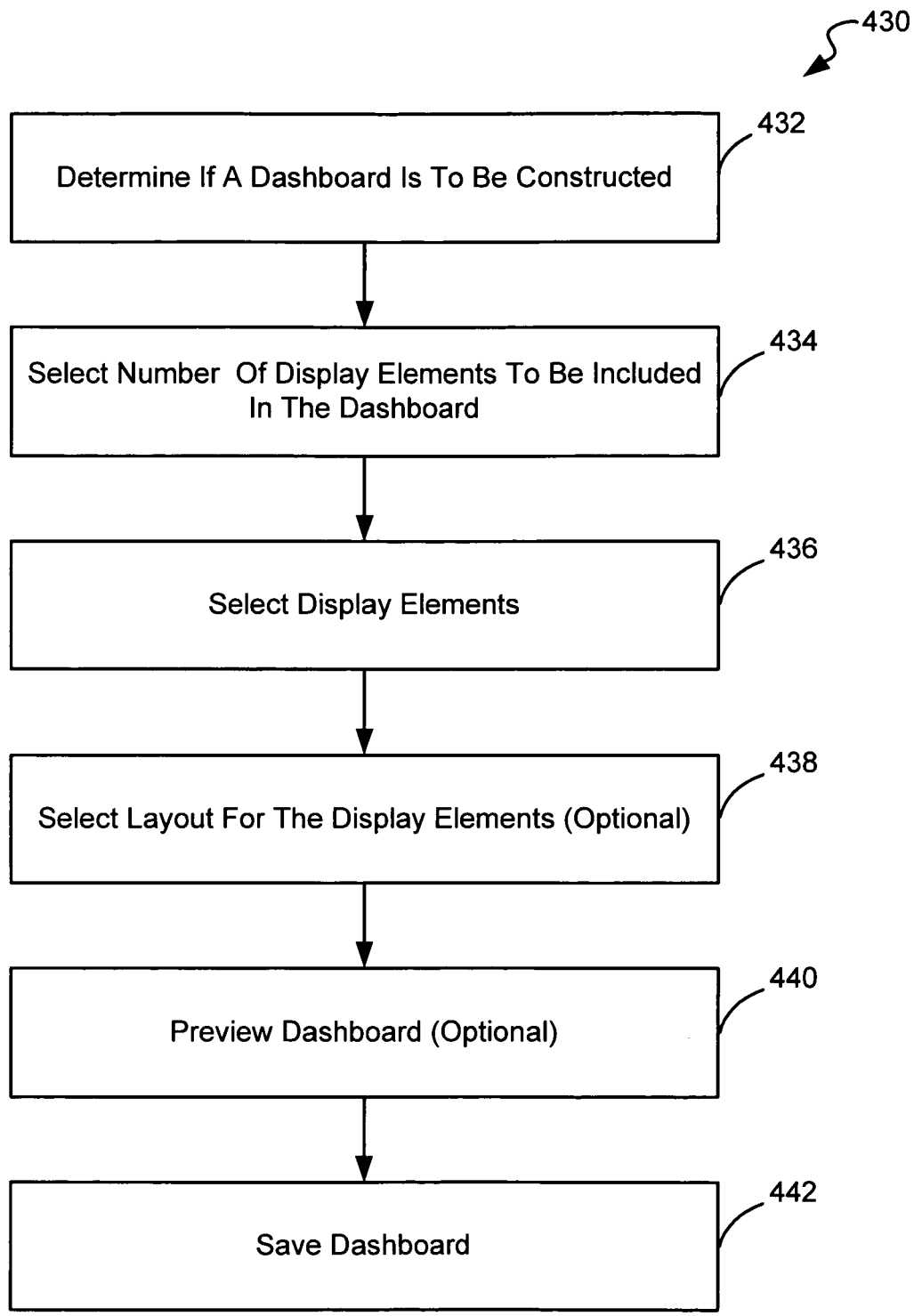
FIG. 4d shows a method for constructing a dashboard.

A dashboard can be constructed using a dashboard manager. Details of an exemplary dashboard manager are described in greater detail below in association with FIG. 11. Once constructed, a dashboard can be installed and enabled in a display environment. A "display environment" refers to any virtual display (e.g., a user interface, dashboard layer, display area, etc.) or physical display (e.g., a display device, display screen, display surface, etc.) of widgets or dashboards, which will be clear from the context in which the term is used. Additionally, dashboards can be exported or shared as will be discussed below. After construction, installation and enablement, a user can invoke and interact with elements that are part of the dashboard as described above. Referring now to FIG. 4d, one implementation of a method 430 for constructing a dashboard includes determining that a dashboard is to be constructed 432.

Figure 4E:
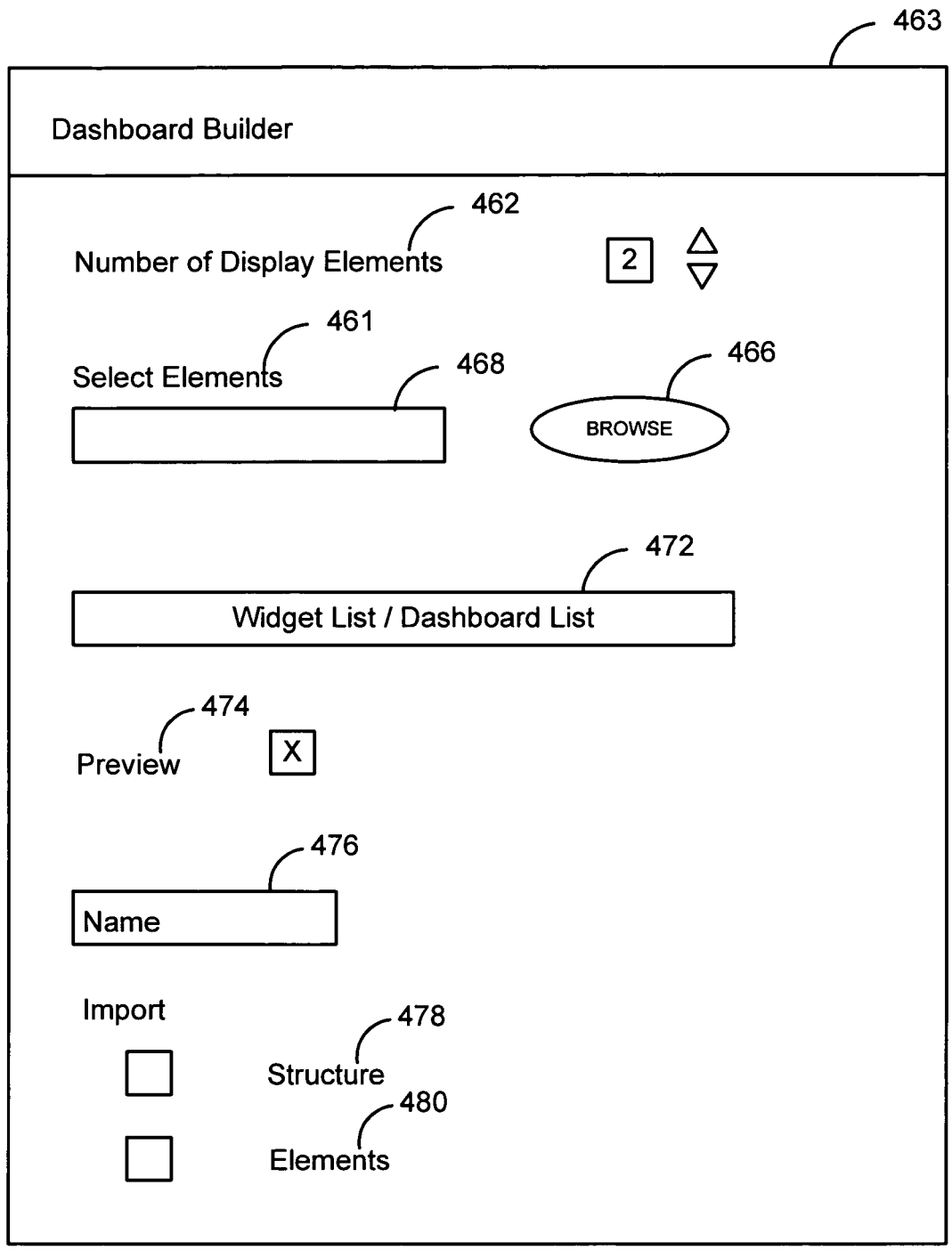
FIG. 4e shows an exemplary construction palette.

In one implementation, a user can invoke a dashboard build command when a dashboard manager is active. The invocation of the build command can be by way of a keystroke, a series of keystrokes, a selection, or other user input. In one implementation, once the build command is invoked, the user is presented with a palette for configuring a dashboard. One example of a construction palette 463 is shown in FIG. 4e. Using the construction palette 463, the user can select a number of display elements (e.g., widgets, dashboards or other display elements) to be included in the dashboard 434. The number of display elements can be manually set (e.g., using number selector 462) or inferred (e.g., from the number of display elements selected in step 436 below).

The method includes the selection of display elements to be enabled in the dashboard 436. In the implementation shown the construction palette includes a selection tool 461 for allowing the user to select display elements. The selection tool 461 can include a browser to enable a user to search for and locate appropriate display elements for inclusion in the dashboard. In the implementation shown, the selection tool includes a selection bar 468, a browser button 466 and a list 472. The list 472 can be populated with the selections made by the user. Selections can be made explicitly or implicitly. Methods and systems for implicit selection are described in U.S. patent application Ser. No. 11/357,730, for "Selection of User Interface Elements for Unified Display in a Display Environment."

Method 430 optionally further includes selecting a layout for the particular display elements 438. The layout can be made automatically or defined particularly by the user. In one implementation, as each display element is selected a user is presented with a mock up of the dashboard under construction. The user is then allowed to place the selected display element in the dashboard as desired. Alternatively, the system can automatically arrange the selected display elements.

When the last display element has been located, the user can optionally preview the dashboard 440, by for example selecting a preview option 474 on the construction palette. After preview, the dashboard can be saved 442. Saving can include naming or otherwise identifying the dashboard. Saving can also include specifying various types of metadata, such as the name of the author of the dashboard, the date and time the dashboard was created, privileges associated with the dashboard, themes or other searchable criteria associated with the dashboard, and any other information that can be used to manage, populate, or otherwise facilitate the interaction or use of the dashboard.

In the construction palette shown, the user is provided with a name prompt 476 for naming the dashboard. Saving can include publishing the dashboard locally or otherwise. Publishing can include distributing the dashboard once configured. Saving the dashboard can result in the dashboard being automatically being made available for selection in, for example the systems configuration bar 408. Optionally, the dashboard can be immediately presented in the dashboard layer as the current or selected dashboard after construction. Manipulation of individual dashboards in a multi-dashboard environment is discussed in greater detail below.

In some implementations construction can include importing an entire dashboard or portion of a dashboard (e.g., dashboard elements or organization) from an external source. External, for the purposes of these discussions refers to a source other than the dashboard manager, the configuration bar or other local resource. Alternatively, the dashboard manager may import dashboard elements or organization from a same source (i.e., from other components of the dashboard manager). For example, a user can import a layout of display elements from an existing dashboard. In one implementation, the user is provided a prompt in the construction palette to allow for the importation of information (e.g., using layout import button 478 or element button 480) from an alternative source. Exporting of and importing of display elements including dashboards is described in greater detail below.

Elements that are selected, including user interface elements such as widgets, can be installed in a display environment. One display environment, a dashboard, will be used for illustrative purposes. Installation can include a preview operation as is discussed below. Installation can include selection of the element, such as by a drag and drop action. Other selection means can be used. In one example, a user can drag widgets from configuration bar 408 onto the surface of the dashboard (in other words, anywhere on the screen), using standard drag-and-drop functionality for moving objects on a screen.

Construction can include the determining or defining one or more rules to be associated with a given dashboard. Rules can be used to determine authorization for modification of the dashboard, govern content to be included in the dashboard (e.g., parental filter) or otherwise allow for the control of the configuration, use, limitations, scope, reach or otherwise of the dashboard being constructed. Default rules can be associated with a dashboard at the time of construction. In addition, specific rules can be associated with a dashboard by a user or automatically by the system. Examples of rules include "do not delete" rules associated with items included in the initial instantiation of a dashboard, "content rating rules" for limiting introduction of prohibited content into a dashboard environment, "add" rules for adding items to the dashboard, etc. Other rules could include layout rules, which determine (or restrict) how a particular dashboard will be presented on a particular display device (e.g., width, height, resolution). For example, the dashboard can be presented differently on a mobile phone display or a high definition television screen than on a computer monitor. Thus, having layout rules associated with the construction of a dashboard allows the dashboard to be sent to different devices with different display capabilities.

Dashboards can be associated with rules that determine the availability of the dashboard, such as who can access the dashboard, where the dashboard can be accessed and when the dashboard can be accessed. For example, a dashboard could be associated with time-based rules restricting the times when the dashboard, or particular feature of the dashboard, can be accessed and/or used.

The construction process can include identifying one or more user interface elements (e.g., widgets) for installation in a dashboard environment, determining rules for managing the dashboard environment, associating one or more widgets with the dashboard environment and installing the dashboard environment in a display environment. Determining rules can include determining a rule for managing the dashboard environment, evaluating the identified elements to determine if each satisfies the rule; and installing only identified elements in the selected dashboard environment that satisfy the rule. Other types of management rules are possible.

Installation of Dashboards

Elements, including user interface elements such as widgets, can be associated with one or more dashboard layers (i.e., dashboards) displayed in a display environment. Installation can include a preview operation as is discussed below. Installation can include selection of the element(s), such as by a drag and drop action. Other selection means can be used. In one example, a user can drag widgets from configuration bar 408 onto the surface of a dashboard (in other words, anywhere on the screen), using standard drag-and-drop functionality for moving objects on a screen. Once associated with a given dashboard.

In some implementations, widgets and/or dashboard layers (including widgets) can be installed from within a running application. For example, a widget and/or dashboard (including widgets) can be an attachment to an email. When the user clicks the attachment, an installation process is invoked for the widget and/or dashboard which can also include a preview.

Dashboards can be created or instantiated using an installer process or construction process similar to the one described above. The installer process can include a separate user interface or an integrated user interface (e.g., integrated in the display environment or separate from the display environment, for example, in another display environment associated with another application, such as an email application) for selecting and installing dashboards in a display environment. For example, a dashboard received as an email attachment can be launched by a user from directly within a user interface of the email application.

The installation area for the dashboard can be embedded within an application display area or window. For example, if a user receives a dashboard as an attachment to an email, the user can invoke and install the dashboard from within the email message window without the need for a separate installation window.

In general, an installer process is used to provide additional functionality to the creation/instantiation process, beyond the simple drag and drop operation described above. Additional functionality can include construction, preview, security and deletion functionality in a singular interface. The installer process can be a separate process or combined in another process. The installer process can itself be a separate application that is executable to construct and install user interface elements in a display environment. As used herein, the term "process" refers to a combination of functions that can be implemented in hardware, software, firmware or the like.

Installer Process Engines

Figure 5:
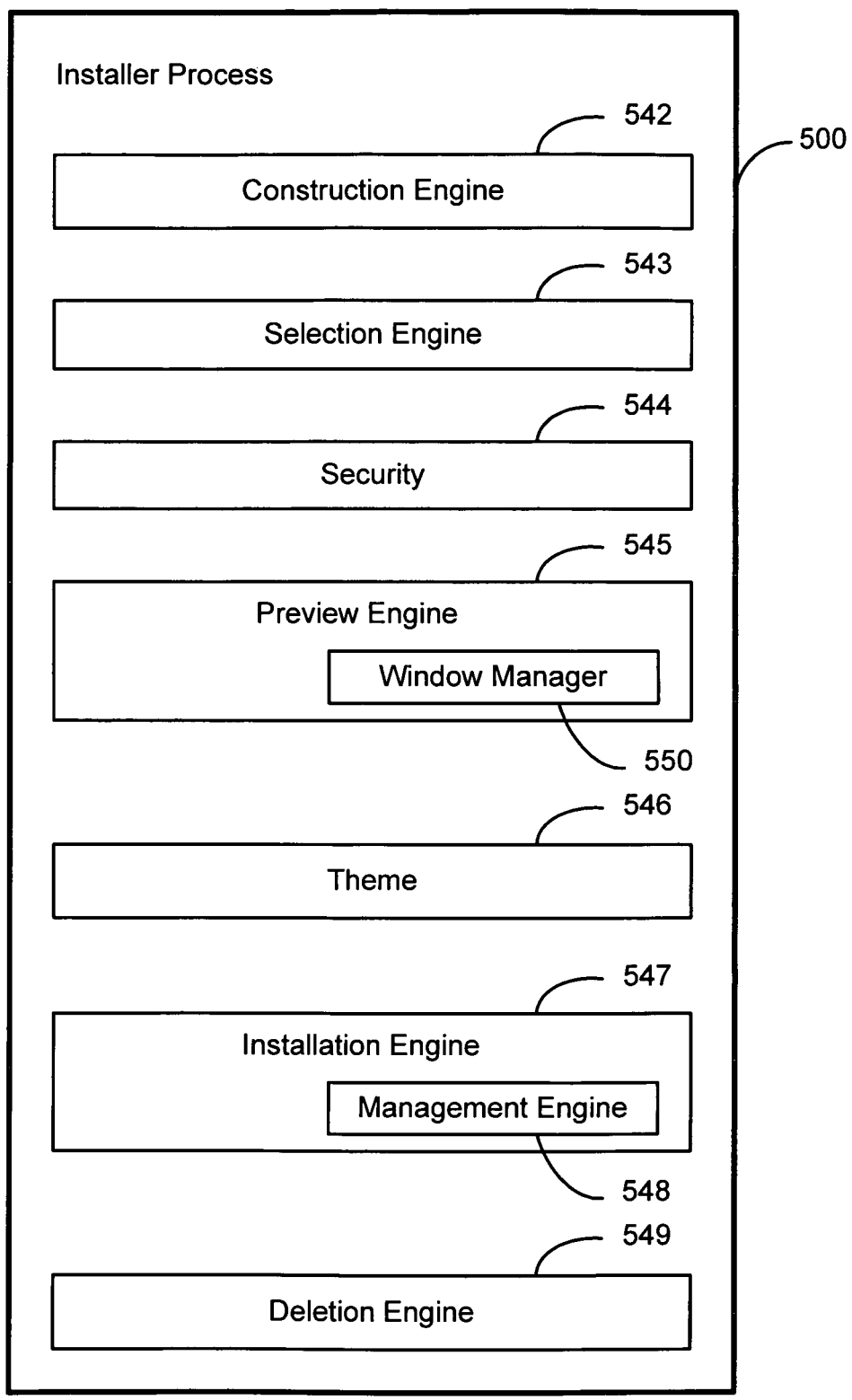
FIG. 5 is a block diagram of an exemplary installer process.

FIG. 5 is a block diagram of an installer 500 for installing dashboards in a display environment, including a construction engine 542, a selection engine 543, a security engine 544, a preview engine 545, a theme engine 546, an installation engine 547, and a deletion engine 549.

Construction Engine

In some implementations, installer process 500 includes a construction engine 542. Construction engine 542 can be used to create, import or export dashboards in one or more display environments. Construction engine 542 can be invoked in a display environment and can use a construction palette (e.g., a dialog, a panel, a window, etc.) to construct a dashboard. Construction can include population (including selection), layout, control (e.g., using one or more rules to control the behavior, display or other parameters associated with a dashboard), preview, installation and deletion or parameters associated therewith. Alternatively, separate engines can be used to install, preview, delete, etc. a dashboard after construction. A screen shot showing. A exemplary user interface for a construction palette is shown in FIG. 4e.

Construction engine 542 can be of the form of a stand alone engine that is used to construct dashboards. Alternatively, construction engine 542 can be of the form of an assistant process that is integrated with other functions associated with dashboard management. Once constructed, the selection engine 543 can be used to select and present a dashboard for installation as is discussed below. The construction engine 542 can include a naming process for creating a structure for storing parameters, state data (e.g., the layout, last configuration of the dashboard presented to the user, etc.), identifiers, rules (e.g., layout rules) and other structures associated with a given dashboard. The naming process allows for both the easy retrieval of the dashboard data along with an easy mechanism to copy the content or structure or other data to facilitate creation of a new dashboard.

Selection Engine

Figure 4F:
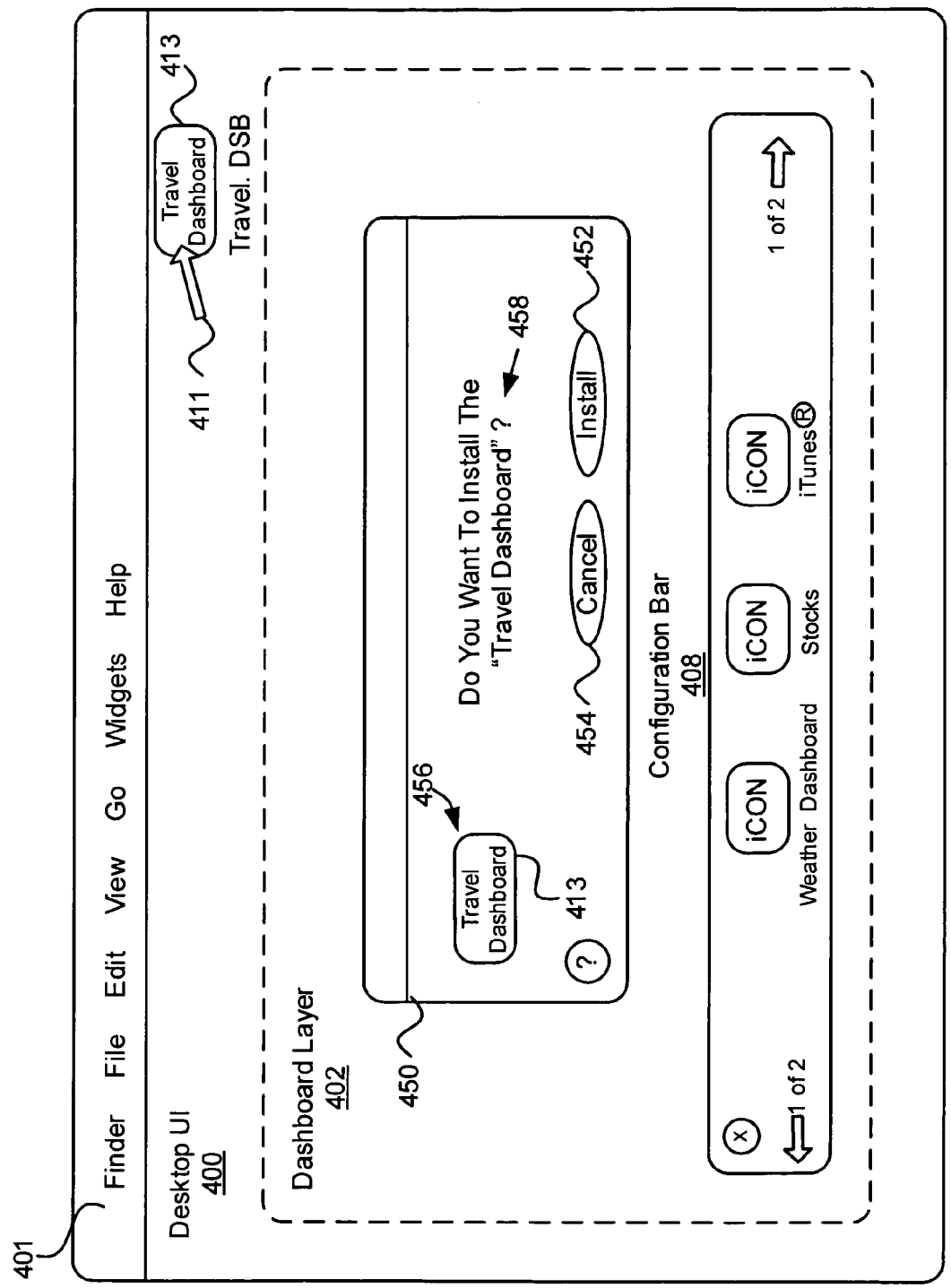
FIG. 4f shows an exemplary user interface associated with installation of a dashboard.

The selection engine 543 is used to select and present (e.g., a static presentation) a dashboard for installation. The selection engine 543 can be invoked in a display environment and can produce an installation area (e.g., a dialog, a panel, a window, etc., and hereinafter referred to as an "installation window"), that acknowledges the user's initiation of the installer process. The installation window can include a presentation of a selected dashboard (or a reference thereto as described below), along with various buttons that may be activated by the user or otherwise to invoke functionality in the installer process. A screen shot showing an installation window 450 in a user interface is shown in FIG. 4f. Installation window 450 can include one or more interactive features (e.g., buttons) that allow a user to install a dashboard or widget (e.g., install button 452), or cancel the installation operation (e.g., cancel button 454). In some implementations, preview is automatic. Alternatively, preview can be selected for enablement prior to installation. Installation window 450 can include a reference 456 and a prompt 458, as described below. The preview and installation of widgets and dashboards is described in co-pending U.S. patent application Ser. No. 11/282,110, for "Preview including Theme Based Installation of User Interface Elements in a Display Environment."

In some implementations, the installation window 450 is invoked by clicking on a dashboard file or package. For example, a travel dashboard 413 (e.g., "travel.dsb") can be downloaded to the desktop 400 from a web site. When the user double clicks the "travel.dsb" file with cursor 411, the installation window 450 is displayed in the user interface as shown in FIG. 4f.

In some implementations, a user can select a dashboard for installation using a remote control device (e.g., infrared device, mobile phone, etc.). For example, a dashboard and/or widgets can be displayed on a display device (e.g., television screen, computer monitor, etc.). The user can use the remote control to select dashboards from a menu or configuration bar 408 for installation. The dashboards can be displayed in one of multiple resolutions, which is selectable by the user via the remote control. For example, a user can select a dashboard to be scaled to fit a desired portion of the display device (e.g., full screen).

Security Engine

The security engine 544 is used to determine a security access level (or risk level, or both) for either the user or the element to be installed. Security engine 544 can be used to limit the ability of the user to install particular kinds of elements (e.g., based on categories or criteria). In addition or alternatively, security engine 544 is used to determine a security access level (or risk level or both) of an element to be installed. Based on the security access/risk level, one or more operational or functional constraints can be placed on the element during the preview process. For example, limitations on the ability of the previewed element to interact, access, read or write data, monitor output of other system resources, access other system resources, or other limitations can be invoked. The invocation can be temporary, for a predetermined time period, or until the preview has terminated and complete (non-limited) installation has been performed. Functionality or operations of the element can be enabled or disabled, depending on the access level. The security engine 544 can use metadata associated with the element to be installed, user input, contextual information, file type information, default data, read/write preferences, cookies and/or other information to determine the access/risk level. Access control lists including white lists (e.g., including lists identifying certified or otherwise safe elements), black lists (e.g., including lists identifying un-certified or otherwise un-safe elements) and the like can be used to determine the access/risk level.

In some implementations, dashboards are rated according to their content (e.g., adult content, violence, strong language, etc.). The rating can be determined by the author a third party rating organization. The rating can be used to determine whether a dashboard will be installed and/or previewed. In some implementations, users can specify which dashboards can be installed and/or previewed based on ratings. For example, a parent may specify via a preference pane, or other input mechanism, that dashboards containing adult content ratings will not be installed nor previewed (i.e., parental controls).

In some implementations, dashboards are digitally signed by their authors. Digital signatures can be incorporated in files bundled with a dashboard and can be generated using one or more known digital signature techniques (e.g., key exchange, hashing, message digest, etc.). The digital signature can also be authenticated using a digital certificate issued by a certificate authority using techniques known in the art. Various techniques for widget security are described in U.S. patent application Ser. No. 11/432,295, for "Widget Security."

In some implementations, dashboards are "locked down," such that widgets cannot be removed from or added to the dashboard. Such dashboards can be used for demonstration purposes or any other purpose where the dashboard author or owner does not want the content of the dashboard to be altered (e.g., Digital Rights Management (DRM) related applications).

Preview Engine

Figure 4G:
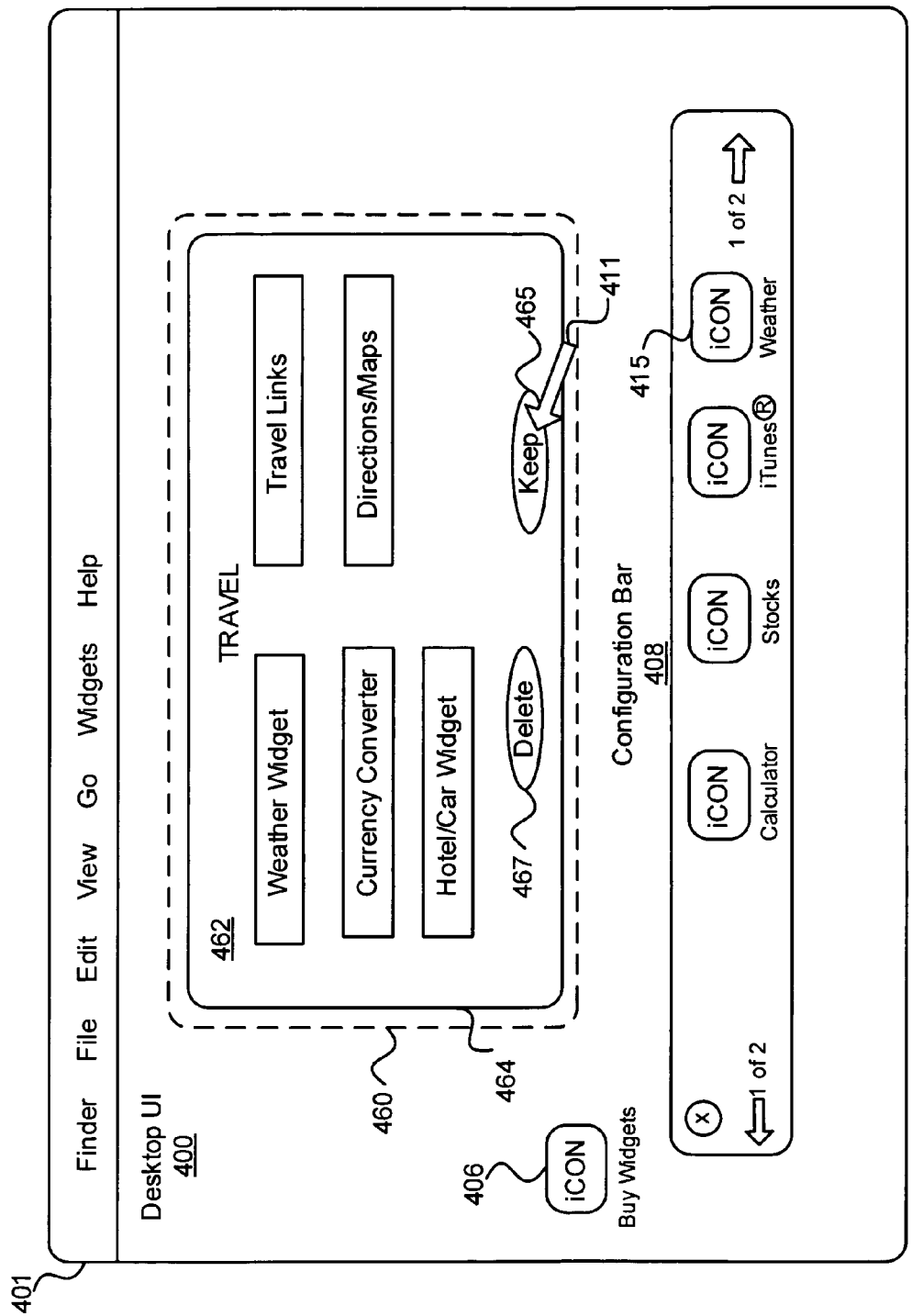
FIG. 4g shows an exemplary user interface associated with a preview of a dashboard.

The preview engine 545 is used to preview (e.g., dynamically) an element (e.g., a dashboard) that has been selected to be installed. Referring to FIG. 4g, the preview engine 545, when invoked, provides an area (hereinafter "a presentation area or presentation window 462" or specifically a "dashboard window" when used to display a dashboard) into which the selected element can be displayed. In some implementations, the presentation window 462 is a separate process and embedded within an underlying installer window (i.e., the installation window 460) which, in one implementation, is itself a separate process. In one implementation, the preview engine 545 provides a presentation of a fully functional element (e.g., dashboard) in the presentation window 462. The term "fully functional" refers to both the presentation of the dashboard in terms of size, shape, content and the like along with any supported interactivity features. Alternatively, limitations on the functionality, interactions and the like can be set by the security engine 544 as discussed above. Interactivity can include the separate refreshing of content in the presentation window 462. Alternatively, the content can be static, and only present ornamental properties.

Associated with the preview is a preview designator 464. In one implementation, the preview designator 464 is displayed along with the user interface element being installed (e.g., widget). The preview designator 464 can be of the form of a frame, a preview theme element, or other designator that overlays, surrounds, bounds or otherwise is associated with the presentation window 462. The preview designator 464 can be a separate process and embedded within an underlying installer window (e.g., the installation window 460) or the presentation window 462 which, in one implementation, may themselves be a separate process. The preview designator 464 is provided to indicate to a user that the element is being previewed and, as of yet, has not been fully installed in the display environment. Further emphasis can be used to convey this information including by using highlights, emphasis, de-emphasis, effects, transitions and the like. In one implementation, the combination of the presentation window 462 and the preview designator 464 comprise an installation area for the user interface element to be installed. The installation area can be part of the display environment in to which the element is to be installed (e.g., part of the user interface) or part of a separate display environment (e.g., part of another user interface, another user interface element, another application, or process, etc.).

When displaying a fully interactive dashboard in the presentation window 462, user input can be accepted that can result in changes in the presentation. For example, if the dashboard includes a widget that itself includes a URL that may be linked to, interaction can include the generation of an underlying page request and the presentation of the requested page in the presentation window 462. Interaction with user interface elements is described in U.S. patent application Ser. No. 11/145,561, for "Presenting Clips of Content." If the interaction is not allowed, a display prompt can be shown to indicate that the operation or function is temporarily disabled during the preview operation.

Window Manager

In some implementations, a window manager 550 is associated with the preview engine 545. The window manager 550 can be a separate process that is used to support the interaction between the presentation window 462, preview designator 464 and the installation window 460 described above. In some implementations, multiple windows are controlled by a single process.

In some implementations, the logic associated with the window manager 550 can be implemented in a same or separate process from the installer process or the preview process. In some implementations, the window manager 550 controls the interaction of the respective windows. Specifically, three separate interactions can be controlled.

First, in some implementations, each window is a separate process displayed and brought forward (in a window hierarchy) together. The bringing together of the multiple distinct windows, each associated with separate processes can be controlled by the window manager 550.

Second, in some implementations, the presentation window 462, preview designator 464 and the installation window 460 are required to interact with each other in predefined ways. For example, the presentation window 462, preview designator 464 and the installation window 460 need not only to be brought forward together, they must also be controlled when interactions are required for the windows once displayed. For example, if one window is moved, i.e., using a drag and drop operation, the multiple windows are managed so that the presentation remains unified (i.e., the presentation window 462 and preview 464 designator are maintained within the installation window 460, though the installation window 460 was the process that received the user interaction to move). To accomplish such, window manager 550 provides an interface between the windows to allow for the receipt of input in one process and the translation to the other process.

Third, in some implementations the windows must be maintained within operating constraints of each underlying process. For example, when one window is resized (i.e., the installation window 460 is resized), the window manager 550 controls the relative presentation of the other windows (continuing this example, when the installation window 460 is resized, the presentation window 462 and preview designator 464 may be repositioned to be centrally displayed in the installation window 460). Note, this third level of management includes management of process constraints. Process constraints include limitations on the changes that can be performed within the context of the installer process for any of the windows. For example, a minimum size constraint can be associated with the underlying presentation window 462, such that resizing of the associated installation window 460 can be constrained to not be so small as to be unable to present the minimum sized presentation window 462 in the newly downsized installation window 460.

The preview engine 545 is responsive to an initiation signal/action and provides the display of the selected element (e.g., dashboard) in a presentation window 462 as described above (see FIG. 4g). Associated with the presentation window 462 can be one or more input mechanisms (e.g., buttons) that allow a user to continue in the installation process (e.g., a keep or install button 465), or cancel the installation process (e.g., delete button 467). In some implementations, if the installation process is cancelled, the presentation process terminates and returns control to the prior operative environment (i.e., return to the initiating point, for example, reinitiating the selection process).

In some implementations, the installer process does not include or allow for the selective bypassing of the preview presentation (e.g., bypass preview or does not include the preview engine 545). In some implementations, the preview engine 545 is itself a separate process or application (e.g., can be separate from the installer process 541). In some implementations, the preview engine 545 is itself a user interface element (e.g., a preview widget) that can be used to preview elements (e.g., dashboards) prior to installation, deployment, instantiation, or the like.

Theme Engine

In some implementations, theme content can be displayed along with an element to provide for differentiation among the elements. For example, a travel dashboard can include a travel banner with a globe to quickly allow for the identification of the travel dashboard when displayed. Theme engine 546 is operative to provide additional content to accompany the content displayed in the presentation window or installation window. The theme engine 546 is operative to determine a theme to be associated with an item to be installed (e.g., a dashboard), identify additional content for concurrent display, and facilitate the display of the additional content. Additional content can be of the form of a frame that is used to bound the item to be installed on one or more sides. Examples of additional content include a picture frame, a content player (e.g., an iTunes® player, etc.). The additional content can be static or include functional elements (e.g., buttons, for example to play content). Alternatively, the additional content can be displayed in an overlay or other overlapping manner, be a separate process or window or be part of the presentation window. The additional content can be stored or retrieved as required. The identification of the additional content by the theme engine 546 can be based on metadata that accompanies the item to be installed, based on an analysis of the item to be installed, automatically defined based on file type (e.g., all .pic files are provided a picture frame, or all preview files are provided with a preview frame). Themes can be assigned by a user after receipt or prior to transfer to a receiving party.

In some implementations, dashboards can include animation in the background of the display environment when the dashboard is running. For example, a movie dashboard can play clips from a movie in the background while various dashboard elements are running and/or interacted with by a user.

Installation Engine

The installation engine 547 is operative to install/instantiate the selected dashboard in the display environment. The installation engine 547 can copy or move as required a selected/constructed dashboard to an appropriate volume and store the data structures (including preference data, identification data, scripts, navigation data, state data and the like) for use in the display environment. In some implementations, the installation engine 547 includes an automatic invocation of the underlying display environment with the installed user interface element presented once selection occurs.

Deletion Engine

The deletion engine 549 provides control for elements (e.g., dashboards) after installation. The deletion engine 549 can be a separate process from the installer process 500, or included therein. The deletion engine 549 can receive input and display user interface elements (dialogs and the like) to ensure that deletion operations are effectuated as required. The deletion engine 549 can be responsive to the selection of a user interface element, a portion of the element, controls associated with the element and the like.

In some implementations, the deletion engine 549 receives mouse over input and displays a graphical element associated with a given identified element. The graphical element can include a control that allows for the activation of the deletion engine. The activation can cause the display of a window (e.g., a confirmation window) to ensure appropriate behavior. Other methods for deleting user interface elements are possible. For example, deletion of a user interface element can also be effectuated during the installation process as discussed above. More specifically, a user interface element can be previewed using the preview engine 545, and subsequently deleted prior to full installation.

Deletion can include deactivating a user interface element and leaving its associated files on the host system or device, or deleting the user interface element and removing all its associated files from the host system or device. The user can be prompted to confirm deletion of a user interface element before deletion is initiated.

Dashboard Environment

In a dashboard environment, installer process 500 can include a configuration bar (including available dashboards, widgets and the like) and an associated installer process. The installer process when invoked can cause the display of the configuration bar in the user interface. In one implementation, a dashboard layer, can be displayed when the installer process is invoked. The dashboard layer can be an index to the dashboards that are available for activation. The installer process can then be invoked to select available dashboards for installation from the configuration bar, preview dashboards, remove installed dashboards (e.g., remove dashboards from the dashboard bar) or construct dashboards depending on the configuration of the installer process.

Desktop Environment

In a desktop environment, installer process 500 can be of the form of an installer application that can be invoked (automatically, by the user, by the operating system, by an application or other invocation tool) to present, manipulate and manage user interface elements. The installer application can include a user interface element bar and an associated installer process. The installer process when invoked can cause the display of the user interface element bar in the user interface. The installer process can then be invoked to select available user interface elements for installation from the user interface elements bar, preview user interface elements, remove installed user interface elements (i.e., remove user interface elements from the user interface elements bar) or construct a dashboard depending on the configuration of the installer process.

Installation Process

Figure 6:
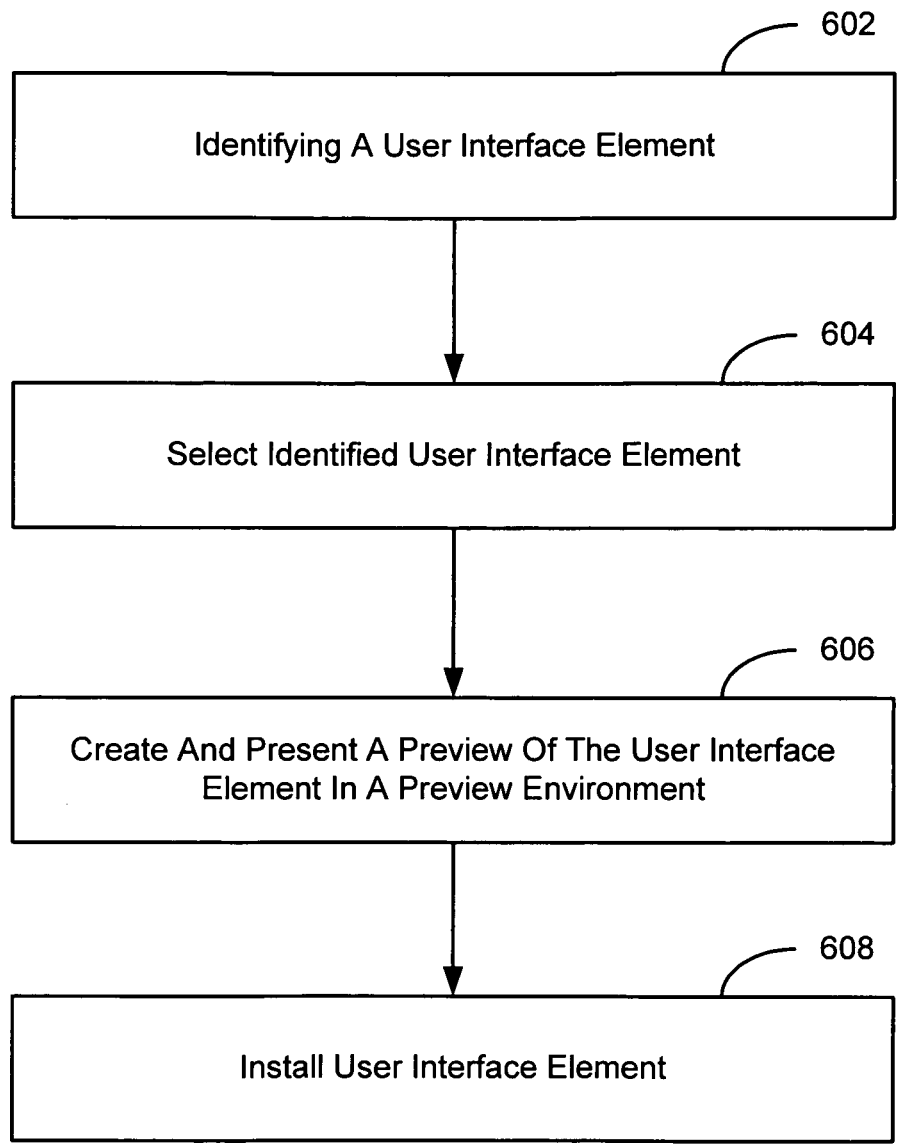
FIG. 6 is a flow diagram of an exemplary process for installing a user interface element (e.g., a dashboard) in a display environment.

FIG. 6 is a flow diagram of a process for installing a user interface element (e.g., a dashboard). The process includes identifying a user interface element (602). Identifying the user interface element can include locating a dashboard. Locating can include using a search tool or the like to locate dashboards available for installation. Alternatively, other methods can be used for identifying user interface elements for installation including automatic and user controlled identification methods.

After identification, the identified user interface element is selected for installation (604). Selecting a user interface element can include selecting a user interface element from a configuration bar (e.g., configuration bar 408), a user interface bar, a tool bar, a menu, an authoring application, or other source. Alternatively, selecting can include dragging or dropping the user interface element onto a display environment (e.g., a dashboard layer), downloading the user interface element from a content source or other source, or other selection process. Selecting can include launching an associated installation process for installing the user interface element, a preview application for previewing the user interface element prior to installation or other application including authoring applications. The launching of the applications can be automatic or user or otherwise selectively controlled.

Upon receipt of the selection, an installation window is presented (e.g., installation window 460). In some implementations, the installation window includes a user interface display portion, a prompt, and one or more interactivity elements. The user interface display portion can include a reference, partial display, or complete (e.g., complete but for the ability to interact, a static display) display of the user interface element that has been selected. The reference (e.g., reference 456) can be a complete reference, a pointer, a designator, a still image, or otherwise that identifies the candidate user interface element for installation. In this way, the user is able to recognize that the selection made corresponds to content (e.g., a widget) that the user desires to install.

The prompt can be of the form of a confirmation to the user of the underlying action (e.g., prompt 458). In one implementation the prompt can be used to confirm a desire to install a named dashboard. In other implementations, the prompt can be used to confirm not only the named user interface element for installation, but the display environment into which the user interface element will be installed (e.g., "Install named dashboard #1 on my desktop?" or "Install travel dashboard as dashboard #2"). In still other implementations, the prompt can include a confirmation of an action (e.g., "install the dashboard and open it in my user interface").

The interactivity elements can be of the form of buttons or the like. In one implementation, the installation window includes two interactivity elements including a cancel element (e.g., a delete button 467), and an installation element (e.g., an installation button 465). Other interactivity elements are possible, including those that link to other associated applications, content sources (e.g., to allow for the selection of a different dashboard for installation), preview option (e.g., if not automatically previewed) and the like.

Continuing with the method, if a preview option is selected or required (optional), then a preview of the element in a preview environment is created and presented (606). The creation of the preview environment can include the invocation of a window management engine (e.g., window manager 550) for managing the interaction of one or more windows that make up the preview. In some implementations, the preview includes a presentation window (e.g., presentation window 462) and a preview designator (e.g., preview designator 464) that are separate processes. The presentation window is used to display an instantiation of the selected element. In some implementations, the display of the presentation window includes an instantiation of the selected element in a selectable interactive environment. The preview designator is provided to clearly indicate that the preview operation is being performed, as opposed to a conventional direct installation. In some implementations, the preview is presented at a same location in the user interface. Alternatively, if other elements are present at this location, another location or an temporary overlay can be used. In some implementations, the preview designator 464 is a carpet, onto which the presentation window 462 is laid (e.g., layered, overlaid, or the like).

In some implementations, theme content can be presented along with the user interface element in the preview installation window 460. The theme content can include a theme presentation element that operates as the preview designator (e.g., additional content that is recognized as being part of a preview of an item, for example a preview title or the like). Other theme content can be presented to preview how the final installed version of the user interface element will appear. For example, assuming a theme border is to be presented with the user interface element at installation, the preview can include the same theme border.

Associated with the preview process may be an authoring or selection process. For example, if the preview displayed is not satisfactory to a user (e.g., the theme content is unsatisfactory), an interactivity element can be presented in the user interface to allow the direct launching of another process (e.g., a search process or application, an authoring application, a selection application or other process or application so that a more appropriate/desirable user interface element can be located/installed) with or without terminating the installation process.

Finally, the user interface element can be installed (608). The installation of the user interface element can include the installation on a tool bar (e.g., a configuration bar), in a resource, in a dashboard manager or in a display environment (e.g., directly on a dashboard layer or the desktop). Installation can include the saving of the underlying content metadata including data structures defining the user interface element in a library or the like. Alternatively, the installation can be part of an underlying application (e.g., directly in an associated dashboard application or a library associated therewith). In some implementations, the installation of the user interface element includes the removal of the preview designator. For example, where a carpet is used to designate the preview, the carpet can be removed for the final installation. In one implementation, the final installation is performed at a same location in the user interface as the preview. In some implementations, an animation or other transition effect can be used when moving from preview to final installed user interface elements. Transitions can include the appearance of pulling of the carpet preview designator from under the user interface element or otherwise making the carpet disappear.

The process steps described can be performed in other orders, repeated or the like to provide desired results. For example, the preview process can be repeated in association with the selection of multiple different user interface elements prior to invoking the installation step.

Once installed, user interface elements can be removed/deleted from the display environment as required. In some implementations, a separate deletion process is provided from the installation process. Alternatively, the installer process can be invoked to remove/delete user interface elements as required.

In some implementations, deletion includes deactivating the dashboard but the dashboard remains installed on the system or device. Alternatively, deletion includes removing the dashboard completely from the system or device. If a request to delete a dashboard is received in response to a user action (or programmatically by the operating system or another application), then a message providing the user with deletion options can be presented, enabling the user to determine whether the dashboard will be deactivated and/or removed from the system or device. In some implementations, the system or device executes a default deletion option which can be changed by the user via a preference pane or other input mechanism, or overwritten by an application or other software component or device (e.g., security engine 544).

Dashboards and any associated files or information can be stored locally on the device hosting the dashboard (e.g., on a local hard drive or in memory), or stored on a network device (e.g., on a server). The storing of dashboard information can occur during installation and runtime. Information can be persistently or non-persistently stored depending on the type of dashboard and/or its functionality. Dashboard information can be stored per user on the same device (e.g., multiple users logged onto the same device) or on a network server (e.g., a subscription service).

In some implementations, dashboards can versioned so that version conflict resolution can be provided based on the version during installation of dashboard updates or upgrades.

Dashboard Searching

In some implementations, a dashboard can be associated with a dashboard data type or other metadata to enable a search engine (e.g., Apple's Spotlight® search engine) to search for dashboards in files, documents, images, emails, applications, etc. Metadata can be included by the author in files associated with the dashboard and/or can be provided by the user during, for example, dashboard construction using a dashboard manager, as described with reference to FIGS. 7*a* and 7*b*. Dashboards can be indexed based on data type and/or other metadata. For example, a query can be generated requesting a list of all dashboards on a host machine and/or devices on a network. The search engine accesses the index to locate dashboards on the host device and/or network devices.

In some implementations, dashboards can be searched by other dashboards and/or a search mechanism (e.g., a search engine) for particular content (e.g., other dashboards). For example, a query can be generated programmatically or by a user requesting a list of all dashboards related to a particular user interest which are available for access locally or through a network connection.

Dashboard Manager

In some implementations, a dashboard manager allows users to inspect, remove, enable, disable, show and hide dashboards. The dashboard manager can be a preference pane, a standalone application or a plug-in. The dashboard manager displays dashboard information, including but not limited to the dashboard's title, author, version, class, type, ratings, description, etc. The information can be displayed in any order and format according to one or more sorting criteria, such as alphabetical or chronological order, author, class, rating, etc. In some implementations, the dashboard manager tracks widget updates and automatically notifies the user or host system or device when an update is available. In some implementations updates can be automatically installed by a software updater or a security engine if the updates are security related.

In some implementations, the dashboard manager allows users to perform certain actions on dashboards, including but not limited to copying, moving, deleting, uninstalling, deactivating, enabling, disabling, renaming, previewing, showing, hiding etc. In some implementations, the dashboard manager includes functionality that allows the import and export of dashboards or individual widgets to and from various sources (e.g., network, email, CD ROM, etc.). For example, dashboards can be imported and exported to and from a web site that can be accessed by multiple users. In some implementations, the dashboard manager includes a search field that allows users to search for dashboard s on a host system or device, and/or one or more networked devices.

In some implementations, the dashboard manager can be invoked by a button or other input mechanism located in a user interface (e.g., desktop, system tray, dashboard layer, configuration bar, etc.). For example, when the button is activated, the dashboard manager is launched and a user interface is displayed. In some implementations, the dashboard manager can include widget management functions, such as those described in U.S. patent application Ser. No. 11/429,492, for "Management of User Interface Elements in a Display Environment." In one implementation, the dashboard manager is a dashboard itself and includes at least some characteristics, attributes or properties of other dashboards. For example, the dashboard manager can be enabled or disabled, resized, hidden, dragged and dropped, flipped to reveal special options or preferences, etc.

In some implementations, the dashboard manager can be displayed in a format that is consistent with a dashboard theme or content. The appearance and/or properties of the dashboard (e.g., colors, styles, fonts, animation, etc.) can be changed by a user via a preference pane or other input mechanism.

In some implementations, a dashboard manager can be used to manage and enforce DRM rules. For example, the dashboard manager can interpret DRM rules associated with dashboards, widgets and other content, and deny installation, launching or access to the dashboard, widgets and other content (or to features or functionality thereof) based on the DRM rules. For example, a dashboard, widgets or other content may be licensed for use on a single host device. In such a case, the dashboard manager could interact with the operating system of the host device to prevent copying of the dashboard, widgets or other content to other devices from the host device.

Example User Interface for a Dashboard Manager

Figure 7A:
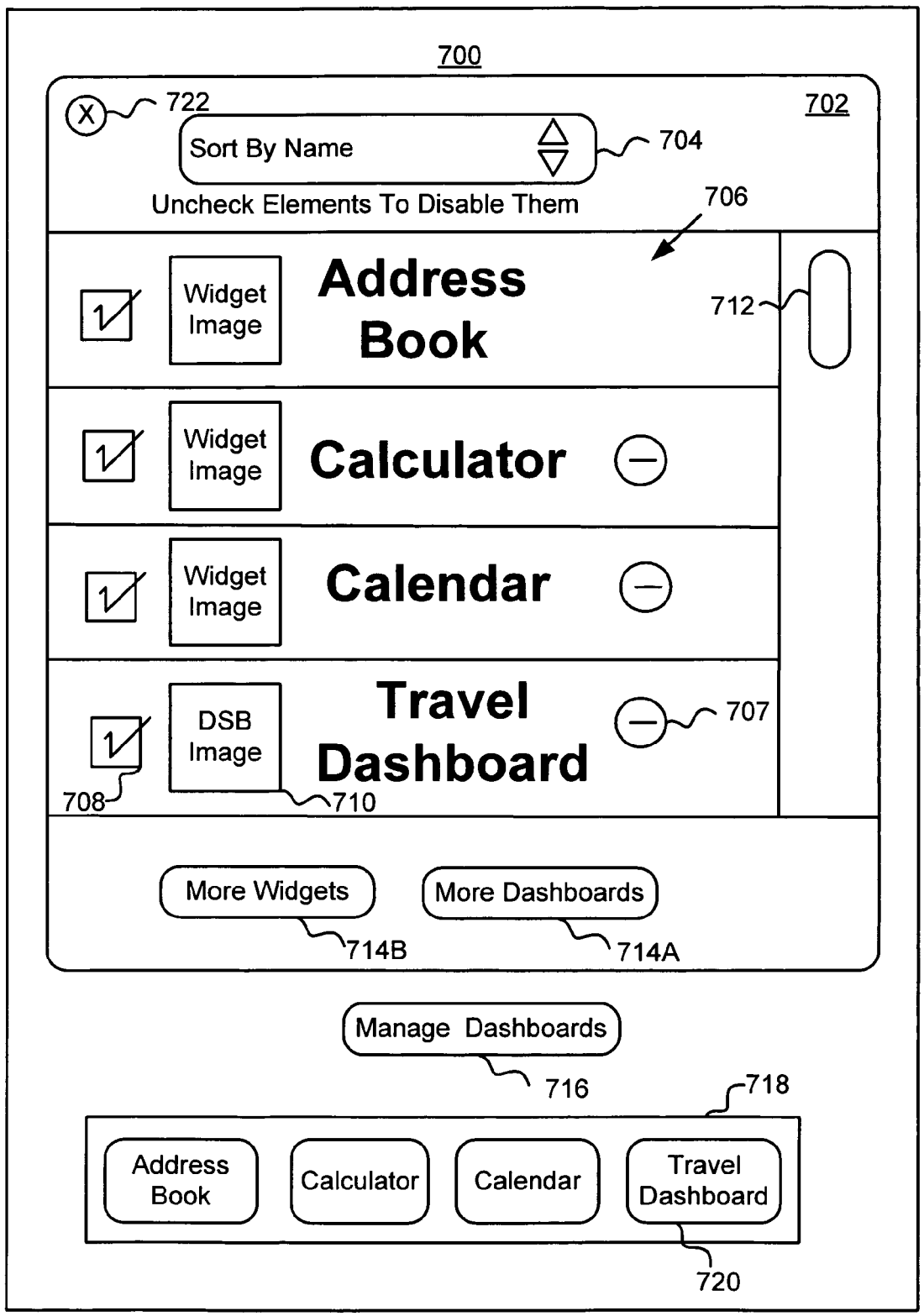
FIG. 7a illustrates an exemplary user interface for a dashboard manager.

FIG. 7*a* illustrates a user interface 702 for a dashboard manager. It should be apparent that a user interface for a dashboard manager can include more or fewer features than shown.

In some implementations, the user interface 702 is displayed in another user interface 700 (e.g., a desktop or dashboard layer) in response to user input. User input can include, for example, clicking on a button 716 (e.g., a "Manage Dashboards" button) or other input mechanism located in the user interface 700. The user interface 702 can be dismissed by clicking on button 722 or other input mechanism.

In some implementations, the user interface 702 includes a scrollable list 706 of user interface element names and/or other attributes which correspond to elements that have been installed on the host system (e.g., dashboards, widgets, etc.). In some implementations, the scrollable list 706 includes dashboards that reside on the host system but have not been installed (e.g., dashboards downloaded to a desktop). This implementation enables users to install dashboards from within the dashboard manager. In some implementations, the list 706 includes names of dashboards that reside on another device coupled to the host system via a network connection. In some implementations, a search history is maintained to enable the user to refine search terms and/or re-run a previous search. In some implementations, one or more dashboards in the list 706 can be turned down to reveal a list of widgets or other content (e.g., URLs) associated with the dashboard.

Optionally, next to each element is an icon image 710 associated with the element that can assist the user in selecting the element (e.g., dashboard) from the list 706. Elements that are selected to be hidden (e.g., based on a "hide dashboard" option provided in the dashboard manager) will not be shown in the list.

The elements can be scrolled using, for example, a scroll bar 712. Users can also toggle each element on and off (e.g., enable/disable the widget, dashboard, etc.) by selecting a checkbox 708 located to the left of each element listing. Similarly, on the right side of some element listings is a button 707 or other input mechanism that allows users to delete the element. Note that for this example, elements that cannot be deleted do not have a corresponding button 707.

In some implementations, the user interface 702 includes a menu 704 (e.g., located at the top of the user interface 702) of sorting options that will sort the list 706 by name, date, author, rating or any other sorting criteria. In some implementations, the menu 704 includes an option to sort elements based on whether the elements are enabled or disabled.

In some implementations, a button 714 (e.g., a button labeled "More Dashboards . . . ") or other input mechanism allows a user to search for more dashboards located in local directories or on one or more network devices (e.g., a website).

In some implementations, when a dashboard is enabled (check box 708 is checked) the dashboard's icon image 720 is displayed in a configuration bar 718 in user interface 700. For example, since the check box 708 associated with the "travel dashboard" is checked, its icon image 720 is displayed in the configuration bar 718 in user interface 700. Similarly, if the check box 708 is unchecked, then the image icon 720 is not displayed in the configuration bar 718 or its appearance is altered (e.g., grayed out, darkened, made translucent, etc.) to indicate to a user that the dashboard is disabled.

Figure 7B:
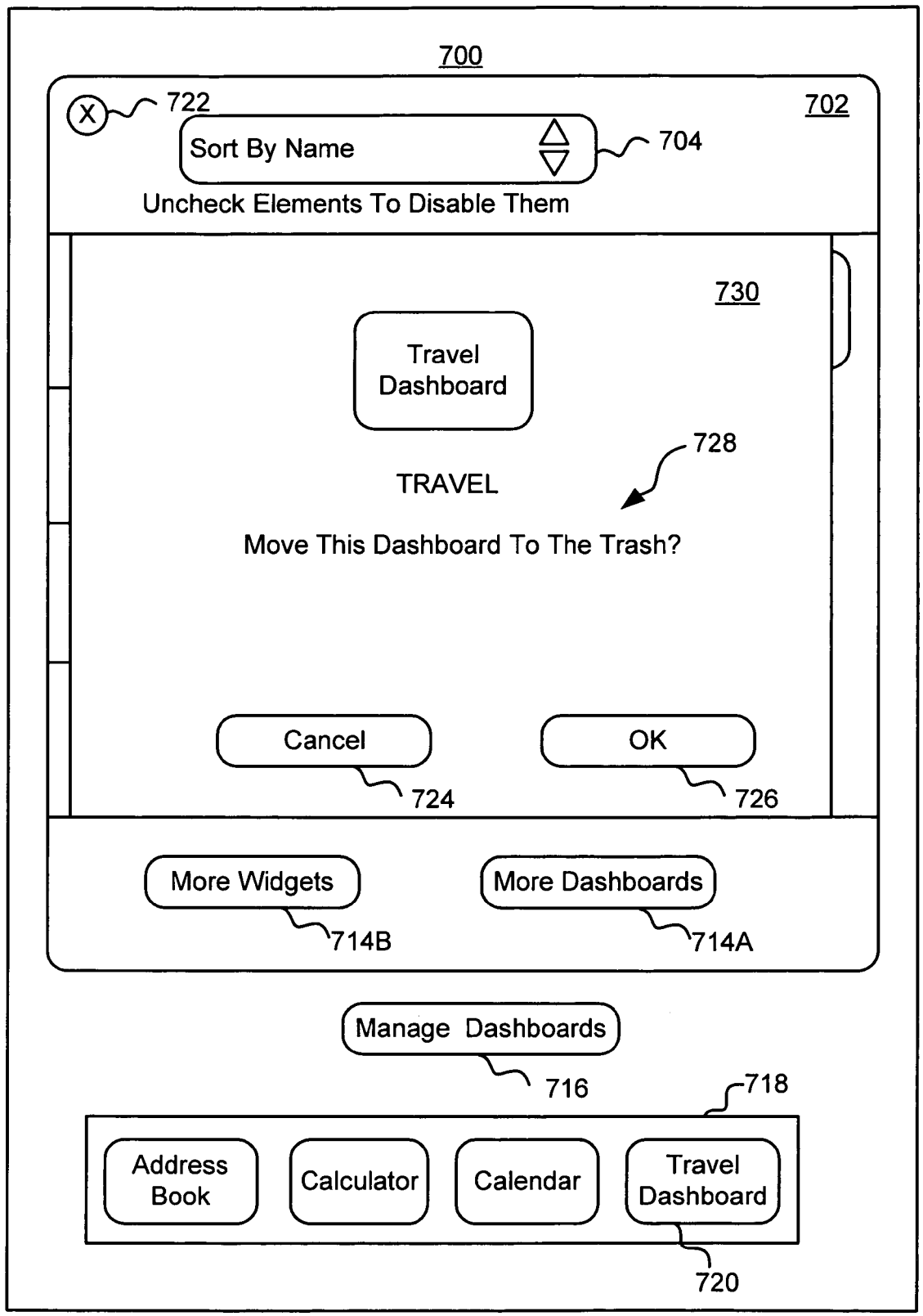
FIG. 7b illustrates an exemplary user interface for a dashboard including management of dashboard elements.

FIG. 7b illustrates a dashboard manager overlay 730 for requesting a user to confirm the deletion of a dashboard. In some implementations, when clicking the delete button 707 (FIG. 7a), a semi-translucent overlay 730 appears within the user interface 702 including a message 728 requesting the user to confirm their intent to delete the dashboard. For example, the message 728 could be "Move this dashboard to the Trash?" The user can respond to the message 728 by clicking a button 726 ("OK"), which results in the dashboard being moved to the "Trash" or otherwise deleted from the host system. The user can also respond by clicking a button 724 ("Cancel"), which results in the deletion operation being terminated. If a dashboard is moved to the "Trash" or otherwise deleted, then its icon image 720 is removed from the configuration bar 718.

Multiple Dashboards

Figure 8:
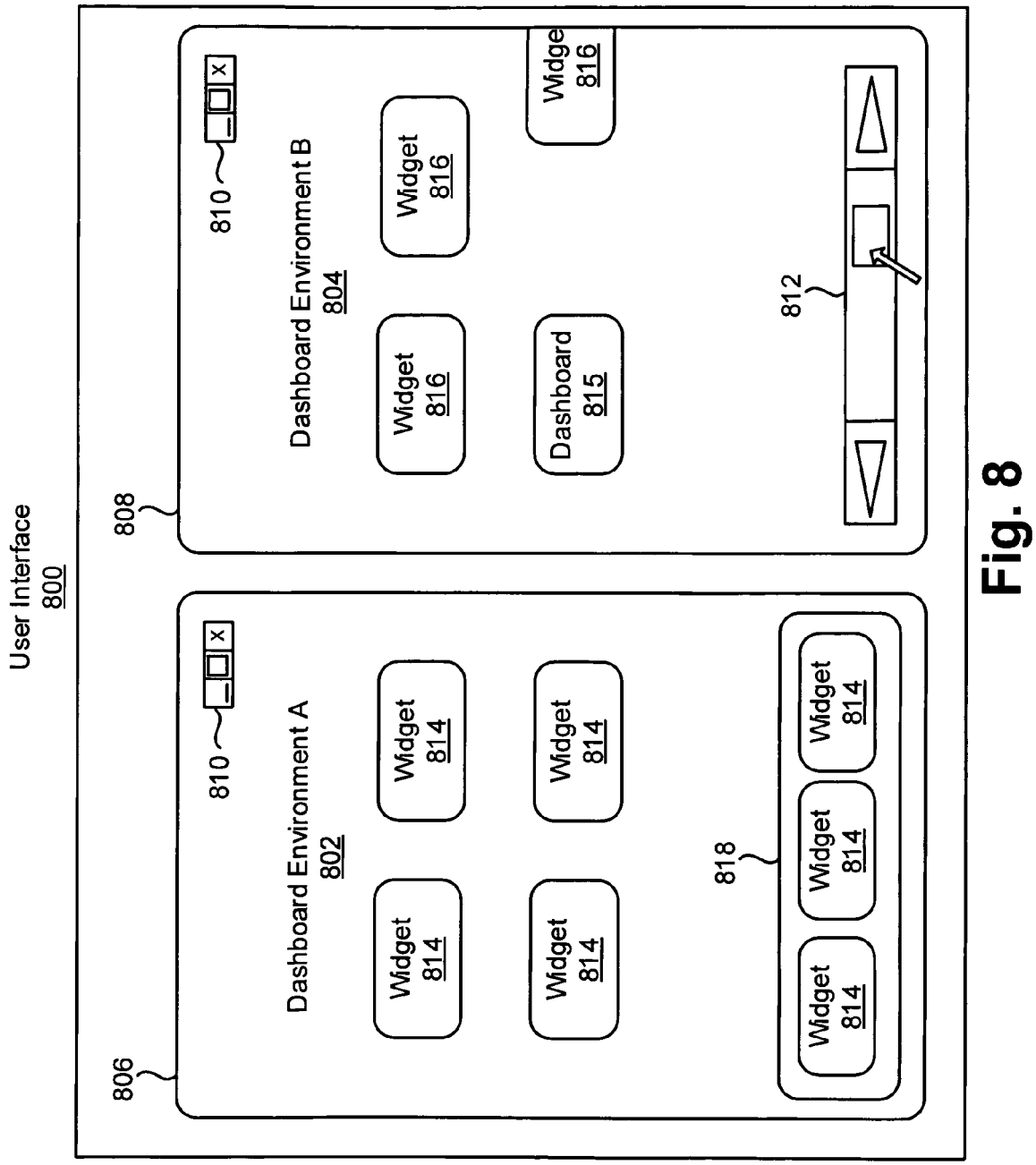
FIG. 8 illustrates an exemplary user interface including multiple display areas associated with multiple dashboard environments.

FIG. 8 illustrates a user interface 800 displaying dashboard environments 802 and 804. In some implementations, more than one dashboard is available. For example, the user can create and configure one dashboard to contain widgets related to work, and another for widgets related to personal matters. Different trigger events (e.g., different key combinations, menu selection, etc.) can be used for triggering the dashboards. State information for each dashboard can be saved enabling the dashboards to be restored to their previous respective configurations. Different dashboards can contain one or more of the same widgets. State information for a widget can be maintained separately for each dashboard in which the widget appears, or it can be commonly maintained across all dashboards in which the widget appears. Different dashboards can be available or "owned" for different users of a computer or other electronic device, such that each user can only access their own dashboard(s). A user can specify a dashboard as being available to other users, if desired. A user can also specify, for any or all of the dashboards he or she creates, whether other users are permitted to make changes to the dashboard(s). Alternatively, these actions can be controlled by the security engine 544, described in reference to FIG. 5.

In some implementations, the dashboard environments 802, 804, are associated with display areas 806, 808 which are controlled using one or more control elements 810 and navigated using one or more navigation elements 812. The display areas 806, 808, can be configured to be displayed on multiple display devices (e.g., two different monitors). Display areas 806, 808, can be generated by a network device (e.g., a web page server) and transmitted over a network connection (e.g., the Internet) for presentation on a user device (e.g., embedded in web pages).

In some implementations, the display areas 806, 808, can be controlled through a remote control device (e.g., an infrared or radio frequency remote control, etc.), in a media center environments, as described in U.S. patent application Ser. No. 11/497,801, filed Aug. 1, 2006, for "Media Center Including Widgets".

Although FIG. 8 shows two dashboard environments and their associated display areas, more than two dashboard environments and their associated display areas can be created, invoked and/or presented as desired, depending on the needs of a user, application, operating system, etc. The management, installation and use of multiple dashboards on a single host device is described in U.S. patent application Ser. No. 11/346,603, for "Multiple Dashboards."

In some implementations, the display areas 806, 808, can be presented and arranged in the user interface 800 in either an ad hoc manner (e.g., anywhere in the user interface) or an orderly manner (e.g., cascaded, tiled, etc.). For example, in FIG. 8 the display areas 806, 808, are tiled (side-by-side) in the user interface 800. In some implementations, display areas 806, 808, can be presented in the user interface 800 at different locations and at different times. For example, when the display area 806 is active in the user interface 800, the display area 808 can be hidden or obfuscated (e.g., darkened, faded out, etc.). In such an implementation, each of the display areas 806, 808, can be a dashboard layer 402, as described with respect FIG. 4. A user can transition between display areas 806, 808, using one of a number of known transition effects, including but not limited to carousels, panning out, flips, peeling, slide in/out, confetti, etc. A transition between display areas 806, 808, can be initiated through physical input devices (e.g., keyboard, mouse, etc.) and/or virtual input devices (e.g., buttons, sliders, etc.). In some implementations, a transition from a first display area to a second display area occurs without closing or hiding the first display area.

Generally, dashboard environments can be invoked (with their associated display areas presented in a user interface) in response to user input (e.g., key combinations, mouse clicks, touch input, etc.), inferred by context or programmatically by an application, operating system, etc. Display areas can be resized and dragged about the user interface as desired.

The control mechanisms 810 (e.g., buttons) are used to close, minimize and restore (up/down) the display areas 806, 808. The navigation mechanisms 812 (e.g., scroll bar, arrows, etc.) are used to navigate the dashboard environments 802, 804. For example, by sliding a scroll bar 812, the user can display hidden dashboards in the display environment.

In some implementations, the dashboard environment 802 includes one or more widgets 814 or groups of widgets 818 and the dashboard environment 804 includes one or more dashboards 815 and one or more widgets 816. The widgets 814 and 816 can be in the same widget class (e.g., all game widgets), different widget classes (e.g., game widgets, utility widgets, etc.), or partially overlapping two or more classes. In some implementations, the widgets 814, 816 and 818 can communicate information or data to each other across dashboard environments. For example, a widget 814 in the dashboard environment 802 can generate data that is processed, displayed and/or printed by a widget 816 in the dashboard environment 804, and vice-versa. A widget can also be in both dashboard environments 802, 804.

Figure 9:
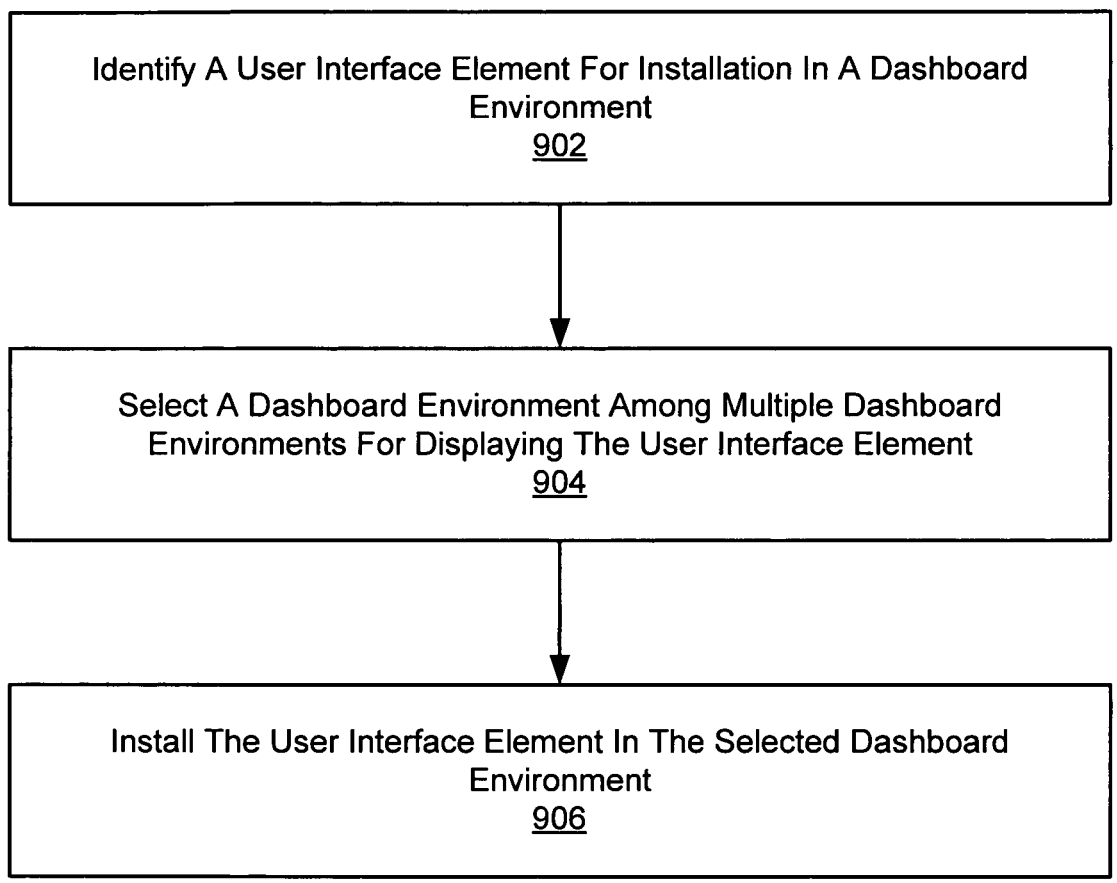
FIG. 9 is a flow diagram of an exemplary process for installing user interface elements in multiple dashboard environments.

In some implementations, widgets can be installed/instantiated in multiple dashboard environments using a multiple dashboard installation process 900, as described with respect to FIG. 9. In other implementations, widgets can be installed in a dashboard environment by dragging a widget from another location in the user interface 800 (e.g., from a configuration bar or desktop) and dropping it into the display area associated with the dashboard environment where the widget is to be installed (i.e., drag and drop functionality). Widgets can be dragged from any user interface, including but not limited to: a desktop, an application, a display window for another dashboard environment, etc. In some implementations, packages of widgets are installed in a dashboard environment.

In some implementations, a dashboard environment and widget can be matched up based on a widget class or a theme. Widgets can also be previewed prior to installation in a dashboard environment. The preview can occur in a dashboard display area or in a separate preview window in a user interface.

As previously discussed with respect to FIGS. 4, 5 and 6, a configuration bar 408 can be used to store images of dashboard icons which can be clicked or dragged into a display area for a dashboard environment to trigger invocation of the dashboard. During dragging, the dashboard can be animated to its actual size, or scaled size, or other representation to assist the user in real-time layout of widgets in the dashboard. In some implementations, a widget manager is used to preview, install, enable, disable, show and hide widgets. For example, the widget manager can include an button or other input mechanism which when activated invokes a preview of the widget. The user can be provided with an option to install or delete the widget during or after the preview.

Multiple Dashboard Installation Process

FIG. 9 is a flow diagram of a process 900 for installing widgets in multiple dashboard environments. The process 900 begins by identifying a widget for installation in a dashboard environment (902). A widget can be identified for installation when a request to install is received (e.g., from user input or programmatically) or an attempt to install is detected. For example, when a user downloads, copies or transfers a widget, or a package of widgets, from an external source (e.g., a web site, CD ROM, email attachment, etc.) onto their computer or other electronic device (e.g., mobile phone, media player, etc.), each widget is identified for installation into one or more dashboard environments. Once the widget is identified for installation, one or more suitable dashboard environments are selected for the widget based on one or more selection criteria (904). The widget is then installed/instantiated in the selected dashboard environment(s) (906).

In some implementations, dashboard icons can be displayed in a configuration bar in the same manner as widgets. Similar to a widget, a new dashboard can be installed or launched by clicking on the dashboard or an icon associated with the dashboard, or dragging the icon from the configuration bar and dropping it into the display area of another dashboard or a user interface.

In some implementations, a dashboard of dashboards can be created for enabling the user to select between multiple dashboards. A dashboard of dashboards can have an icon which is displayed in a configuration bar. When the user clicks on the icon, or drags and drops the icon in a display area, the dashboard of dashboards is displayed. A dashboard of dashboards can have all the properties and characteristics of the other dashboards described herein.

In some implementations, the selection criteria can be based on a theme. For example, a widget that is associated with a theme can be matched up with a dashboard environment associated with the same or similar theme during installation.

Another selection criteria can be a widget's class. A widget can be installed in a particular dashboard environment based on its class. For example, a widget that is classified as a game widget can be installed in a dashboard environment for game widgets. Such an environment can include, for example, widgets having large game controls (e.g., joysticks), programmable buttons, etc.

Similarly, widgets that are associated with digital media items can be installed in a dashboard environment for digital media items (e.g., media players, etc.). In such an environment, the display window associated with the dashboard environment may be invoked in a full screen mode based on the presumption that a medium item (e.g., a video) will be played.

In some implementations, the widgets are matched to suitable dashboard environments based on information contained in one or more files or data bundled with a widget or dashboard (e.g., an info.plist file). For example, widgets that are requesting access to system or network resources can be matched to a dashboard environment that is associated with certain security rules or that includes security event monitoring, such as the security monitoring described in co-pending U.S. patent application Ser. No. 11/432,295, for "Widget Security." Alternatively, a widget can inherit privileges (e.g., network access privileges) from the dashboard upon installation.

The display area for a dashboard environment can be customized based on its theme or class by specifying various attributes or properties of the display area, such as fonts, styles, colors, type and number of control and navigation mechanisms, viewing angles (e.g., full screen, half screen, etc.) and the like. In some implementations, widgets installed in a customized display window inherit the same attributes or properties as the display area to maintain a uniform appearance between the display area and the widgets (i.e., to maintain the "look and feel").

In some scenarios, preexisting dashboards may not be available for installing widgets. In such cases, a new dashboard environment can be created using a dashboard assistant process or dashboard manager as described above. With a dashboard assistant or manager, a user can build a custom dashboard environment by selecting one or more preexisting dashboard templates and various dashboard properties or attributes, such as size, title, fonts, style, etc. Alternatively, the user can create their own templates by creating a new dashboard environment using dashboard construction tools (e.g., a dashboard palette 460), then save the environment as a template for future use. For example, the use may create a multiple dashboard environment include a game dashboard and sports dashboard using, for example, a dashboard assistant or manager. The dashboard assistant or manager can be, for example, an application that guides a user through set-up options and can be invoked manually through an icon or automatically in response to a trigger event (e.g., an attempt to install a widget with no preexisting dashboard environments).

A suitable template can be selected by a user manually based on its various properties and attributes (e.g., a game dashboard template). A template can also be selected automatically by an application, operating system and the like. Templates can be organized in a file system on a user device and/or on a remote server that is accessible by a device through a network connection. The templates can be stored on a local storage device (e.g., a hard drive) and organized for easy retrieval based on class, themes or any other selection criteria that is useful in distinguishing between dashboard environments. A search form can be provided by the dashboard assistant process to assist users in finding suitable templates based on one or more search criteria entered by the user.

The user can also specify one or more rules to be associated with a dashboard environment. These rules can be security rules that deny the installation of widgets or dashboards which have certain properties (e.g., request access to system or network resources) or have been identified as "rogue" or "malicious." The user can also specify content rules for controlling content that is displayed or used by a widget or dashboard (e.g., parental controls). Access rules can also be specified for determining who can install and use a widget, dashboard or class of widget or dashboard in a particular display environment. For example, an access rule may specify that only the owner of a device (e.g., a personal computer) can install widgets in a particular dashboard environment, while allowing guest log-ins of the device to create a temporary dashboard environment for temporarily installing widgets. If a guest log-in attempts to install a widget in an access-restricted dashboard environment, a dashboard assistant can be launched which invites the guest log-in to create and/or specify a temporary dashboard environment which is appropriate for a guest log-in (e.g. including restrictions on resource access).

In some implementations, a new dashboard environment can be created from a number of preexisting templates using a dashboard assistant process.

Nested Dashboard Display Areas

Figure 10:
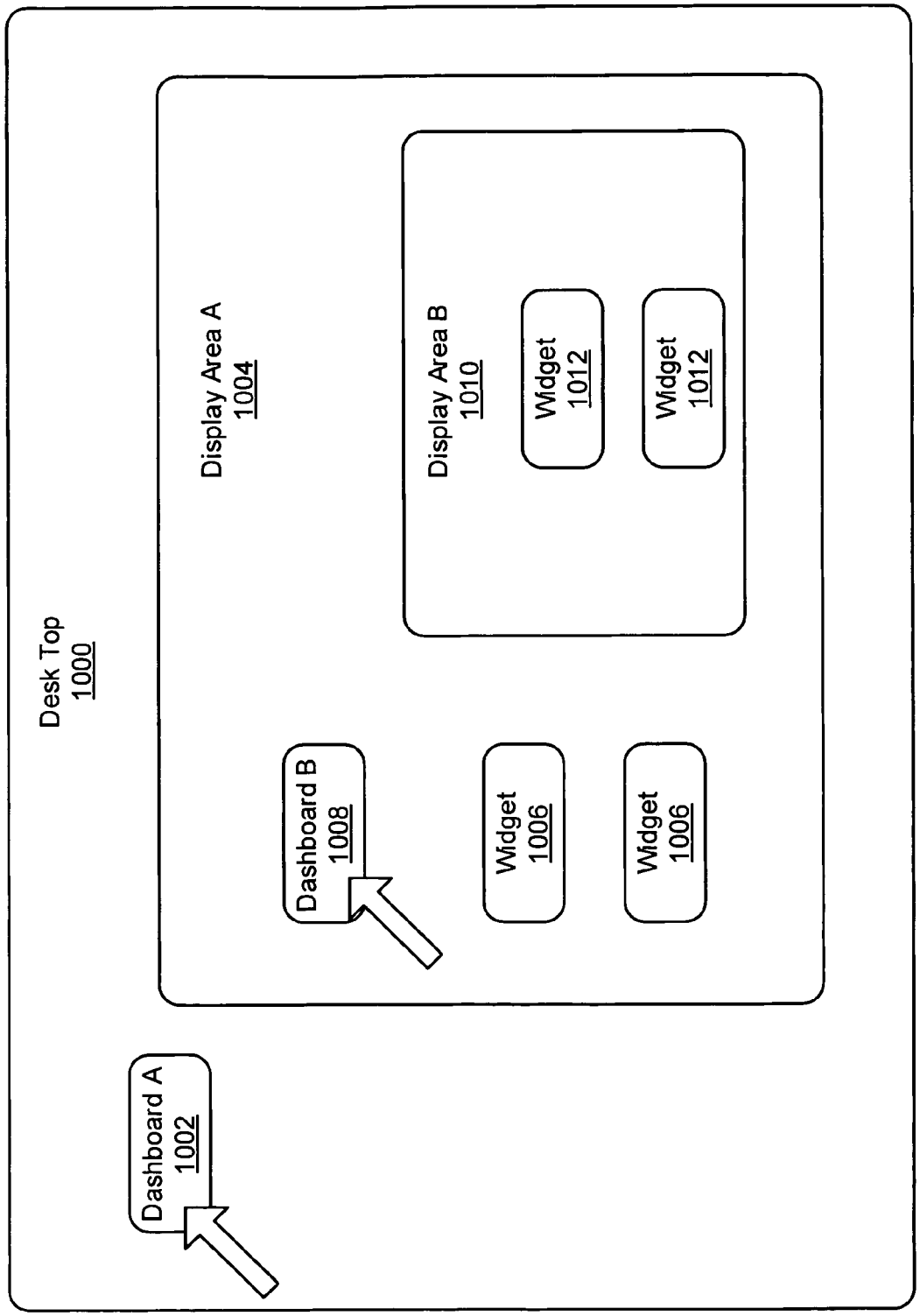
FIG. 10 illustrates nesting display areas associated with dashboard environments.

FIG. 10 illustrates nested dashboard display areas 1004 and 1010. In some implementations, the dashboard display areas 1004 and 1010 can be nested or stacked N layers deep on a user interface. The opacity of each layer can be made semi-translucent so that the layer below it is visible. In other implementations, the dashboard display areas 1004 and 1010 can be presented in a user interface as a linear sequence, as overlapping tiles, or on multiple surfaces of an animated two-dimensional or three-dimensional graphical object, as described with respect to FIGS. 12-14.

In some implementations, a desktop 1000 includes a dashboard A icon 1002. When the dashboard A icon 1002 is activated (e.g., clicked, mouse-over, etc.), the display area 1004 associated with a dashboard environment A is presented on the desktop 1000. The display area 1004 includes one or more widgets 1006 and a dashboard B icon 1008. When the dashboard B icon 1008 is activated, the display area 1010 associated with a dashboard environment B is presented, for example, within the display area 1004. The display area 1010 includes one or more widgets 1012.

In some implementations, the display area 1010 can be initially presented in the display area 1004 and then resized and/or moved anywhere on the desktop 1000 by a user or application. The display areas 1004 and 1010, can include control and navigation mechanisms. The widgets 1006 and 1012 can be a member of the same widget class, a different widget class, or partially overlapping two or more widget classes. The display areas 1004 and 1010 can be displayed at the same time in a stack or cascade arrangement, or one at a time by hiding or obfuscating one of the display areas. Alternatively, a transition effect can be used to transition between the display areas 1004, 1010, whenever one of the display windows 1004, 1010, is activated (e.g., selected or focused upon by a user). For example, if a user clicks on the display area 1010, the display area 1004 can become obfuscated (e.g., darkened, minimized, etc.) and vice-versa.

In some implementations, widgets 1006 in display area 1004 that are dragged and dropped into the display area 1010 will become part of the dashboard environment B, provided the widgets 1006 conform to any rules associated with the dashboard environment B. Similarly, widgets 1012 in display area 1010 that are dragged and dropped into the display area 1004 and will become part of the dashboard environment A, provided the widgets 1012 conform to any rules associated with the dashboard environment A. Widgets on the desktop 1000 (not shown) can also be dragged and dropped into the display areas 1004 and 1010.

The use of nested display areas associated with different dashboard environments enables users to organize dashboards into hierarchies based on a user interests (e.g., entertainment, hobbies, sports, work, etc.) or other criteria. For example, a user can have a dashboard for entertainment-related widgets which are applicable to multiple types of entertainment, which can further include one or more nested dashboards including widgets that are specific to a particular form of entertainment (e.g., movies, books, etc.). In some implementations, widgets can be automatically associated with nested dashboards without user interaction during download, installation, etc.

Multiple Dashboard Server Processes

Figure 11:
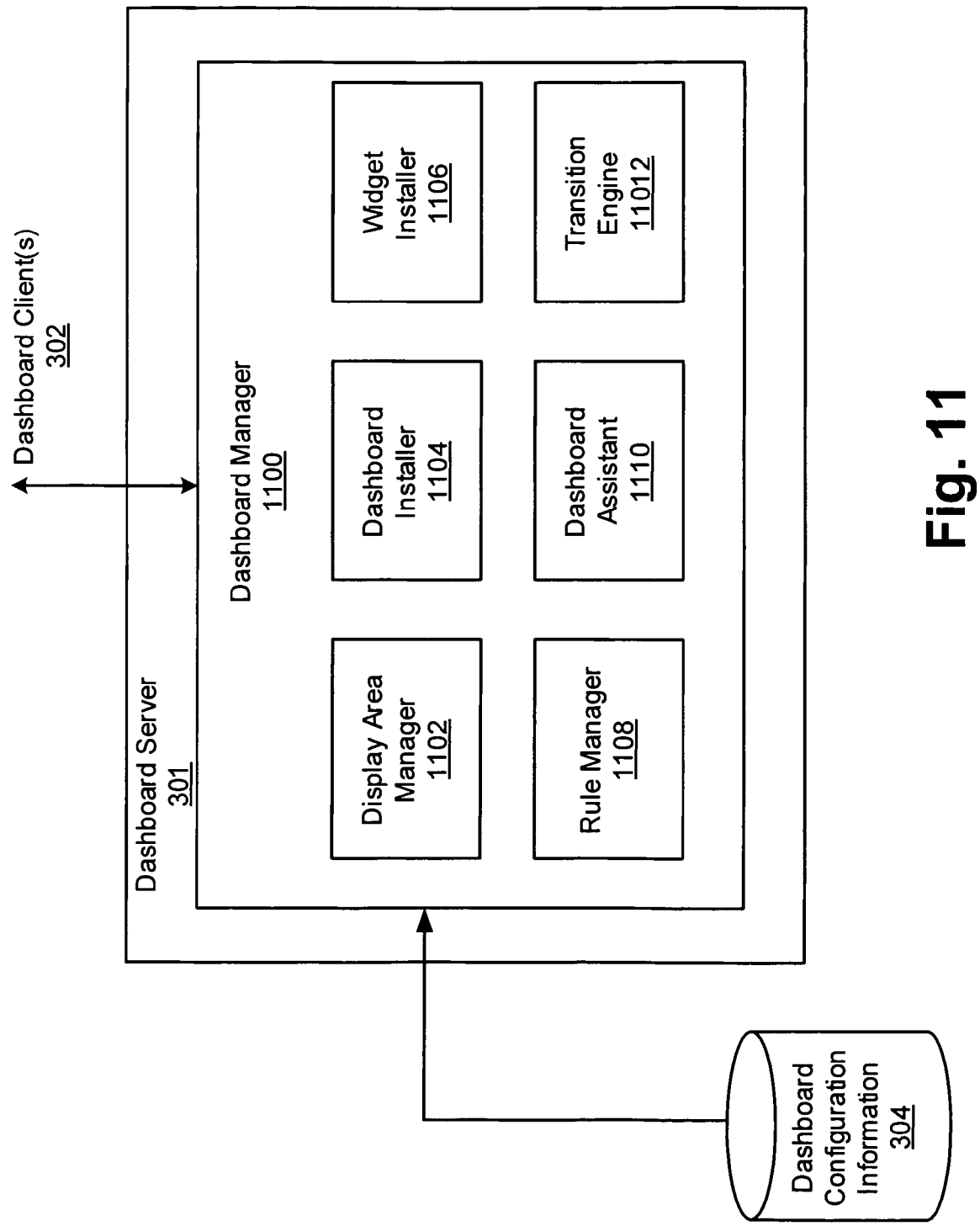
FIG. 11 is a block diagram of an exemplary dashboard manager for managing various processes associated with multiple dashboard environments.

FIG. 11 is a block diagram of an alternative implementation of a dashboard manager 1100 for managing various dashboard processes. The dashboard manager 1100 includes a display area manager 1102, a dashboard installer 1104, a widget installer 1106, a rule manager 1108, a dashboard assistant 1110 and a transition engine 1112. In this particular implementation, the dashboard manager 1100 is shown as part of the dashboard server process 301, as described with respect to FIG. 3. Alternatively, one or more of the dashboard manager processes identified above, can be run outside the dashboard server process 301 by an operating system, application, plug-in, etc.

Display Area Manager

The display area manager 1102 manages and presents display areas associated with dashboard environments in a user interface. The display area manager 1102 responds to input from control or navigation mechanisms, and handles communications between dashboard environments and with applications, operating system components, drivers, plug-ins, etc. For example, if a user moves a scroll bar in the display area, the display area manager 1102 determines which portion of the associated dashboard environment to display, and invokes the appropriate operating system processes and/or drivers to present the dashboard environment in the display area. In some implementations, the display area manager 1102 creates and maintains a list of widgets for each dashboard environment, which can be stored in, for example, the dashboard configuration information 304 and presented to the user.

Dashboard Installer

The dashboard installer 1104 is responsible for installing dashboard environments based on input received from the dashboard assistant 1110 or from another input source. The dashboard installer 1104 registers the dashboard environment with the operating system, so that other applications, operating system components and drivers, or other dashboard environments and/or widgets, can communicate with the newly installed dashboard environment.

In some implementations, an installer checklist is presented in a window, pane or other user interface, which includes a list of available dashboards for installation. A user can select one or more dashboards for installation by, for example, checking a "check box" or clicking a button displayed adjacent to the dashboard listing (or its associated icon) in the installer checklist. The number and types of dashboards (or various extensions or enhancements to dashboards) can be made available depending on the user and their privileges, interests, etc.

Widget Installer

The widget installer 1106 is responsible for identifying widgets to be installed in a dashboard environment and for managing the installation of the widgets into the dashboard environment. In some implementations, the widget installer 1106 is capable of identifying a theme or class of a widget and selecting an appropriate preexisting dashboard environment for installation of the widget. If no preexisting dashboard environment is available, or there are no suitable preexisting dashboard environments to select from (e.g., no game oriented dashboard environment), then the widget installer 1106 invokes the dashboard assistant process 1110 to assist the user in creating a new dashboard environment.

Rule Manager

The rule manager 1108 enforces one or more rules related to widget and dashboard security, installation and access. For example, when the dashboard manager 1100 receives a security event, it invokes the rule manager 1008. The rule manager 1108 assesses the security risk associated with the security event and initiates an appropriate security action based on the risk assessment, as described in co-pending U.S. patent application Ser. No. 11/432,295, for "Widget Security." For example, if a user attempts to install a "rogue" widget in a dashboard environment, a security event is generated by the operating system and detected by the dashboard manager 1100. The rule manager 1108 assesses the risk of the event by, for example, determining whether the installation of the widget would violate any security rules. An example of a security rule would be if the widget to be installed/instantiated is on a "black list" of widgets, then the widget will not be installed in the dashboard environment. Such a "black list" could be downloaded from a trusted web site and stored locally as part of the dashboard configuration information 304 (see FIG. 3). Another example of a security rule would be if the widget to be installed/instantiated is on a "white list" of widgets which are allowed to be installed in the dashboard environment.

The rule manager 1108 also enforces rules associated with widget installation. For example, if a widget does not belong to a particular widget class or theme (e.g., a game widget) associated with a dashboard environment, and an attempt to install the widget in the dashboard environment is detected, then the rule manager 1108 can initiate an appropriate action, such as preventing the installation of the widget in the dashboard environment and notifying the requesting user or application of the reasons for the action. If the widgets are already installed, then a security action could include denying certain administrative requests, such as a request to delete the widget from a dashboard environment.

The rule manager 1108 also enforces rules that restrict access to widgets in dashboard environments. For example, a dashboard environment may be associated with rules that prevent access to certain content from being displayed (e.g., parental controls) or prevent certain users from accessing and/or installing widgets in dashboard environments (e.g., guest log-ins). In some implementations, a dashboard is associated with privileges (e.g., read/write privileges). For example, a dashboard may only allow users with appropriate privileges to install widgets in the dashboard, or otherwise alter the dashboard, as oppose to other users who are permitted only to view widgets displayed in the dashboard.

Dashboard Assistant Process

The dashboard assistant process 1110 is used to create and install new dashboard environments. In some implementations, the process 1110 works with preexisting templates to create new dashboard environments, as described with respect to FIG. 4e.

Transition Engine

The transition engine 1112 is responsible for generating transition effects for transitions between two display areas associated with dashboard environments, as described with respect to FIG. 8. When the dashboard manager 1100 receives a request to transition, it invokes the transition engine 1112, which provides the desired transition effect (e.g., panning out, carousel, flip, peeling, etc.). In some implementations, the transition effect can be selected by a user via a preference pane or other user input mechanism. In other implementations, the transition is defined by the dashboard.

Dynamic Tiling

Figure 12:
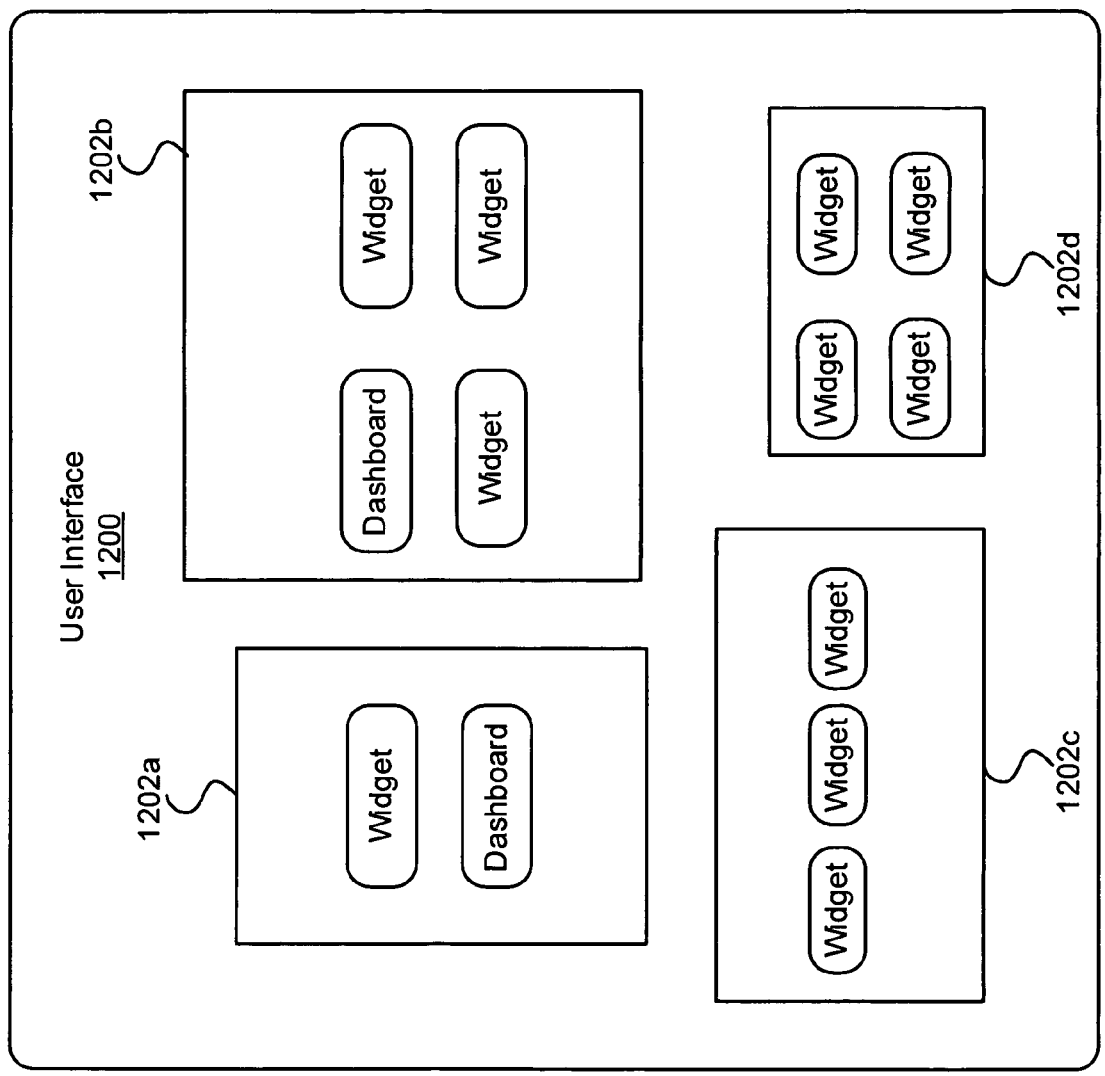
FIG. 12 illustrates an exemplary dynamic tiling scheme for organizing multiple dashboards on a user interface.

FIG. 12 illustrates a dynamic tiling scheme for multiple dashboards. In some implementations, multiple dashboards 1202 are presented in a user interface 1200 using a dynamic tiling scheme. In a multiple dashboard environment, it is possible for dashboards 1202 to have different sizes, numbers of widgets etc. Dynamic tiling enables the dashboards 1202 to be automatically resized based on the available space in the user interface 1200. The dashboards 1202 can be presented in response to user input or programmatically through an operating system or application. For example, a user can press a key or key sequence which causes the dashboards 1202 to be simultaneously dynamically tiled in the user interface 1200. Each dashboard is automatically resized to fit within the available space in the user interface 1200. Widgets and other information and/or content in the dashboards 1202 can also be resized as appropriate.

In some implementations, when a user clicks on a dynamically tiled dashboard, the dashboard is activated and automatically resizes to fill a portion in the user interface 1200 or the entire user interface 1200. The other dashboards in the user interface 1200 can remain on the desktop 1200 and/or be wholly or partially obfuscated (e.g., darkened, grayed out, blurred, etc.).

In some implementations, the user can drag a dashboard around the user interface 1200 and the other dashboards will automatically resize or move to make room for the dashboard at its new location in the user interface 1100.

In some implementations, elements can be dragged and dropped between dynamically tiled dashboards 1202. When a widget is dropped into a dashboard it conforms to the dashboard's properties, theme or content and it is modified as appropriate to be consistent with other widgets in the dashboard (e.g., resized).

In some implementations, the currently activated dashboard is altered with animation or other special effects (e.g., highlighted, magnified, "fisheye" effect, etc.). In some implementations, the currently activated dashboard can have greater image resolution (e.g., more pixels) and/or more details than inactive dashboards. This feature enables users to move tiles around the user interface 1200 in real-time by reducing the amount of time required to draw and redraw a dashboard.

Tab Control

Figure 13:
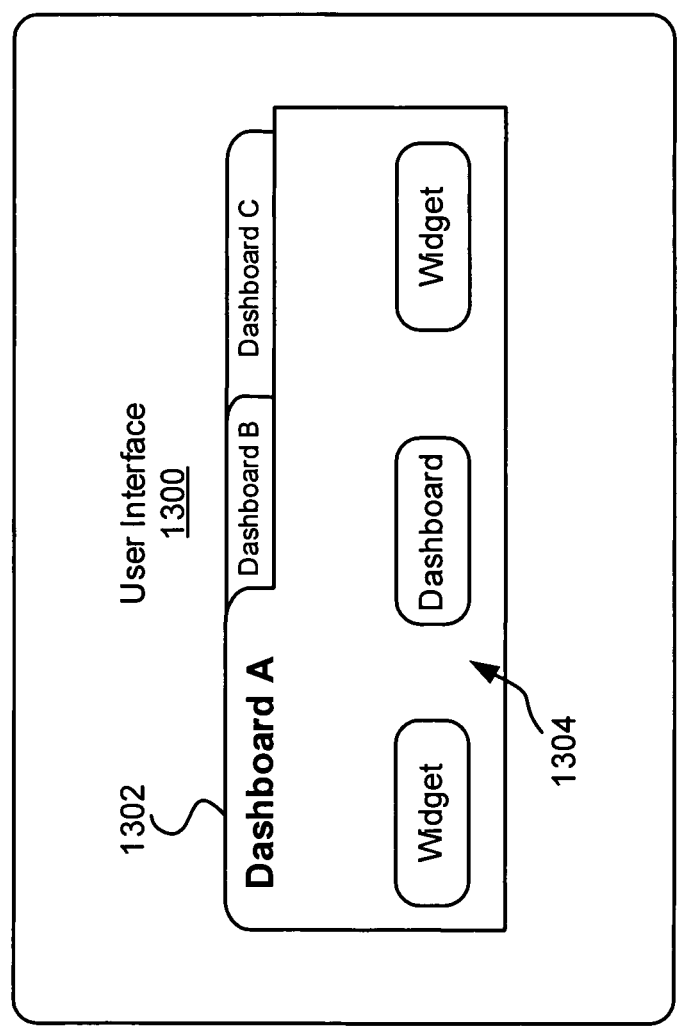
FIG. 13 illustrates an exemplary tab control scheme for organizing multiple dashboards on a user interface.

FIG. 13 illustrates a tab control scheme for multiple dashboards. In some implementations, multiple dashboards 1302 are presented in a user interface 1300 using a tab control scheme. A tab control 1302 can be used to organize multiple dashboards on the user interface 1300. Each dashboard includes a tab 1304 and a tab panel 1306. The tab 1304 is used to activate a dashboard and can be located on the top or sides of the tab control 1302. When the tab 1304 is activated (e.g., mouse clicked by a user), the tab panel 1306 corresponding to the tab 1304 is moved to the front and activated. The tab panel 1306 can include one or more enabled elements (e.g., widgets, dashboards, etc.) which can be interacted with by a user, application, etc. In some implementations, the tab 1304 can display a notification associated with dashboards or widgets. For example, the notification can alert a user that an element needs attention.

In some implementations, the properties of the tab control 1302 (e.g., size, location, color, font, style) can be changed by a user or programmatically by an operating system and/or application. Each tab 1304 can be labeled with an appropriate title and other information indicative of the theme or content of the dashboard (e.g., a graphical image, etc.). The tab control 1304 can be minimized and stored in a configuration bar when not in use.

Figure 14:
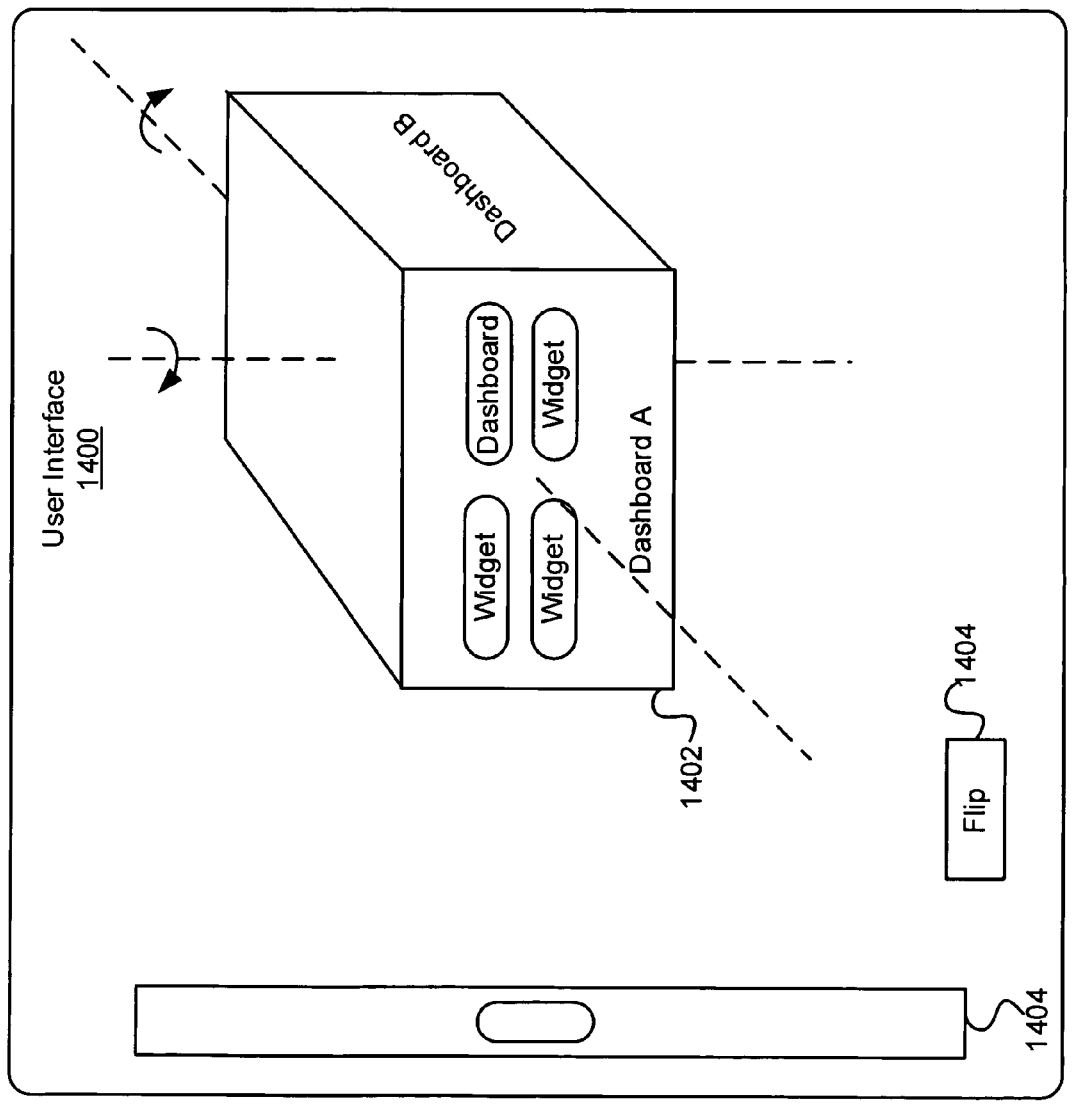
FIG. 14 illustrates an exemplary geometric scheme for organizing multiple dashboards on a user interface.

FIG. 14 illustrates a geometric scheme for organizing multiple dashboards on a user interface 1400. In some implementations, a geometric object (e.g., a cube 1402) can be used to organize multiple dashboards on the user interface 1400. For example, a cube 1402 can display a dashboard or dashboard icon or other selectable object associated with a dashboard on the front-facing side of the cube 1402. The user can manipulate a control mechanism 1404 (e.g., a scroll bar, key, mouse over, etc.) for controlling the animation of the cube 1402. For example, with each quarter rotation the front-facing side of the cube 1402 displays a different dashboard icon, image or other dashboard indicia that can be static or have at least some portions animated. Thus, a user can quickly review available dashboards by "spinning" the cube about one of its axes. The user can also click a flip button 1406 to rotate or spin the cube to see another dashboard. By using animated two and three-dimensional graphical objects to display dashboards (e.g., like the cube 1402), more than one dashboard can be visible to the user at a given time.

Other geographic objects can be used to display dashboards (e.g., a cylinder, sphere, triangle, diamond, etc.). When the user finds a desired dashboard, the user can select the dashboard for installation, previewing or launching by clicking on the dashboard icon, image or other dashboard indicia on the front-facing side of the cube 1402.

Other types of organization schemes can also be used to organize multiple dashboards on a user interface. For example, a Rolodex graphic can be animated to simulate the functionality of a Rolodex by allowing the user to flip through multiple dashboards, i.e., index cards. Also, a carousel graphic can be animated to simulate the functionality of a carousel by allowing the user to manipulate (e.g., rotate) the graphic to reveal available dashboards.

Dashboard Configuration Bar

Figure 15:
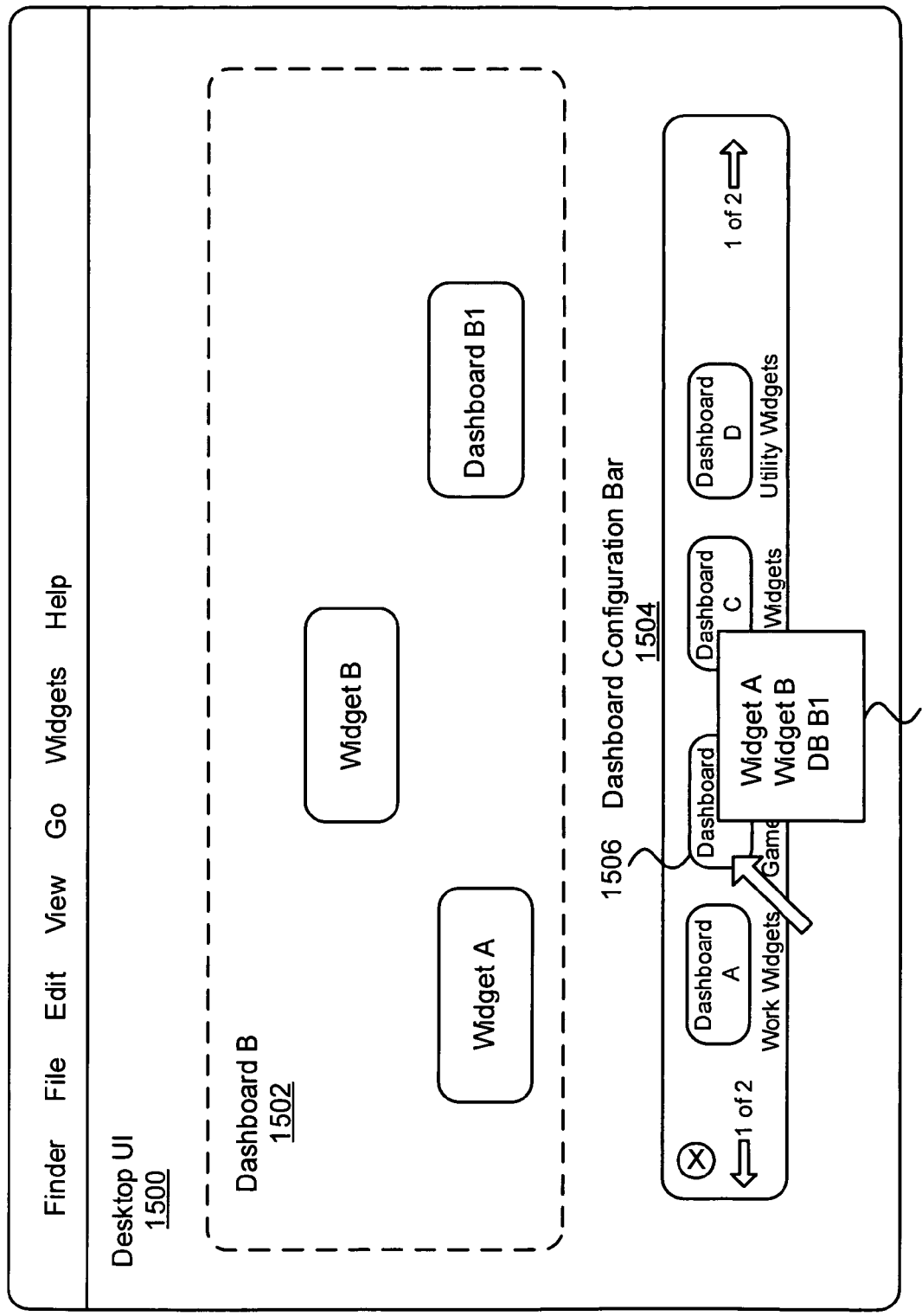
FIG. 15 illustrates an exemplary dashboard configuration bar

FIG. 15 illustrates an exemplary dashboard configuration bar. In some implementations, dashboards can be organized in a dashboard configuration bar 1504 displayed in a user interface 1500. A user can launch and/or display a dashboard 1502 ("Dashboard B") by selecting an icon 1506 associated with the dashboard 1502 from the dashboard configuration bar 1504 and dropping the icon 1506 in the user interface 1500. When the icon 1506 is clicked or dragged and dropped in the user interface 1500, the dashboard 1502 is displayed, as shown in FIG. 15. If multiple dashboard and/or widgets are dropped in the user interface 1500, then in some implementations the dashboards and/or widgets can be dynamically tiled, tabbed or otherwise organized for maximum visibility depending on the display environment and user preferences. Such organization can include replacing existing dashboards or partially overlapping existing dashboards. In some implementations, when a user traverses the icon 1506 with a cursor (e.g., a mouse over), a panel 1508 or bubble is displayed proximate the icon 1506 which lists the widgets or any other desired information (e.g., descriptive text, images, etc.) in the dashboard 1502. Alternatively, when a user traverses over different dashboard icons 1506 in the dashboard configuration bar 1504 the dashboards are switched in and out of operation. In some implementations, dashboard icons can be organized in the dashboard configuration bar 1504 based on dashboard type or class and one or more filter buttons (not shown) can be provided for filtering out dashboards from being displayed in the dashboard configuration bar 1504 based on one or more filter criteria.

Dashboard/Widget Configuration Bar

Figure 16:
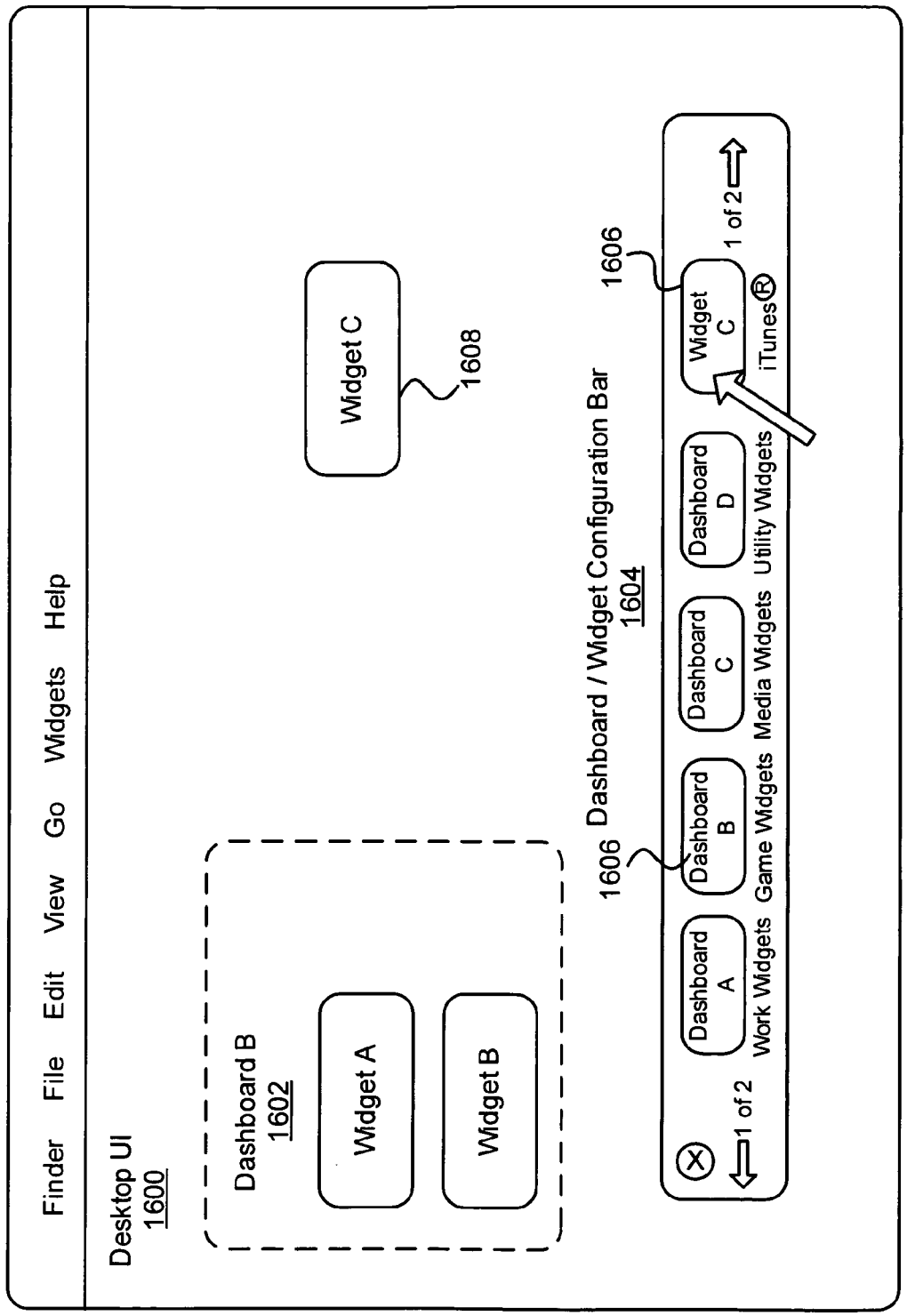
FIG. 16 illustrates an exemplary dashboard/widget configuration bar.

FIG. 16 illustrates an exemplary dashboard/widget configuration bar. In some implementations, dashboards and widgets can be organized together in a dashboard/widget configuration bar 1604 displayed in a user interface 1600. A user can launch and/or display a dashboard 1602 ("Dashboard B") by clicking an icon 1606 associated with the dashboard 1602 from the dashboard/widget configuration bar 1604 or dragging the icon 1606 from the dashboard/widget configuration bar 1604 and dropping the icon 1606 in the user interface 1602, as previously described with respect to FIG. 15. Additionally, a user can launch and/or display a widget 1608 ("Widget A") by selecting an icon 1610 associated with the widget 1608 from the dashboard/widget configuration bar 1604 and dropping the icon 1610 in the user interface 1600. The widget 1608 can be dropped into a user interface 1600 (as shown) or into a dashboard. The widget 1608 can also be dragged and dropped into the dashboard 1602. If multiple dashboard and/or widgets are dropped in the user interface 1600 or dashboard layer, then in some implementations the dashboards and/or widgets can be dynamically tiled, tabbed or otherwise organized for maximum visibility depending on the display environment and user preferences. In some implementations, dashboard and/or widget icons can be organized in the widget/dashboard configuration bar 1604 based on dashboard or widget type or class and one or more filter buttons (not shown) can be provided for filtering out dashboards or widgets from being displayed in the dashboard configuration bar 1604 based on one or more filter criteria.

Dashboard Menu Scheme

Figure 17:
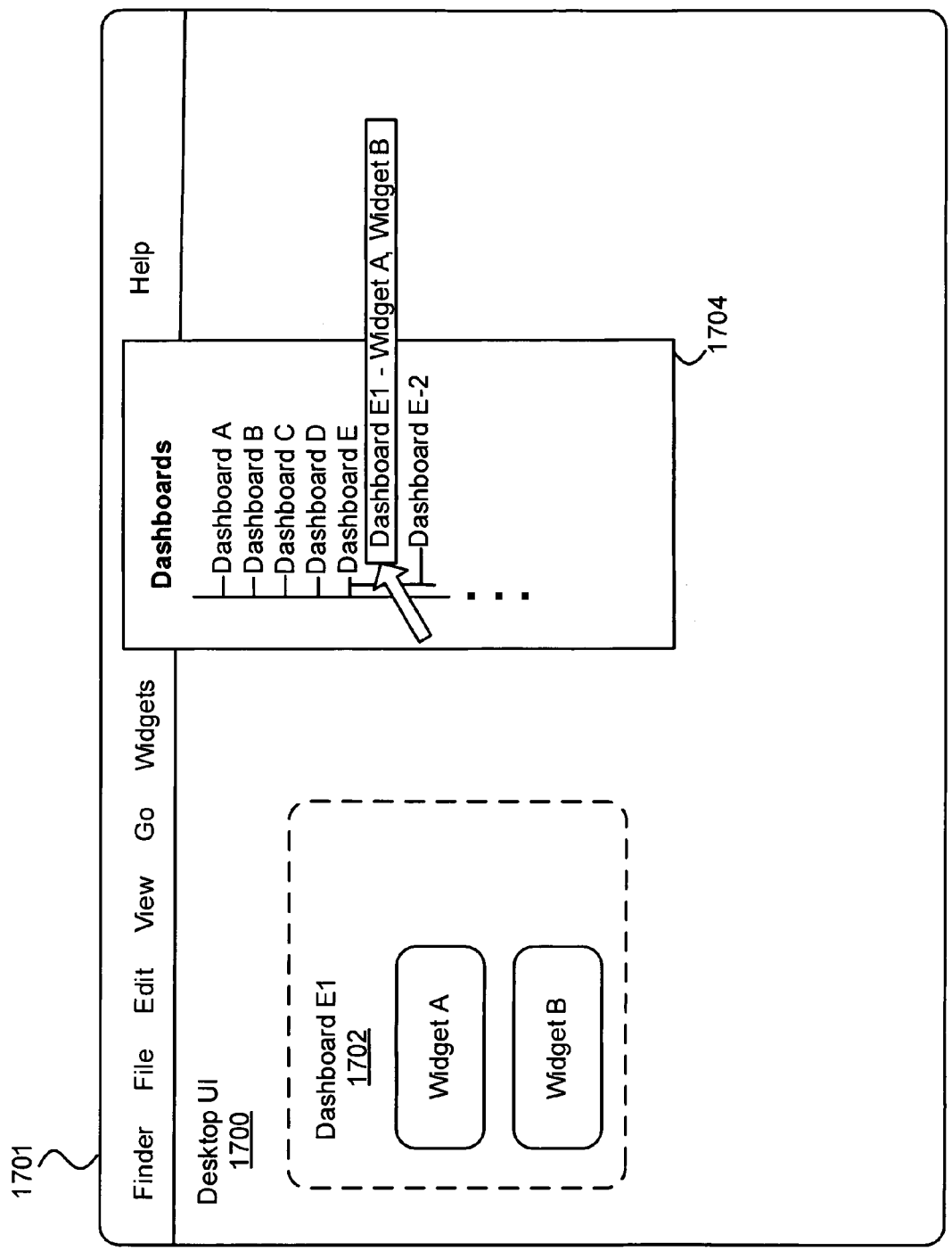
FIG. 17 illustrates an exemplary menu scheme for organizing multiple dashboards and widgets.

FIG. 17 illustrates an exemplary menu scheme for organizing multiple dashboards and widgets. In some implementations, a user can select among multiple dashboards and/or widgets using a pull-down menu 1704. The menu 1704 can be accessed from a tool bar 1701 in a user interface 1700 or any other suitable location in the user interface 1700 or a dashboard layer. The user can navigate through a hierarchy of dashboards and/or widgets using a pointing device. In some implementations, when the pointing device (e.g., a cursor) traverses a dashboard in the menu 1704, the contents of the dashboard are displayed. In the example shown, the dashboard E-1 has been selected by a user, and the contents of Dashboard E-1 (i.e., Widget A, Widget B) are displayed. Note that the dashboard E-1 is a nested dashboard, as described above. If multiple dashboard and/or widgets are dropped in the user interface 1700 or a dashboard layer, then in some implementations the dashboards and/or widgets can be dynamically tiled, tabbed or otherwise organized for maximum visibility depending on the display environment and user preferences. In some implementations, when a user navigates the menu 1704 the dashboard being traversed is displayed in the user interface 1700 or in a separate window or pane, so that the user can see the contents of the dashboard.

Any dashboard that has been opened from the display can be closed using a variety of techniques include buttons, selecting a close option from a pull-down menu.

Dashboard Tool Panel Scheme

Figure 18:
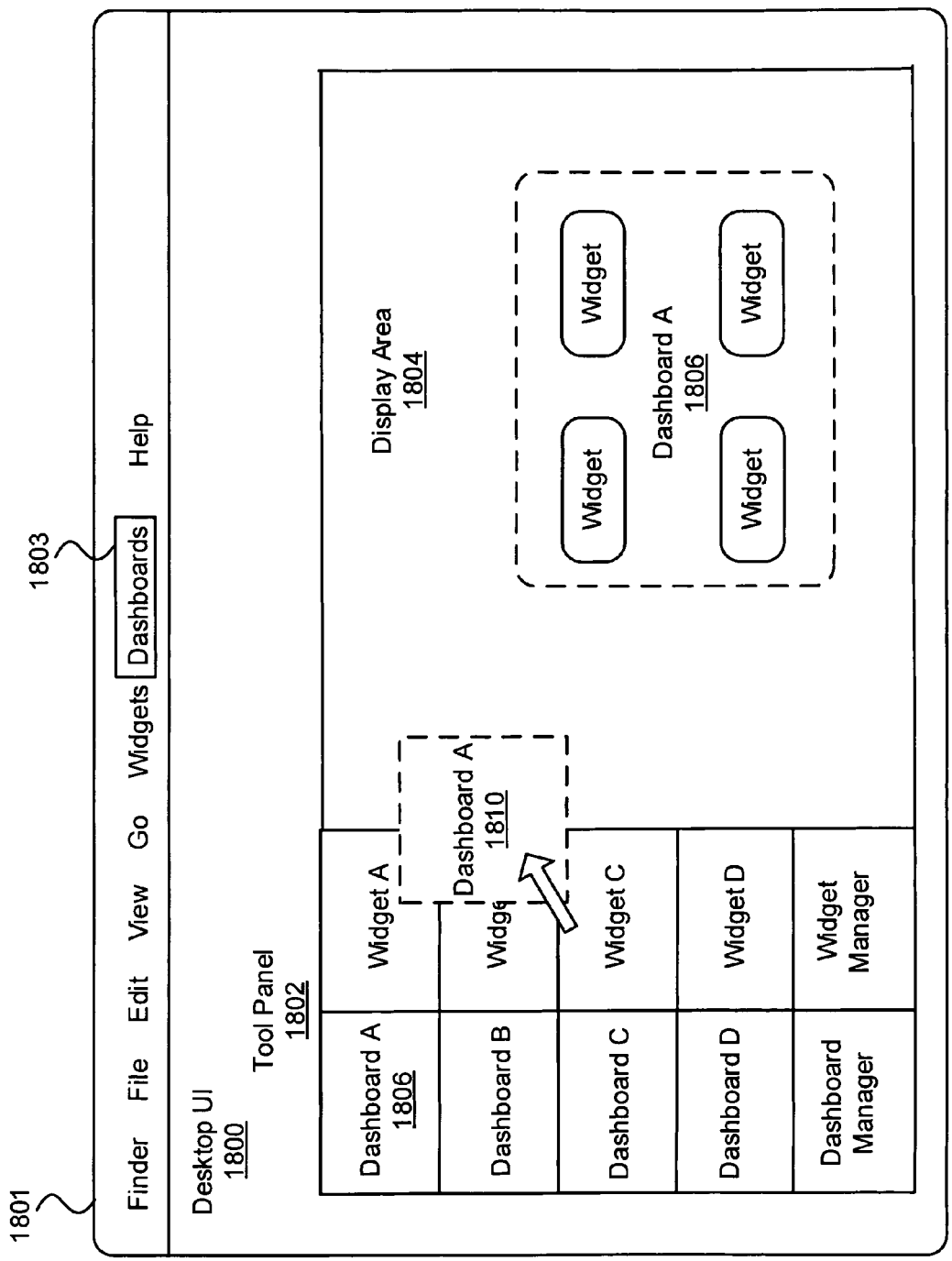
FIG. 18 illustrates an exemplary tool panel scheme for installing dashboards and widgets.

FIG. 18 illustrates an exemplary tool panel scheme for launching/displaying dashboards and/or widgets. In some implementations, the user can invoke a tool panel 1802 having a display area 1804 in a user interface 1800. For example, the user can invoke the tool panel 1802 with the display area 1804 by selecting a button 1803 or other input mechanism in a tool bar 1801. In response to the selection, the tool panel 1802 and display area 1804 are presented on the user interface 1800. A user can click a dashboard and/or widget icon 1810, or drag a dashboard and/or widget icon 1810 from the tool panel 1802 and drop it in the display area 1804, which causes the dashboard and/or widget to be launched and/or displayed. For example, a dashboard icon 1810 associated with a dashboard 1806 ("Dashboard A") can be selected, dragged and dropped in the display area 1804. The dashboard 1806 is displayed together with any widgets associated with the dashboard 1806. When the user navigates the icons 1810 in the tool panel 1802, the icons can be 1810 altered or animated (e.g., fisheye magnified) to indicate to the user which icon 1810 has been selected. In some implementations, the icons 1810 can be organized in the tool panel 1802 based on dashboard or widget type or class and filters can be applied based on one or more filter criteria. If multiple dashboard and/or widgets are dropped in the display area 1804, then in some implementations the dashboards and/or widgets can be dynamically filed, tabbed or otherwise organized for maximum visibility depending on the display environment and user preferences.

Dashboard Data Structure

In some implementations, each dashboard in a multiple dashboard configuration is associated with metadata which can be used to manage the dashboard and associated widgets. The data structure can be initialized when a dashboard is first installed or created. After installation, a dashboard data structure can be periodically updated as it is reconfigured (e.g., widgets are added or deleted).

Table II below is exemplary data structure for multiple dashboards.

TABLE I

Exemplary Dashboard Data Structure

| Dashboard Name | Identifier (static, dynamic) | Parent Dashboard | Int. Links (widgets or dbs) | Ext. Links (e.g., URLs) | Rules (e.g., security) |
|---|---|---|---|---|---|
| A | 32831223 | | | Apple.com | |
| B | 43443343 | A | | | |
| B-1 | 34343444 | E | A, B | | read only |
| ... | ... | ... | ... | ... | ... |

Referring to Table I, an exemplary data structure for a multiple dashboard environment is described. In this example there are three dashboards A, B and B-1. Dashboard B-1 is nested with dashboard B. Each dashboard is associated with a unique static identifier (ID) and/or dynamic identifier (e.g., hashes). The static identifier can be used to identify the original instance of a dashboard. Dynamic identifiers can be used to identify subsequent instances of a dashboard. If the dashboard is nested in a parent dashboard, then the name or identifier for the parent dashboard is stored in the data structure. Each dashboard and/or its associated widgets can be internally linked to other widgets or dashboards. These link relationships are stored in the data structure. Each dashboard and/or its associated widgets can be externally linked to sources outside the dashboard display environment, such as a web site or other network resource. A URL or other resource locator mechanism can be stored in the data structure. Any rules applying to a dashboard or an associated widget can be stored in the data structure, including but not limited to security rules relating to authentication, access, etc.). Various other metadata can be stored in the dashboard data structure, including but not limited to: metadata associated with the display of a dashboard or an associated widget (e.g., size, position, font, style, etc.). The dashboard data structures can be stored locally in any suitable computer-readable medium, such as memory, a hard disk and the like.

Dashboard Bundle Distribution

Figure 19:
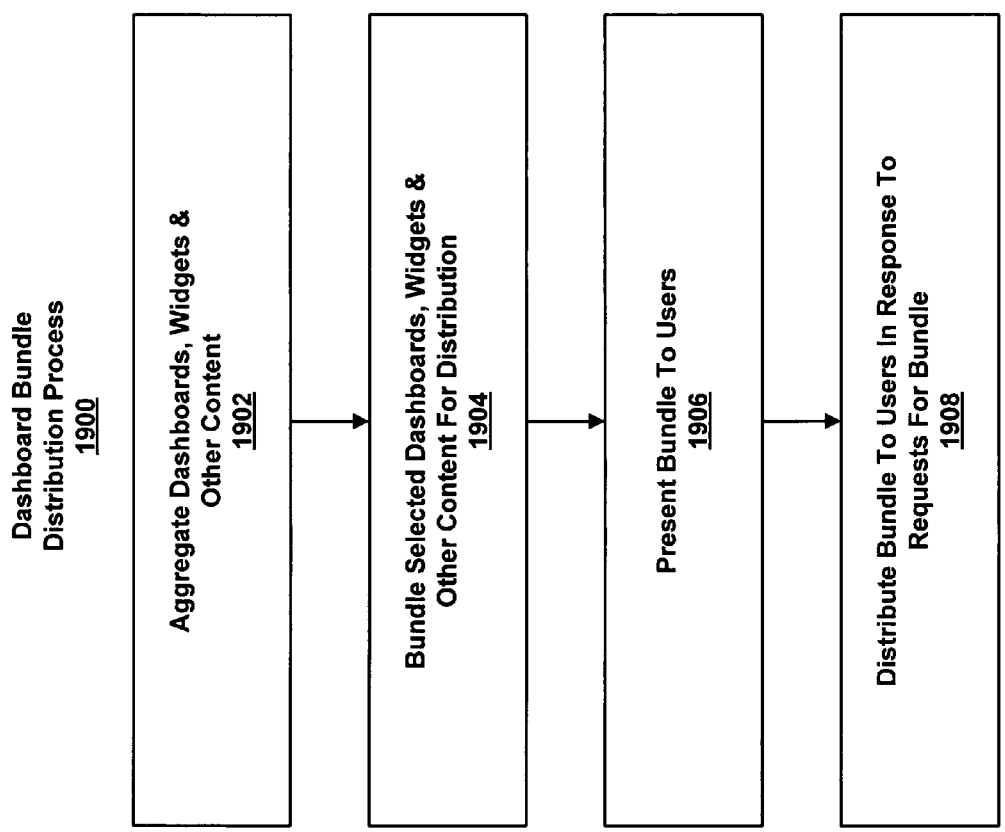
FIG. 19 is a flow diagram of an exemplary dashboard bundle distribution process.

FIG. 19 is a flow diagram of an exemplary process for distributing dashboard bundles 1900. In some implementations, dashboards can be bundled or packaged with other dashboards, widgets and/or other content and distributed to users. These bundles (hereinafter also referred to as "dashboard bundles") can be bundled at a first location and distributed to a second location by way of a distribution channel. The second location can be an end user device or a third party computer system operated by another individual or entity in a distribution chain. The distribution channel can be the Internet or other computer network or it can be a traditional distribution method (e.g., shipping, mail, etc.)

The process 1900 begins by aggregating dashboards, widgets and other content (hereinafter also referred to as "items") (1902). For example, a website could aggregate descriptions of items and provide web pages that allows users to browse catalogs and other user interface elements, and select one or more items for free or for purchase. The items can be stored on computer-readable medium (e.g., a CD or DVD) and delivered to users over traditional distribution channels. Alternatively, the items can be downloaded over a computer network (e.g., the Internet, a wireless network, an intranet). An example of a website that could be modified to deliver dashboard bundles is the iTunes™ online music store, which is operated by Apple Computer, Inc. (Cupertino, Calif.).

Selected items are combined together into dashboard bundles for distribution to users and other entities (1904). Dashboard bundles can be created by authors, distributors, content aggregators or any other business, organization, individual or entity. The dashboard bundles can include a combination of dashboards, widgets and other content (e.g., URLs, music, videos, photos, text, etc.). Dashboard bundles can have themes. For example, a dashboard bundle could have a "travel" theme and include a weather dashboard with weather widgets, a hotel reservation widget and one or more URLs, which can be used to drive users to websites, blogs and other locations containing information related to travel.

Another example of a thematic dashboard bundle is a celebrity dashboard bundle. A celebrity dashboard bundle could include a movie-related dashboard, a music-related dashboard, a ticket purchase widget, and URLs that would direct users to information and other content associated with a celebrity. One exemplary use of a celebrity dashboard bundle would be for promoting an artist by combining the artist's work with related widgets and other content into a coherent bundle of useful and interesting content. For example, a celebrity dashboard bundle could be created for the rock star Madonna that would include one or more of her songs and/or music videos, a concert calendar, a ticket widget for enabling the purchase of concert tickets online, a URL or other link to her website, fan club, blog or other sites of useful information. In some implementations, there could be an invitation and/or link to join a social community or discussion group related to the artist and their work.

In some implementations, dashboards, dashboard bundles and/or individual widgets can be made available to user devices based on the user's geographic location. Various positioning technologies (e.g., GPS) can be used to determine the location of the user, which can then be used to identify items to make available to the user. For example, a user at a baseball game could get a scorecard widget downloaded to their computer or other portable device over a wireless network. In another example, a widget can be downloaded to the user's portable device for locating concession stands or other locations of interest in a venue. This functionality can be tied to advertising, so that the user is directed to a location where they can purchase an advertised item displayed by, for example, a widget hosted on the user's device.

Dashboard bundles can be used for targeted advertising and include "advertising space" that could be purchased by third parties and filled with visual and/or audio advertisements for various products or services. For example, an advertising widget could be added to a dashboard that continuously displays advertisements related to the theme of the dashboard bundle. The advertising widget could be configured so that it can be moved around the dashboard by the user but not deleted.

After the dashboard bundle is created, it can be displayed on a web page or otherwise marketed to users through various marketing channels and services (1906). For example, a user could select a dashboard bundle from a webpage. Upon receipt of the request, the dashboard bundle is distributed to the user via the Internet or other distribution channel (1908).

In some implementations, DRM rules can be included with dashboard bundles, as described in reference to FIGS. 7a and 7b. The DRM rules can be used by, for example, a dashboard manager to protect the rights of owners who contribute content to the dashboard bundle. To avoid "spoofing" and other security issues related to distributing content, the dashboard bundles can be distributed using techniques described in U.S. patent Ser. No. 11/409,276, for "Safe Distribution and Use of Content."

Figure 20:
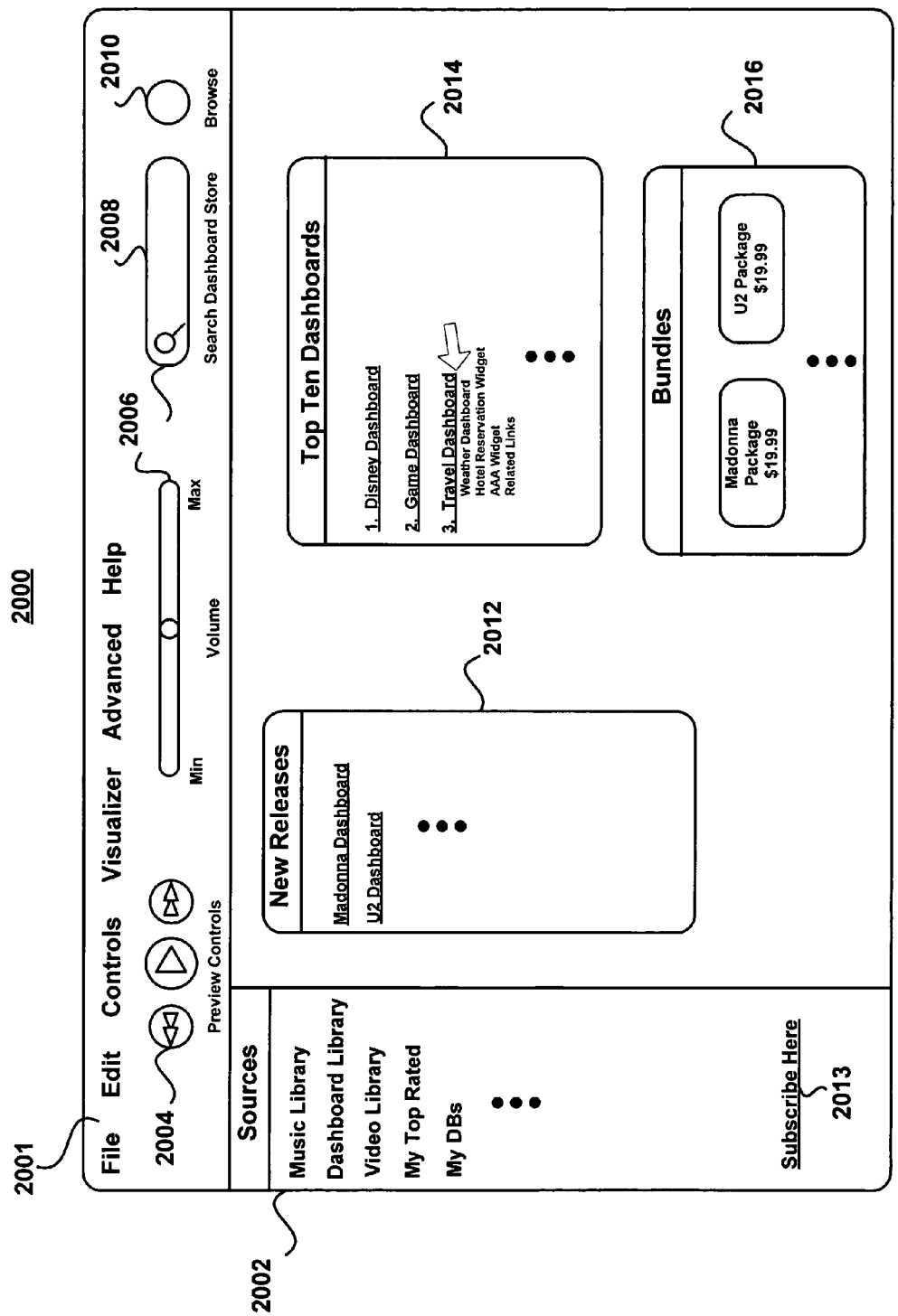
FIG. 20 illustrates an exemplary user interface for an application that allows users to select or create dashboard bundles.

FIG. 20 illustrates an exemplary user interface 2000 for an application that allows users to select or create dashboard bundles. In some implementations, the user interface 2000 includes a tool bar 2001, a sources pane 2002, preview controls 2004, a volume control 2006, a search box 2008, and a browse button 2010. The user interface 2000 provides a means for creating, managing and purchasing content. The tool bar 2001 includes various tools for filing, editing and controlling the user interface 2000. The source pane 2002 lists various sources for dashboards, dashboard bundles, widgets and other content. For example, the source pane 2002 could include a "dashboard library" for storing the user's dashboards and dashboard bundles. When the user clicks or otherwise interacts with the dashboard library a listing is displayed including all of the dashboards and dashboard bundles that were created, purchased or otherwise acquired buy the user.

The preview controls 2004 and volume control 2006 can be used to control the preview of various items. For example, the preview controls 2004 could be used to control playback of a song, video or a demonstration of a widget or dashboard. The volume control 2006 would control the volume of any audio associated with the items being previewed. The search box 2008 and browse button 2010 can be used to search and browse, respectfully, for various items stored locally at the user device or on a network device, such as searching, for example, a dashboard store for dashboards and dashboard bundles available for purchase and download.

In some implementations, the user interface 2000 could include one or more panes for marketing dashboard bundles and other content. For example, the user interface 2000 could include a "New Releases" pane, which lists items that have been recently released for distribution to the public. The user interface 2000 could also include a "Top Ten" dashboard display pane 2014 for displaying the top ten selling dashboards or dashboard bundles. In some implementations, each entry can be a link, which when clicked drives the user to a webpage for purchasing and downloading the dashboard bundle. In some implementations, the user can make an "in place" purchase in a "virtual" store without the user being directed to another content source. An example of a "virtual" store would be the iTunes® store operated by Apple Computer, Inc.

The user can see the contents of a dashboard bundle by mousing-over the entry for the dashboard bundle. In the example shown, the user moused-over the "travel" dashboard bundle, causing the contents of the travel dashboard bundle to be displayed: a weather dashboard, a hotel reservation widget, an American Automobile Association (AAA) widget and one or more URLs to websites containing information or other content related to travel.

To determine ranking, purchases and/or downloads of dashboards and/or dashboard bundles can be tracked and statistics can be compiled to form popularity rankings. In some implementations, a recommendation engine could be used to identify dashboards and dashboard bundles that would be of interest to a particular user based on the user's purchasing habits, personal information or any other information that can be used to match the user with dashboards and/or dashboard bundles. For example, if a user has a history of buying Madonna songs, then the user can be sent promotional materials for a dashboard bundle associated with Madonna. Such promotions can be displayed anywhere in the user interface 2000 or in a dedicated advertising pane 2016.

Figure 21:
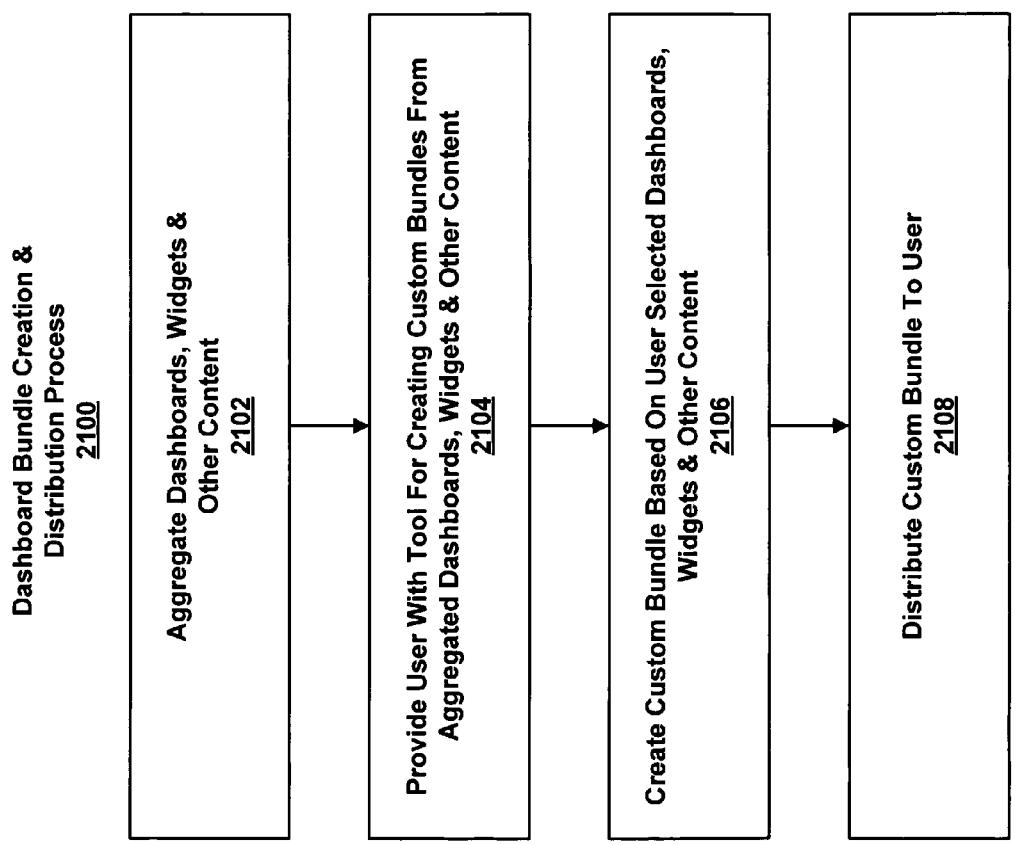
FIG. 21 is a flow diagram of an exemplary process for creating and distributing dashboard bundles.

FIG. 21 is a flow diagram of an exemplary process 2100 for creating and distributing dashboard bundles. In some implementations, a tool can be provided to users for creating custom dashboard bundles. The process 2100 begins by aggregating items (2102). Next, users are provided with a tool for creating custom dashboard bundles (2104). For example, the aggregated items could be displayed in a web page served by a web server over a network. The web page could include a user interface element (e.g., a button, menu option, etc.) for invoking the tool. An exemplary tool for creating dashboard bundles is the dashboard builder tool, as described in reference to FIG. 4e. The user can use the tool to create a dashboard or a dashboard bundle that includes other dashboards, widgets and other content (2106). The user can be provided with various theme templates for the dashboard bundles that can be used to provide thematic elements (e.g., color, font, animation, video, audio, etc.). Alternatively, the user can be provided with a tool bar or palette that can include various tools for customizing a dashboard or dashboard bundle. After the user creates the dashboard bundle, the dashboard bundle is made available for distribution to the user by way of a distribution channel (2108) (e.g., downloaded over the Internet or delivered on a CD ROM by way of ordinary mail).

Dashboard Bundle Subscription Service

Figure 22:
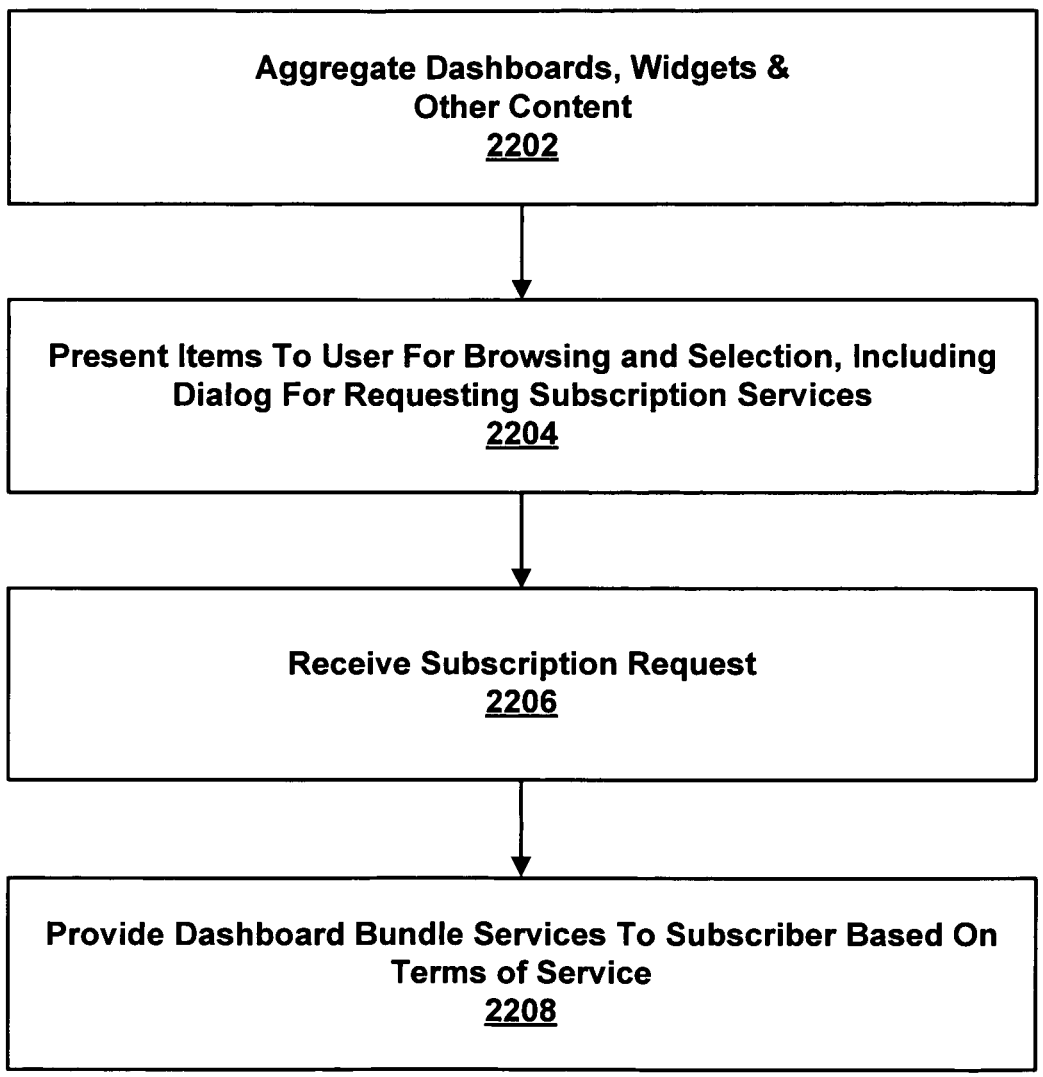
FIG. 22 is a flow diagram of an exemplary process for creating and distributing dashboard bundles using a dashboard bundle subscription service.

FIG. 22 is a flow diagram of an exemplary process 2200 for creating and distributing dashboard bundles using a dashboard bundle subscription service. For example, a user can subscribe to a celebrity fan club, which entitles the user to receive updates and upgrades to a celebrity dashboard bundle.

The process 2200 begins by aggregating items (2202). Next, the items are presented to users using a tool for browsing and selecting among items (e.g., a website or "virtual" store), including a dialog or other user interface element for allowing users to subscribe to the dashboard bundle service (2204). An example of such a user interface element can be the link 2013 shown in FIG. 20. Upon receipt of a subscription request (2206), the user becomes a subscriber and the dashboard subscription service provides subscription services to the user based on the terms of service (2208).

For a one time fee or a recurring fee (e.g., monthly, annual, etc.), a subscriber can download or otherwise receive the dashboard bundles. In some implementations, the dashboard bundle service can provide the subscriber with updates or upgrades to the dashboard bundles that have been distributed to the user.

In some implementations, the user can be provided with a editable user account, which includes information related to the subscription service (e.g., personal information, contact information). When the user subscribes to the dashboard bundle service they can select an option to receive promotional materials and offers through the service or through other communication mediums (e.g., email).

In some implementations, the number of dashboard bundles that can be downloaded or otherwise received by a user under the dashboard bundle subscription service can be restricted based on the terms of service or other criteria. For example, a user can be requested to pay a higher fee for receiving unlimited dashboard bundles. Other restrictions are possible, including but not limited to: 1) restrictions based on time (e.g., limited use period), 2) restrictions on the numbers and types of devices that can receive a dashboard bundle, 3) restrictions on the number of dashboard bundles that can be simultaneously accessed, and 4) restrictions on further distribution of dashboard bundles. The dashboard bundles can be distributed with rules for governing access or distribution of dashboard bundles. The dashboard bundles can be encrypted and the user can be directed to a third party for receiving a license key or other information that can be used to unlock or decrypt a dashboard bundle.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
    identifying, by a computing device having a desktop, a plurality of widgets for installation in a dashboard environment based on a user selection of widgets, where the plurality of widgets comprise separate applications, an installed widget presently executes an associated function including providing a presentation aspect associated with the executing function, and the desktop is inactive when the dashboard environment is active;
    determining whether installing any of the plurality of widgets in the dashboard environment violates any rules that prevent installation of at least one of a specific widget or widgets that provide access to a specific type of information;
    associating the plurality of widgets with the dashboard environment;
    installing the dashboard environment in a display environment including displaying the plurality of widgets executing in the dashboard environment, wherein, when the dashboard environment is active, a desktop environment is temporarily inactive; and
    wherein determining rules includes:
        determining a rule for managing the dashboard environment;
        evaluating the identified widgets to determine if each satisfies the rule; and
        installing only identified widgets in the selected dashboard environment that satisfy the rule.

2. The method of claim 1, wherein determining includes receiving a user selection of the rules for installing a widget.

3. A non-transitory computer readable medium having instructions stored thereon, which, when executed by a processor, causes the processor to perform the operations of:
    identifying, by a computing device having a desktop, a plurality of widgets for installation in a dashboard environment based on a user selection of widgets, where the plurality of widgets comprise separate applications, an installed widget presently executes an associated function including providing a presentation aspect associated with the executing function, and the desktop is inactive when the dashboard environment is active;
    determining whether installing any of the plurality of widgets in the dashboard environment violates any rules that prevent installation of at least one of a specific widget or widgets that provide access to a specific type of information;
    associating the one or more widgets with the dashboard environment;
    installing the dashboard environment in a display environment, wherein, when the dashboard environment is active, a desktop environment is temporarily inactive; and
    wherein determine rules includes:
        determine a rule for managing the dashboard environment;
        evaluate the identified widgets to determine if each satisfies the rule; and
        install only identified widgets in the selected dashboard environment that satisfy the rule.

4. The method of claim 3, wherein the determination includes receiving a user selection of the rules for installing a widget.

* * * * *